(12) United States Patent
Hanaki

(10) Patent No.: US 7,302,516 B2
(45) Date of Patent: Nov. 27, 2007

(54) APPARATUS AND METHOD OF MOVING PICTURE ENCODING EMPLOYING A PLURALITY OF PROCESSORS

(75) Inventor: Makoto Hanaki, Obu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 760 days.

(21) Appl. No.: 10/308,097

(22) Filed: Dec. 3, 2002

(65) Prior Publication Data

US 2003/0103564 A1 Jun. 5, 2003

(30) Foreign Application Priority Data

| Dec. 4, 2001 | (JP) | 2001-370153 |
| Dec. 4, 2001 | (JP) | 2001-370154 |
| Dec. 14, 2001 | (JP) | 2001-381496 |
| Nov. 7, 2002 | (JP) | 2002-324300 |

(51) Int. Cl.
*G06F 12/00* (2006.01)

(52) U.S. Cl. ..................................... 711/100

(58) Field of Classification Search ..................... None
See application file for complete search history.

(56) References Cited

U.S. PATENT DOCUMENTS 6,172,621 B1 1/2001 Iwata 6,507,947 B1* 1/2003 Schreiber et al. ........... 717/160
6,567,426 B1* 5/2003 van Hook et al. .......... 370/535
6,820,168 B2* 11/2004 Tanaka et al. ................ 711/6
2002/0031184 A1 3/2002 Iwata
2005/0132058 A1* 6/2005 Greenbaum et al. ... 375/240.28

FOREIGN PATENT DOCUMENTS

JP 11-346366 12/1999
JP 2000-30047 1/2000

\* cited by examiner

*Primary Examiner*—Nhon Diep
(74) *Attorney, Agent, or Firm*—Wenderoth, Lind & Ponack, L.L.P.

(57) ABSTRACT

A shared storage section 2 stores: moving picture data which is split in sequences, data necessary for encoding each sequence, and a processing state of each sequence. Based on the processing states stored in the shared storage section 2, each processor 1 selects one of the sequences and a process to be next executed for that sequence and executes that process, independently of the operation of any other processor. Based on identification management information, each processor 1 acquires an identification number prior to beginning a process, and abandons the acquired identification number when the process is completed or when a failure occurs. Each processor 1 performs a process of updating its own program as necessary, or a process of detecting an abnormality in a bitstream. The shared storage section 2 can function so as to store moving picture data in a distributed manner, so that a distributed file system is constructed during a motion vector search.

10 Claims, 34 Drawing Sheets

FIG. 14

PROGRAM UPDATE INFORMATION

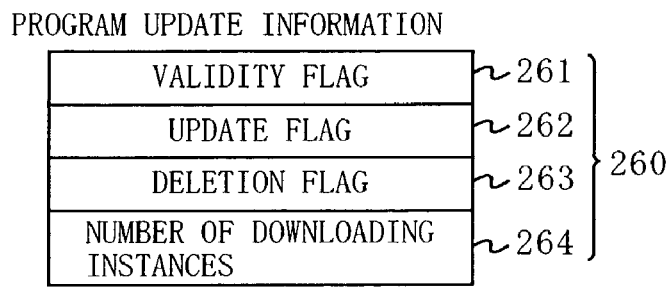

PROGRAM CODE INFORMATION

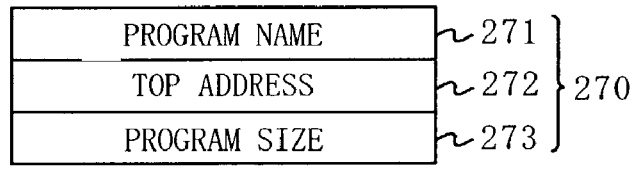

PROGRAM FUNCTIONAL INFORMATION

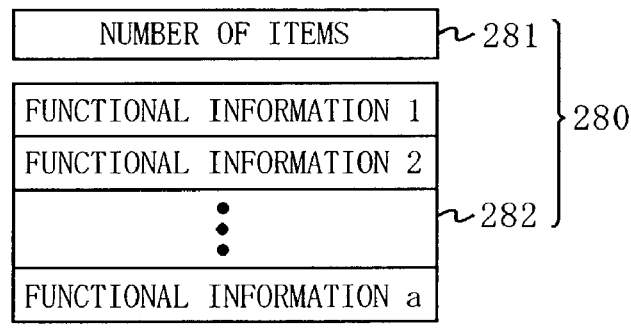

FIG. 15

| LAYER OF PROCESS | CONTENT OF PROCESS |
|---|---|
| PRELIMINARY PROCESS | • SEQUENCE SPLITTING PROCESS<br>• MOVING PICTURE FEATURE EXTRACTION PROCESS |
| SEQUENCE LAYER | • SEQUENCE HEADER PRODUCTION PROCESS<br>• GOP STRUCTURE DETERMINATION PROCESS |
| GOP LAYER | • GOP HEADER PRODUCTION PROCESS |
| PICTURE LAYER | • PICTURE HEADER PRODUCTION PROCESS |
| SLICE LAYER | • SLICE HEADER PRODUCTION PROCESS |
| MACROBLOCK LAYER | • MACROBLOCK ENCODING PROCESS |

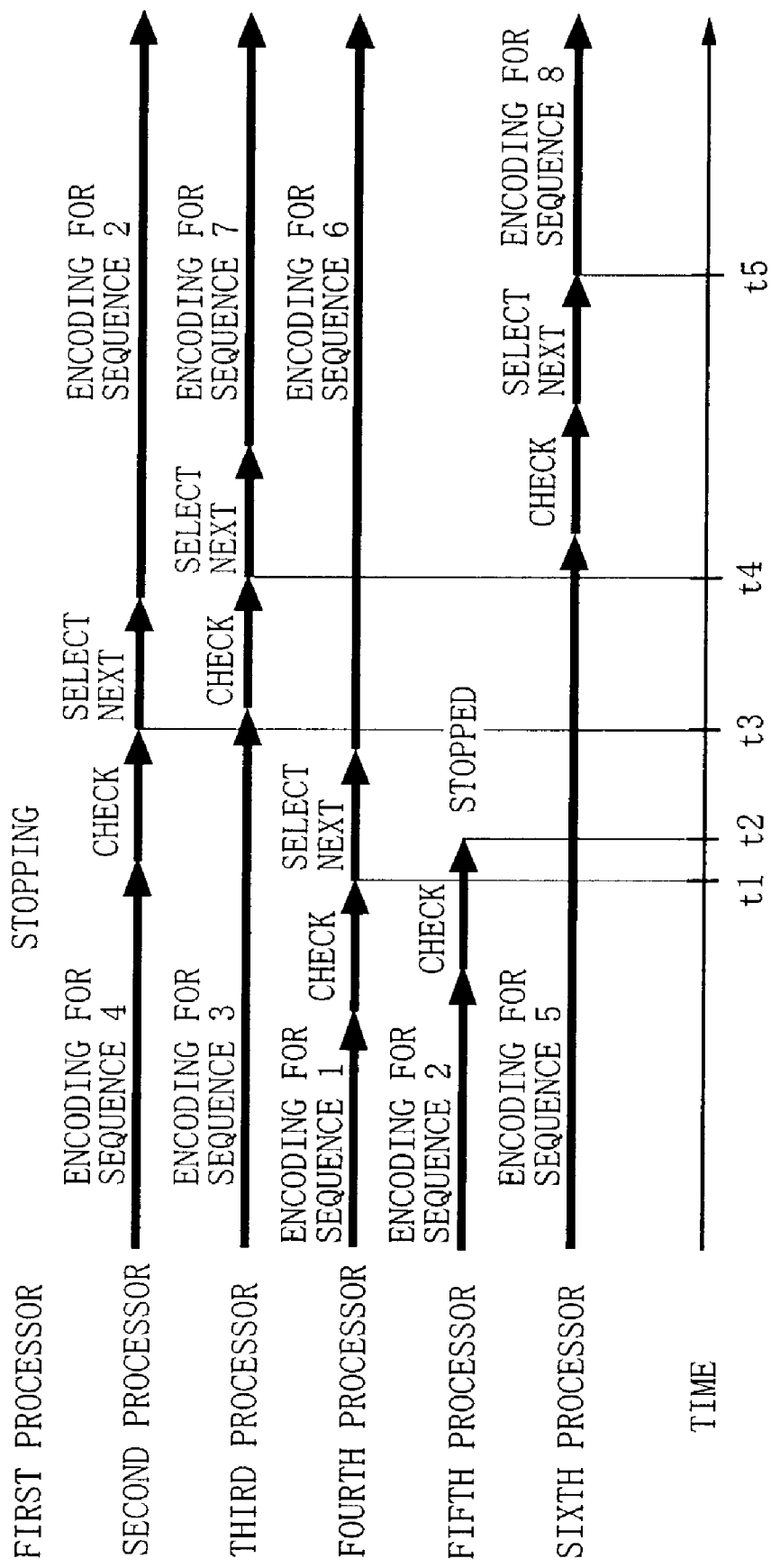

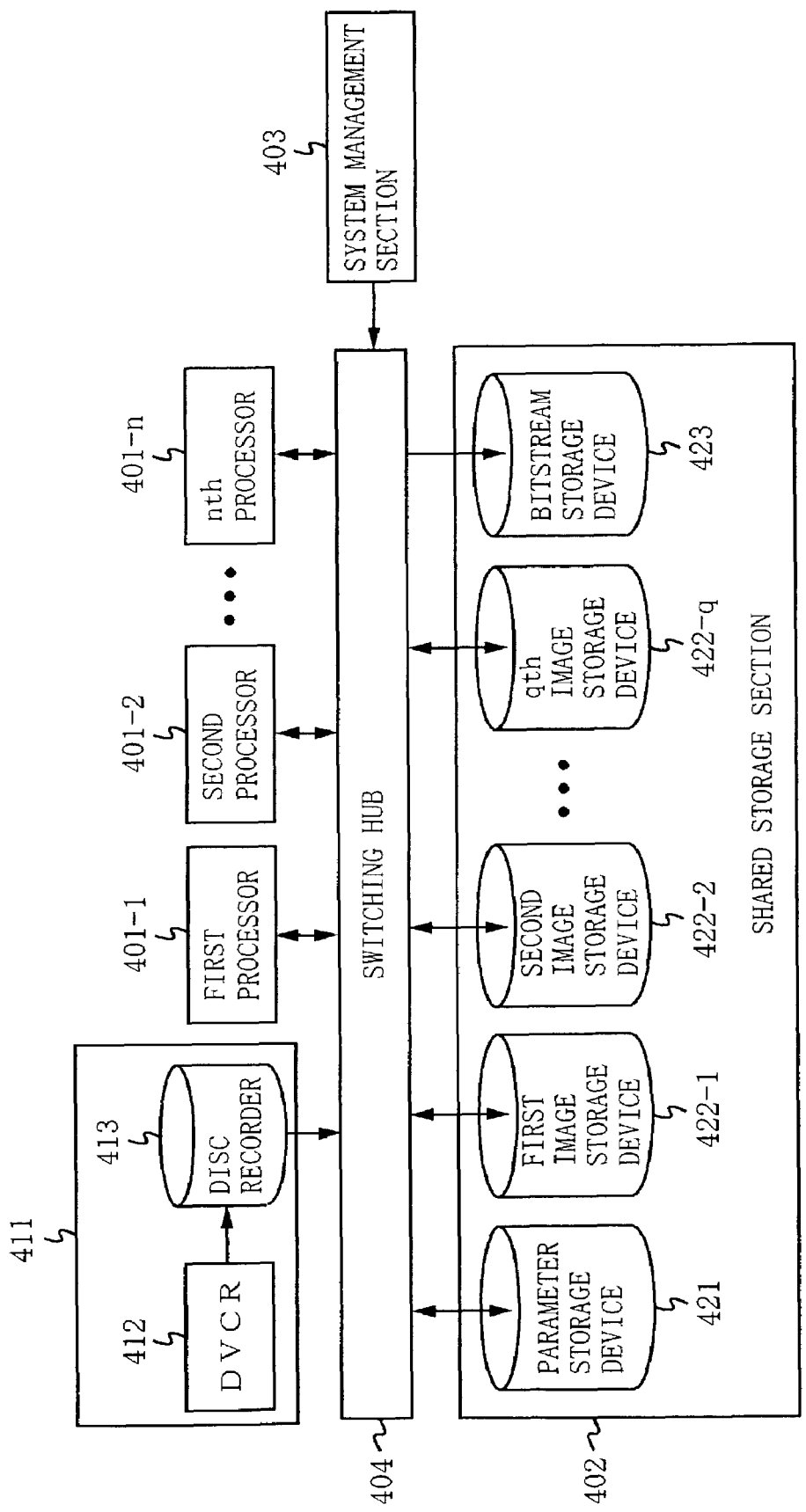

FIG. 31

SEQUENCE ATTRIBUTE INFORMATION

| | 1 | 2 | ... | 431 |
|---|---|---|---|---|
| SEQUENCE NUMBER | 1 | 2 | ... | s |
| START TIME | 01:00:00:00 | 01:00:00:15 | ... | 01:29:59:14 |
| END TIME | 01:00:00:15 | 01:00:01:00 | ... | 01:29:59:30 |
| GOP STRUCTURAL INFORMATION | I TOP, M=3, N=15 | B TOP, M=3, N=15 | ... | B TOP, M=2, N=16, closed |
| SERVER NAME | DISK RECORDER | DISK RECORDER | ... | DISK RECORDER |
| TARGET BIT RATE | 17Mbyte/second | 10Mbyte/second | ... | 15Mbyte/second |
| IMAGE STORAGE DEVICE NUMBER | 2 | 5 | ... | — |
| BITSTREAM PRODUCTION FLAG | 1 | 1 | ... | 0 |
| | ... | ... | ... | ... |

{431, 432, 433, 434, 435, 436, 437, 438} → 430

SEQUENCE MANAGEMENT INFORMATION

| | | | ... | |
|---|---|---|---|---|
| PROCESSOR NUMBER | 3 | 4 | ... | — |
| START FLAG | 0 | 1 | ... | — |
| END FLAG | 1 | 0 | ... | — |
| ERROR FLAG | 0 | 1 | ... | — |
| TIMEOUT FLAG | 0 | 0 | ... | — |
| COUNT VALUE | 20 | 100 | ... | — |

| BITSTREAM OBTAINED THROUGH ENCODING | PROCESSOR THAT ENCODED |
|---|---|
| SEQUENCE HEADER | MOTHER |
| GOP HEADER | MOTHER |
| PICTURE HEADER | MOTHER |
| SLICE HEADER | MOTHER |
| MACROBLOCK 1 | DAUGHTER 1 |
| MACROBLOCK 2 | DAUGHTER 2 (ABNORMAL) |
| MACROBLOCK 3 | MOTHER |
| MACROBLOCK 4 | DAUGHTER 1 |
| MACROBLOCK 5 | DAUGHTER 2 (ABNORMAL) |
| MACROBLOCK 6 | MOTHER |
| MACROBLOCK 7 | DAUGHTER 2 (ABNORMAL) |
| MACROBLOCK 8 | DAUGHTER 1 |
| ⋮ | |
| MACROBLOCK M | DAUGHTER 1 |
| SLICE HEADER | MOTHER |
| MACROBLOCK 1 | DAUGHTER 2 (ABNORMAL) |
| MACROBLOCK 2 | DAUGHTER 1 |
| MACROBLOCK 3 | MOTHER |
| MACROBLOCK 4 | DAUGHTER 2 (ABNORMAL) |
| ⋮ | |

APPARATUS AND METHOD OF MOVING PICTURE ENCODING EMPLOYING A PLURALITY OF PROCESSORS

BACKGROUND OF THE INVENTION

1. Field of the Invention

The present invention relates to a moving picture encoding apparatus and moving picture encoding method, and more particularly to a moving picture encoding apparatus and moving picture encoding method for performing encoding processes in a parallel manner by employing a plurality of processors.

2. Description of the Background Art

Methods for allowing a plurality of processors to execute, in a parallel manner, a moving picture encoding process which is compatible with the MPEG (Moving Picture Experts Group) standard or the like are known, this being in order to reduce processing time. FIG. 34 and FIG. 35 are flowcharts illustrating processes performed by a mother processor and daughter processors, respectively, in a moving picture encoding apparatus described in U.S. Patent Application Publication No. US 2002/0031184 A1. In this encoding apparatus, a selected one of a plurality of processors included in the apparatus operates as a "mother processor", whereas the other processors operate as "daughter processors". In a parallel manner, the daughter processors execute those MPEG encoding processes which are executable in parallel. In the example shown in FIG. 35, the daughter processors execute the processes of subjecting macroblocks to encoding, variable-length coding, and local decoding (steps S32, S34, and S35) in a parallel manner. The mother processor chiefly controls encoding processes such as header production (steps S11 to S14) and activation of daughter processors (step S15). The mother processor may itself execute an encoding process as does a daughter processor. By allowing a plurality of daughter processors to operate in parallel under such execution control provided by the mother processor, the processing time can be reduced.

However, the above-described encoding apparatus has the following problems with respect to execution control over encoding processes, switching of encoding processes, error handling processing, storage device configuration, and the like. With respect to execution control over encoding processes, firstly, there is a problem in that, since the mother processor performs execution control over encoding processes, the consecutive processing performed by the mother processor may impede the parallel processing by the daughter processors. Secondly, since no means for dynamically adding or deleting a processor during an encoding process is provided, the malfunctioning of a single processor may halt the operation of the entire apparatus. Thirdly, execution control over encoding processes is achieved on the basis of synchronization between the mother processor and the daughter processors. Therefore, in order to be able to add or delete a processor during an encoding process, it becomes necessary to perform communications between the daughter processor to be added or deleted and the mother processor, or temporarily entrust the daughter processor to be added or deleted with the execution control over encoding processes, either of which will result in a temporary degradation of the processing ability. Fourthly, since the mother processor and the daughter processors handle different types of processes, the execution control over encoding processes becomes complicated.

With respect to switching of encoding processes, it is generally desirable for a moving picture encoding apparatus to have an ability to switch encoding processes depending on the characteristics of the moving picture data to be encoded. For example, by adopting a highly-accurate motion vector search for moving picture data which contains drastic movements while adopting a simpler motion vector search for moving picture data which contains less drastic movements, it becomes possible to obtain high-quality reproduced images for the former type of moving picture data, and reduce the processing time for the latter type of moving picture data.

However, in the above-described encoding apparatus, the process to be executed by each processor is fixed. Therefore, in order to be able to switch encoding processes depending on the characteristics of the moving picture data, it would be necessary to prepare all possible processes (to be switched to) on each daughter processor, so that the mother processor can dynamically switch the process executed by the daughter processors. However, such a method is not practical because it would result in wasting most of the functions provided in each daughter processor, and because complicated synchronization control would be required between the mother processor and the daughter processors. Moreover, when changing an encoding process or adding a new function, it would be necessary to interrupt the encoding process, which is the main purpose of the apparatus, and update all of the programs associated with each processor.

With respect to error handling processing, the mother processor and the plurality of daughter processors execute encoding processes for respectively different macroblocks in the above-described encoding apparatus. Therefore, a bitstream which is produced as result of the encoding will haphazardly contain results obtained from the respective processors. For example, if the mother processor executes a header production process in the slice layer or any higher layer as well as a macroblock encoding process, and two daughter processors ("daughter 1" and "daughter 2") each execute a macroblock encoding process, then a bitstream containing the results obtained by the three processors will be produced as shown in FIG. 36.

In the above-described encoding apparatus, the results obtained by the respective processors are joined without being checked, and become one bitstream. Therefore, there is a problem in that, if an abnormality occurs in any processor, the produced bitstream will become entirely unusable. For example, if an abnormality occurs in the "daughter 2" processor in the above-illustrated example, errors will occur in the hatched portions shown in FIG. 36. However, since each processor encodes an arbitrarily selected macroblock and the processing time required by processor is not constant, it is not easy to determine the presence/absence of errors in the produced bitstream or the position of any error. Thus, if an abnormality occurs in any processor, the produced bitstream is no longer usable. In order to obtain a correct bitstream, the cause of the abnormality in the processor must first be removed and thereafter an encoding process must be performed again.

Moreover, in the above-described encoding apparatus, it is not easy to determine, based on the produced bitstream, which one of the processors an abnormality has occurred in. Therefore, in order to detect an abnormal processor, it is necessary to first interrupt the encoding process and then perform an abnormality detection process for each processor. Accordingly, the maintenance of the apparatus will require an amount of time which is proportionate to the number of processors. In order to enhance the operation speed of encoding processes by introducing additional daughter processors, malfunctioning probability of the entire apparatus will increase for each additional processor. Therefore, a long actual processing time will be required (including that required for the reencoding process after an abnormality occurs) unless highly-reliable, expensive processors are employed. There is also a problem in that, if an abnormality occurs in the mother processor, the entire encoding processing will stop, so that the encoding process cannot be continued until a substitute mother processor becomes ready.

With respect to storage device configuration, the above-described encoding apparatus includes no particular features related to the storage device(s) accessed by each processor. Therefore, if a plurality of processors access the storage device(s) in parallel, this data access will bottleneck the processing speed of the moving picture encoding process.

SUMMARY OF THE INVENTION

Therefore, a first object of the present invention is to provide a moving picture encoding apparatus and method which permits processors to be added and/or deleted even during the execution of an encoding process, without requiring any processor dedicated to performing execution control over encoding processes. A second object of the present invention is to provide a moving picture encoding apparatus and method which can switch, add, or change an encoding process during an encoding process without affecting an encoding process which is being executed. A third object of the present invention is to provide a moving picture encoding apparatus and method which allows for easy repair or exchange of a processor by detecting an abnormal processor during an encoding process, and which is capable of continuing to perform an encoding process so long as at least one processor is normally functioning. A fourth object of the present invention is to provide a moving picture encoding apparatus and method comprising a storage device which can be rapidly accessed by a plurality of processors in parallel and which permits an encoding process to be performed rapidly.

The present invention has the following features to attain the above object.

A first aspect of the present invention is directed to a moving picture encoding apparatus comprising a plurality of processing units which operate in parallel, and a shared storage section which is commonly accessed by the plurality of processing units, wherein the shared storage section stores: moving picture data which is split in predetermined units for independently applying processes thereto; and with respect to each of the split units of moving picture data, data necessary for an encoding process and a progress of the encoding process, wherein each of the plurality of processing units comprises: next process selection means for, based on the progress of the encoding process as stored in the shared storage section, selecting one of the split units of moving picture data and a process to be next executed for the selected unit of moving picture data; and process execution means for executing the process selected by the next process selection means for the unit of moving picture data selected by the next process selection means.

Thus, according to the first aspect, each processing unit selects and executes a next process based on the progress of the encoding process as stored in the shared storage section. The selection and execution of a process by each processing unit is performed at an arbitrary point in time, independently of the operation of any other processing unit. Thus, since the execution control over encoding processes is distributed over a plurality of processing units, there is no need to provide a processing unit dedicated to providing execution control over encoding processes; neither is it necessary to achieve synchronization among the plurality of processing units. Therefore, the speed-enhancing effect of parallel processing is not defeated by a consecutively-performed execution control over encoding processes, whereby the performance of the apparatus can be improved. Since the plurality of processing units may all have the same configuration, the execution control over encoding processes itself can be simplified.

In a second aspect of the present invention based on the first aspect, the next process selection means selects one of a plurality of processes comprised in a moving picture encoding process as a process to be next executed.

Thus, according to the second aspect, each processing unit selects a process to be next executed each time executing a portion of a moving picture encoding process. By thus splitting a moving picture encoding process into a plurality of processes, such that the processing units perform respective split processes, the load on the respective processing units can be uniformed. As a result, the performance of the apparatus can be improved as compared to the case where each processing unit executes the entire moving picture encoding process.

In a third aspect of the present invention based on the first aspect, each processing unit further comprises individual storage means for storing data necessary for the process by the processing unit, and prior to executing the process selected by the next process selection means, the process execution means reads the data necessary for the process from the shared storage section and stores the data into the individual storage means, thereafter executes the process for the data stored in the individual storage means, and reads data obtained from the process from the individual storage means and stores the data into the shared storage section.

Thus, according to the third aspect, each processing unit copies data necessary for a process from the shared storage section to the individual storage section, and executes a selected process for the data which has been copied to the individual storage section. As a result, access from the processing units to the shared storage section is reduced, so that the data waiting time in each processing unit is decreased, whereby the performance of the apparatus can be improved.

In a fourth aspect of the present invention based on the third aspect, prior to executing the process selected by the next process selection means, if the data necessary for the process is not stored in the individual storage means, the process execution means reads the data necessary for the process from the shared storage section and stores the data into the individual storage means.

Thus, according to the fourth aspect, each processing unit does not access the shared storage section for data acquisition when the data necessary is stored in the individual storage section. As a result, access from the processing units to the shared storage section is further reduced, so that the data waiting time in each processing unit is further decreased, whereby the performance of the apparatus can be improved.

In a fifth aspect of the present invention based on the first aspect, the shared storage section further stores identification management information for managing identification information concerning the plurality of processing units, and each of the plurality of processing units comprises: processing unit addition means for acquiring an unused unit of identification information based on the identification management information; and processing unit deletion means for abandoning the identification information acquired by the processing unit addition means, wherein the next process selection means and the process execution means operate until the acquired identification information becomes abandoned.

Thus, according to the fifth aspect, each processing unit acquires and abandons identification information based on the identification management information stored in the shared storage section, and operates only while possessing identification information. The acquisition and abandonment of identification information by the processing unit is performed at an arbitrary point in time, independently of the operation of any other processing unit. Therefore, even while an encoding process is being executed by another processing unit, a processing unit can be added to or deleted from the apparatus at an arbitrary point in time, without affecting any other processing unit. Thus, when a problem occurs in a processing unit, for example, maintenance work for that processing unit can be performed without interrupting the encoding process performed by the entire apparatus.

In a sixth aspect of the present invention based on the fifth aspect, the processing unit deletion means, when determining based on the identification management information that the identification information acquired by the processing unit addition means has become invalid, abandons the identification information.

Thus, according to the sixth aspect, each processing unit abandons identification information as necessary, based on the identification management information stored in the shared storage section, and stops executing a process. The determination by the processing unit as to whether the identification information must be abandoned or not is made at an arbitrary point in time, independently of the operation of any other processing unit. Therefore, even while an encoding process is being executed by another processing unit, a processing unit can be deleted from the apparatus at an arbitrary point in time, without affecting any other processing unit. Thus, when a problem occurs in a processing unit, for example, the problematic processing unit can be deleted from the apparatus without interrupting the encoding process performed by the entire apparatus.

A seventh aspect of the present invention is directed to a moving picture encoding apparatus comprising a plurality of processing units which operate in parallel, and a shared storage section which is commonly accessed by the plurality of processing units, wherein the shared storage section stores: moving picture data to be encoded; data necessary for an encoding process of the moving picture data; and identification management information for managing identification information concerning the plurality of processing units, and each of the plurality of processing units comprises: processing unit addition means for acquiring an unused unit of identification information based on the identification management information; processing unit deletion means for abandoning the identification information acquired by the processing unit addition means; and encoding execution means for executing the encoding process for the moving picture data stored in the shared storage section until the acquired identification information becomes abandoned.

Thus, according to the seventh aspect, each processing unit acquires and abandons identification information based on the identification management information stored in the shared storage section, and operates only while possessing identification information. The acquisition and abandonment of identification information by the processing unit is performed at an arbitrary point in time, independently of the operation of any other processing unit. Therefore, even while an encoding process is being executed by another processing unit, a processing unit can be added to or deleted from the apparatus at an arbitrary point in time, without affecting any other processing unit. Thus, when a problem occurs in a processing unit, for example, maintenance work for that processing unit can be performed without interrupting the encoding process performed by the entire apparatus.

In an eighth aspect of the present invention based on the seventh aspect, the processing unit deletion means, when determining based on the identification management information that the identification information acquired by the processing unit addition means has become invalid, abandons the identification information.

Thus, according to the eighth aspect, each processing unit abandons identification information as necessary, based on the identification management information stored in the shared storage section, and stops executing a process. The determination by the processing unit as to whether the identification information must be abandoned or not is made at an arbitrary point in time, independently of the operation of any other processing unit. Therefore, even while an encoding process is being executed by another processing unit, a processing unit can be deleted from the apparatus at an arbitrary point in time, without affecting any other processing unit. Thus, when a problem occurs in a processing unit, for example, the problematic processing unit can be deleted from the apparatus without interrupting the encoding process performed by the entire apparatus.

A ninth aspect of the present invention is directed to a moving picture encoding apparatus comprising a plurality of processing units which operate in parallel, and a shared storage section which is commonly accessed by the plurality of processing units, wherein the shared storage section stores: a plurality of programs which are transferred to the plurality of processing units to be executed by the plurality of processing units; and functional information representing functions of the plurality of programs, wherein each of the plurality of processing units comprises: next process selection means for selecting one of a plurality of processes comprised in a moving picture encoding process as a process to be next executed; program update means for, based on the functional information stored in the shared storage section, selecting a program for executing the process selected by the next process selection means from the plurality of programs stored in the shared storage section, and transferring the selected program from the shared storage section; individual storage means for storing the program transferred from the shared storage section; and process execution means for executing the process selected by the next process selection means by using the program stored in the individual storage means.

Thus, according to the ninth aspect, each processing unit selects a program necessary for a next process based on functional information stored in the shared storage section, transfers the selected program, and executes the selected program. The selection, transfer, and execution of a program by each processing unit is performed at an arbitrary point in time, independently of the operation of any other processing unit. Therefore, each processing unit can select and execute a program necessary for a next process, without affecting the operation of any other processing unit. Thus, it is possible to switch, add, or change an encoding process during an encoding process without affecting an encoding process under execution.

A tenth aspect of the present invention based on the ninth aspect, the shared storage section further stores: moving picture data which is split in predetermined units for independently applying processes thereto; and with respect to each of the split units of moving picture data, data necessary for an encoding process and a progress of the encoding process, the next process selection means selects, based on the progress of the encoding process as stored in the shared storage section, one of the split units of moving picture data and a process to be next executed for the selected unit of moving picture data, and the process execution means executes the process selected by the next process selection means for the unit of moving picture data selected by the next process selection means.

Thus, according to the tenth aspect, each processing unit selects and executes a next process based on the progress of the encoding process as stored in the shared storage section. The selection and execution of a process by each processing unit is performed at an arbitrary point in time, independently of the operation of any other processing unit. Since execution control over encoding processes is performed by a plurality of processing units in a distributed manner, it is possible to perform a moving picture encoding process without need of a processing unit dedicated to providing execution control over encoding processes.

An eleventh aspect of the present invention based on the ninth aspect, the program update means selects the program for executing the process by comparing the functional information stored in the shared storage section against a function of the process selected by the next process selection means.

Thus, according to the eleventh aspect, each processing unit selects a program to be transferred by comparing functional information stored in the shared storage section against a function which is necessary for a next process. Therefore, when selecting a program, only functional information among the data stored in the shared storage section is used, while any other processing unit can freely access data other than the functional information. As a result, it is possible to select a program necessary for the next process without affecting an encoding process under execution.

A twelfth aspect of the present invention based on the ninth aspect, the program update means determines whether or not to transfer the selected program from the shared storage section by comparing a function of the program stored in the individual storage means against the function of the process selected by the next process selection means.

Thus, according to the twelfth aspect, each processing unit does not transfer a program from the shared storage section to the individual storage section if it is possible to perform a next process by employing a previously-acquired program. As a result, access from the processing units to the shared storage section is reduced, so that the waiting time for program transfer in each processing unit is decreased, whereby the performance of the apparatus can be improved.

A thirteenth aspect of the present invention is directed to a moving picture encoding apparatus comprising a plurality of processing units which operate in parallel, and a shared storage section which is commonly accessed by the plurality of processing units, wherein the shared storage section stores: moving picture data which is split in predetermined units for independently applying processes thereto; and with respect to each of the split units of moving picture data, data necessary for an encoding process and a progress of the encoding process, wherein each of the plurality of processing units comprises: next process selection means for, based on the progress of the encoding process as stored in the shared storage section, selecting one of the split units of moving picture data and a process to be next executed for the selected unit of moving picture data; process execution means for executing the process selected by the next process selection means for the unit of moving picture data selected by the next process selection means; abnormality detection means for detecting an abnormality occurring in the process executed by the process execution means; and process stopping means for, when the abnormality detection means detects an abnormality, stopping the encoding process executed by the next process selection means and the process execution means.

Thus, according to the thirteenth aspect, each processing unit selects and executes a next process based on the progress of the encoding process as stored in the shared storage section, and stops itself from operating if an abnormality occurs during the execution of the selected process. The selection and execution of a process, abnormality detection, and stopping of operating by each processing unit is performed at an arbitrary point in time, independently of any other processing unit. Therefore, a processing unit which has experienced an abnormality can be detected during an encoding process, without need of a processing unit dedicated to providing execution control over encoding processes. As a result, it is possible to easily repair or exchange a processing unit even during an encoding process, and continue the encoding process so long as at least one processing unit is operating normally.

A fourteenth aspect of the present invention based on the thirteenth aspect, the abnormality detection means detects an abnormality occurring in the process executed by the process execution means based on an encoding result of the moving picture data obtained by the process execution means.

Thus, according to the fourteenth aspect, a processing unit which has experienced an abnormality is detected based on a bitstream produced in the moving picture encoding process. Since an abnormality will generally occur in the bitstream when an abnormality occurs in a moving picture encoding process, a processing unit which has experienced an abnormality can be easily detected during an encoding process.

In a fifteenth aspect of the present invention based on the fourteenth aspect, the abnormality detection means detects an abnormality occurring in the process executed by the process execution means based on a size of the encoding result of the moving picture data obtained by the process execution means.

Thus, according to the fifteenth aspect, a processing unit which has experienced an abnormality is detected based on the size of the bitstream produced in the moving picture encoding process. Since the size of the bitstream may become abnormal when an abnormality occurs in a moving picture encoding process, it becomes possible to easily detect a processing unit which has experienced an abnormality.

In a sixteenth aspect of the present invention based on the fourteenth aspect, the abnormality detection means detects an abnormality occurring in the process executed by the process execution means by checking a syntax of the encoding result of the moving picture data obtained by the process execution means.

Thus, according to the sixteenth aspect, a processing unit which has experienced an abnormality is detected by checking the syntax of a bitstream produced in the moving picture encoding process. Since the syntax of the bitstream may become abnormal when an abnormality occurs in a moving picture encoding process, it becomes possible to easily detect a processing unit which has experienced an abnormality.

In a seventeenth aspect of the present invention based on the thirteenth aspect, the abnormality detection means detects an abnormality occurring in the process executed by the process execution means based on a processing time required by the process execution means.

Thus, according to the seventeenth aspect, a processing unit which has experienced an abnormality is detected based on the time required for each process. Since a moving picture encoding process will include a large number of standard processes and processes which will require a predictable amount of time, it becomes possible to easily detect a processing unit which has experienced an abnormality.

In an eighteenth aspect of the present invention based on the seventeenth aspect, the shared storage section further stores a count value for abnormality detection with respect to each of the split units of moving picture data, each of the plurality of processing units further comprises count value update means for updating the count value, the process execution means initializes the count value for the selected unit of moving picture data, prior to executing the process selected by the next process selection means for the unit of moving picture data selected by the next process selection means, and the abnormality detection means determines that an abnormality has occurred in the process executed by the process execution means if the count value having been initialized by the process execution means is equal to or greater than a predetermined value when the process executed by the process execution means is completed.

Thus, according to the eighteenth aspect, a count value stored in the shared storage section is updated by each processing unit, and a processing unit which has experienced an abnormality is detected by using the count value. Therefore, it is possible to detect processing unit which has experienced an abnormality by calculating an approximation of the time required for the process, without the need to activate a timer in each processor.

In a nineteenth aspect of the present invention based on the thirteenth aspect, the abnormality detection means records, when determining that an abnormality has occurred in the process executed by the process execution means, the occurrence of the abnormality in the progress of the encoding process as stored in the shared storage section, and when selecting one of the split units of moving picture data and a process to be next executed for the selected unit of moving picture data based on the progress of the encoding process as stored in the shared storage section, the next process selection means gives a higher priority to the process with respect to which the occurrence of the abnormality is recorded.

Thus, according to the nineteenth aspect, the occurrence of an abnormality in a processing unit is recorded in the shared storage section, and each processing unit executes any process which has experienced an abnormality with a higher priority. By thus ensuring that a process which has experienced an abnormality is executed by another processing unit at an early time, it becomes possible to safely and securely execute a moving picture encoding process.

A twentieth aspect of the present invention is directed to a moving picture encoding apparatus comprising a plurality of processing units which operate in parallel, and a shared storage section which is commonly accessed by the plurality of processing units, wherein the shared storage section comprises: a plurality of image storage sections for storing, in a distributed manner, moving picture data which is split in predetermined units for independently applying processes thereto; and a parameter storage section for storing, with respect to each of the split units of moving picture data, data necessary for an encoding process and a progress of the encoding process, the parameter storage section being accessible independently of the plurality of image storage sections, and each of the plurality of processing units comprises: next process selection means for, based on the progress of the encoding process as stored in the parameter storage section, selecting one of the split units of moving picture data and a process to be next executed for the selected unit of moving picture data, and process execution means for executing the process selected by the next process selection means for the unit of moving picture data selected by the next process selection means.

Thus, according to the twentieth aspect, moving picture data is stored in a distributed manner into a plurality of image storage sections, and each processing unit accesses the moving picture data stored in such a distributed manner. By storing the moving picture data in a distributed manner so as to forestall competition in the access from the processing units, the access from the processing units can be prevented from bottlenecking the encoding processes. Thus, it becomes possible to perform a moving picture encoding process rapidly.

In a twenty-first aspect of the present invention based on the twentieth aspect, the moving picture encoding apparatus further comprises an image inputting section for inputting the moving picture data to be encoded, wherein the next process selection means switches between at least two phases of a process selection method during the encoding process, the at least two phases including: a first phase, in which a process including a motion vector search is selected as the process to be next executed; and a second phase following the first phase, in which a process not including any known motion vector searches is selected as the process to be next executed, and a result of the motion vector search obtained in the first phase is utilized, and when the next process selection means is in the first phase, the process execution means reads the unit of moving picture data selected by the next process selection means from the image inputting section, executes the process selected by the next process selection means, and writes the moving picture data having been read to one of the plurality of image storage sections; and when the next process selection means is in the second phase, the process execution means reads the unit of moving picture data selected by the next process selection means from the image storage section, and executes the process selected by the next process selection means.

Thus, according to the twenty-first aspect, moving picture data which is inputted from the image inputting section is stored in a distributed manner into a plurality of image storage sections during the execution of a motion vector search. Thereafter, each processing unit performs an encoding process for the moving picture data which has been stored in a distributed manner. The calculation tasks bottleneck the processing of a motion vector search, whereas input/output bottlenecks the processes after the motion vector search. Therefore, the period of executing a motion vector search, which does not involve much input/output processing, can be effectively utilized for storing moving picture data in a distributed manner to a plurality of image storage sections, in preparation for rapidly performing the processes after the motion vector search which do involve substantial input/output processing. As a result, the input/output processing is prevented from bottlenecking the processes after the motion vector search. Thus, it becomes possible to perform a moving picture encoding process rapidly.

In a twenty-second aspect of the present invention based on the twenty-first aspect, the next process selection means switches the process selection method from the first phase to the second phase after a process in the first phase has been selected with respect to every moving picture data inputted from the image inputting section.

Thus, according to the twenty-second aspect, it is possible to begin processes after a motion vector search after a motion vector search has been performed for all moving picture data.

In a twenty-third aspect of the present invention based on the twentieth aspect, the shared storage section further comprises an encoding result storage section for storing an encoding result of the moving picture data, the encoding result storage section being accessible independently of the plurality of image storage sections and the parameter storage section, and with respect to a newly obtained encoding result of the moving picture data, the process execution means joins the newly obtained encoding result to the encoding result stored in the encoding result storage section if all preceding encoding results are stored in the encoding result storage section, and otherwise writes the newly obtained encoding result to the encoding result storage section, without joining the newly obtained encoding result with the encoding result stored in the encoding result storage section.

Thus, according to the twenty-third aspect, each processing unit determines whether or not a newly obtained encoding result can be joined with an encoding result stored in the encoding result storage section, and joins the newly obtained encoding result if it is possible to do so, and otherwise writes the newly obtained encoding result to the encoding result storage section for later joining. The joining process for this encoding result will be handled by another processing unit. Therefore, even in the case where encoding results are to be joined in an order which is different from the order in which they are produced, a given processing unit does not need to wait for another processing unit to produce an encoding result, but can begin another executable process. As a result, it becomes possible to perform a moving picture encoding process rapidly.

A twenty-fourth aspect of the present invention is directed to a moving picture encoding method employing a plurality of processing units which operate in parallel, and a shared storage section which is commonly accessed by the plurality of processing units, comprising: a data storage step, performed by the shared storage section, of storing: moving picture data which is split in predetermined units for independently applying processes thereto, and with respect to each of the split units of moving picture data, data necessary for an encoding process and a progress of the encoding process; a next process selection step, performed by each of the plurality of processing units based on the progress of the encoding process as stored in the shared storage section, of selecting one of the split units of moving picture data and a process to be next executed for the selected unit of moving picture data; and a process execution step, performed by each of the plurality of processing units, of executing the process selected by the next process selection step for the unit of moving picture data selected by the next process selection step.

Thus, according to the twenty-fourth aspect, each processing unit selects and executes a next process based on the progress of the encoding process as stored in the shared storage section. The selection and execution of a process by each processing unit is performed at an arbitrary point in time, independently of the operation of any other processing unit. Thus, since the execution control over encoding processes is distributed over a plurality of processing units, there is no need to provide a processing unit dedicated to providing execution control over encoding processes; neither is it necessary to achieve synchronization among the plurality of processing units. Therefore, the speed-enhancing effect of parallel processing is not defeated by a consecutively-performed execution control over encoding processes, whereby the performance of the apparatus can be improved. Since the plurality of processing units may all have the same configuration, the execution control over encoding processes itself can be simplified.

A twenty-fifth aspect of the present invention is directed to a moving picture encoding method employing a plurality of processing units which operate in parallel, and a shared storage section which is commonly accessed by the plurality of processing units, comprising: a data storage step, performed by the shared storage section, of storing: moving picture data to be encoded, data necessary for an encoding process of the moving picture data, and identification management information for managing identification information concerning the plurality of processing units; a processing unit addition step, performed by each of the plurality of processing units, of acquiring an unused unit of identification information based on the identification management information; a processing unit deletion step, performed by each of the plurality of processing units, of abandoning the identification information acquired in the processing unit addition step; and an encoding execution step, performed by each of the plurality of processing units, of executing the encoding process for the moving picture data stored in the shared storage section until the acquired identification information becomes abandoned.

Thus, according to the twenty-fifth aspect, each processing unit acquires and abandons identification information based on the identification management information stored in the shared storage section, and operates only while possessing identification information. The acquisition and abandonment of identification information by the processing unit is performed at an arbitrary point in time, independently of the operation of any other processing unit. Therefore, even while an encoding process is being executed by another processing unit, a processing unit can be added to or deleted from the apparatus at an arbitrary point in time, without affecting any other processing unit. Thus, when a problem occurs in a processing unit, for example, maintenance work for that processing unit can be performed without interrupting the encoding process performed by the entire apparatus.

A twenty-sixth aspect of the present invention is directed to a moving picture encoding method employing a plurality of processing units which operate in parallel, and a shared storage section which is commonly accessed by the plurality of processing units, comprising: a program storage step, performed by the shared storage section, of storing: a plurality of programs which are transferred to the plurality of processing units to be executed by the plurality of processing units, and functional information representing functions of the plurality of programs; a next process selection step, performed by each of the plurality of processing units, of selecting one of a plurality of processes comprised in a moving picture encoding process as a process to be next executed; a program update step, performed by each of the plurality of processing units based on the functional information stored in the shared storage section, of selecting a program for executing the process selected by the next process selection step from the plurality of programs stored in the shared storage section, and transferring the selected program from the shared storage section; an individual storage step, performed by each of the plurality of processing units, of storing the program transferred from the shared storage section; and a process execution step, performed by each of the plurality of processing units, of executing the process selected by the next process selection step by using the program stored by the individual storage step.

Thus, according to the twenty-sixth aspect, each processing unit selects a program necessary for a next process based on functional information stored in the shared storage section, transfers the selected program, and executes the selected program. The selection, transfer, and execution of a program by each processing unit is performed at an arbitrary point in time, independently of the operation of any other processing unit. Therefore, each processing unit can select and execute a program necessary for a next process, without affecting the operation of any other processing unit. Thus, it is possible to switch, add, or change an encoding process during an encoding process without affecting an encoding process under execution.

A twenty-seventh aspect of the present invention is directed to a moving picture encoding method employing a plurality of processing units which operate in parallel, and a shared storage section which is commonly accessed by the plurality of processing units, comprising: a data storage step, performed by the shared storage section, of storing: moving picture data which is split in predetermined units for independently applying processes thereto, and with respect to each of the split units of moving picture data, data necessary for an encoding process and a progress of the encoding process; a next process selection step, performed by each of the plurality of processing units based on the progress of the encoding process as stored in the shared storage section, of selecting one of the split units of moving picture data and a process to be next executed for the selected unit of moving picture data; a process execution step, performed by each of the plurality of processing units, of executing the process selected by the next process selection step for the unit of moving picture data selected by the next process selection step; an abnormality detection step, performed by each of the plurality of processing units, of detecting an abnormality occurring in the process executed by the process execution step; and a process stopping step, performed by each of the plurality of processing units when the abnormality detection step detects an abnormality, of stopping the encoding process executed by the next process selection step and the process execution step.

Thus, according to the twenty-seventh aspect, each processing unit selects and executes a next process based on the progress of the encoding process as stored in the shared storage section, and stops itself from operating if an abnormality occurs during the execution of the selected process. The selection and execution of a process, abnormality detection, and stopping of operating by each processing unit is performed at an arbitrary point in time, independently of any other processing unit. Therefore, a processing unit which has experienced an abnormality can be detected during an encoding process, without need of a processing unit dedicated to providing execution control over encoding processes. As a result, it is possible to easily repair or exchange a processing unit even during an encoding process, and continue the encoding process so long as at least one processing unit is operating normally.

A twenty-eighth aspect of the present invention is directed to a moving picture encoding method employing a plurality of processing units which operate in parallel, and a shared storage section which is commonly accessed by the plurality of processing units, comprising: an image storage step, performed by the shared storage section, of storing, in a distributed manner, moving picture data which is split in predetermined units for independently applying processes thereto; a parameter storage step, performed by the shared storage section, of storing: with respect to each of the split units of moving picture data, data necessary for an encoding process and a progress of the encoding process, so as to be accessible independently of the moving picture data stored by the image storage step; a next process selection step, performed by each of the plurality of processing units based on the progress of the encoding process as stored by the parameter storage step, of selecting one of the split units of moving picture data and a process to be next executed for the selected unit of moving picture data; and a process execution step, performed by each of the plurality of processing units, of executing the process selected by the next process selection step for the unit of moving picture data selected by the next process selection step.

Thus, according to the twenty-eighth aspect, moving picture data is stored in a distributed manner into a plurality of image storage sections, and each processing unit accesses the moving picture data stored in such a distributed manner. By storing the moving picture data in a distributed manner so as to forestall competition in the access from the processing units, the access from the processing units can be prevented from bottlenecking the encoding processes. Thus, it becomes possible to perform a moving picture encoding process rapidly.

A twenty-ninth aspect of the present invention is directed to a program for causing a computer to function as a moving picture encoding apparatus, the computer comprising a plurality of processing units which operate in parallel, and a shared storage section which is commonly accessed by the plurality of processing units, wherein the shared storage section stores: moving picture data which is split in predetermined units for independently applying processes thereto; and with respect to each of the split units of moving picture data, data necessary for an encoding process and a progress of the encoding process, wherein the program comprises, so as to be executed by each of the plurality of processing units: a next process selection step of, based on the progress of the encoding process as stored in the shared storage section, selecting one of the split units of moving picture data and a process to be next executed for the selected unit of moving picture data; and a process execution step of executing the process selected by the next process selection step for the unit of moving picture data selected by the next process selection step.

A thirtieth aspect of the present invention is directed to a program for causing a computer to function as a moving picture encoding apparatus, the computer comprising a plurality of processing units which operate in parallel, and a shared storage section which is commonly accessed by the plurality of processing units, wherein the shared storage section stores: moving picture data to be encoded; data necessary for an encoding process of the moving picture data; and identification management information for managing identification information concerning the plurality of processing units, wherein the program comprises, so as to be executed by each of the plurality of processing units: a processing unit addition step of acquiring an unused unit of identification information based on the identification management information; a processing unit deletion step of abandoning the identification information acquired in the processing unit addition step; and an encoding execution step of executing the encoding process for the moving picture data stored in the shared storage section until the acquired identification information becomes abandoned.

A thirty-first aspect of the present invention is directed to a program for causing a computer to function as a moving picture encoding apparatus, the computer comprising a plurality of processing units which operate in parallel, and a shared storage section which is commonly accessed by the plurality of processing units, wherein the shared storage section stores: a plurality of process programs which are transferred to the plurality of processing units to be executed by the plurality of processing units; and functional information representing functions of the plurality of process programs, wherein the program comprises, so as to be executed by each of the plurality of processing units: a next process selection step of selecting one of a plurality of processes comprised in a moving picture encoding process as a process to be next executed; a program update step of, based on the functional information stored in the shared storage section, selecting a process program for executing the process selected by the next process selection step from the plurality of process programs stored in the shared storage section, and transferring the selected process program from the shared storage section; an individual storage step of storing the process program transferred from the shared storage section; and a process execution step of executing the process selected by the next process selection step by using the process program stored in the individual storage step.

A thirty-second aspect of the present invention is directed to a program for causing a computer to function as a moving picture encoding apparatus, the computer comprising a plurality of processing units which operate in parallel, and a shared storage section which is commonly accessed by the plurality of processing units, wherein the shared storage section stores: moving picture data which is split in predetermined units for independently applying processes thereto; and with respect to each of the split units of moving picture data, data necessary for an encoding process and a progress of the encoding process, wherein the program comprises, so as to be executed by each of the plurality of processing units: a next process selection step of, based on the progress of the encoding process as stored in the shared storage section, selecting one of the split units of moving picture data and a process to be next executed for the selected unit of moving picture data; a process execution step of executing the process selected by the next process selection step for the unit of moving picture data selected by the next process selection step; an abnormality detection step of detecting an abnormality occurring in the process executed by the process execution step; and a process stopping step of, when the abnormality detection step detects an abnormality, stopping the encoding process executed by the next process selection step and the process execution step.

A thirty-third aspect of the present invention is directed to a program for causing a computer to function as a moving picture encoding apparatus, the computer comprising a plurality of processing units which operate in parallel, and a shared storage section which is commonly accessed by the plurality of processing units, wherein the shared storage section stores, in a distributed manner, moving picture data which is split in predetermined units for independently applying processes thereto, and, with respect to each of the split units of moving picture data, data necessary for an encoding process and a progress of the encoding process, so as to be accessible independently of the moving picture data, wherein the program comprises, so as to be executed by each of the plurality of processing units: a next process selection step of, based on the progress of the encoding process as stored in the shared storage section, selecting one of the split units of moving picture data and a process to be next executed for the selected unit of moving picture data, and a process execution step of executing the process selected by the next process selection step for the unit of moving picture data selected by the next process selection step.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a diagram showing the details of program management information in the moving picture encoding apparatus according to the third embodiment of the present invention;

FIG. 15 is a table illustrating the content of a process performed by the moving picture encoding apparatus according to the third embodiment of the present invention;

FIG. 29 is a timing diagram illustrating a manner in which each processor in the moving picture encoding apparatus according to the fourth embodiment of the present invention operates;

FIG. 30 is a diagram showing the detail structure of a shared storage section in the moving picture encoding apparatus according to the fifth embodiment of the present invention;

FIG. 31 is a diagram illustrating the details of control parameters used in the moving picture encoding apparatus according to the fifth embodiment of the present invention;

FIG. 36 is a diagram illustrating an abnormal bitstream produced by a conventional moving picture encoding apparatus.

DESCRIPTION OF THE PREFERRED EMBODIMENTS (System Structure of the Moving Picture Encoding Apparatus)

Figure 1:
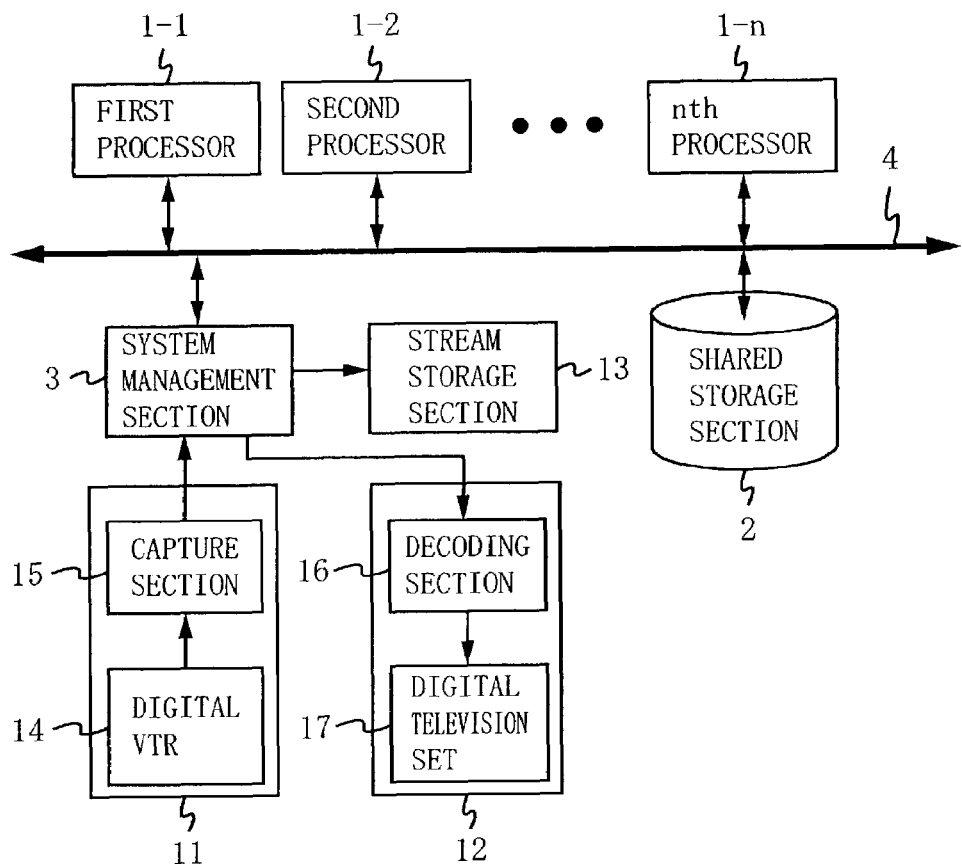
FIG. 1 is a block diagram illustrating the structure of a moving picture encoding apparatus according to first to fifth embodiments of the present invention.

FIG. 1 is a block diagram illustrating the structure of a moving picture encoding apparatus according to first to fifth embodiments of the present invention. The moving picture encoding apparatus shown in FIG. 1 includes n processors 1-1 to 1-n (where n is a natural number), a shared storage section 2, a system management section 3, a network 4, an image inputting section 11, an image outputting section 12, and a stream storage section 13. The n processors 1-1 to 1-n, the shared storage section 2, and the system management section 3 are connected to a network 4 provided in the apparatus. The moving picture encoding apparatus encodes moving picture data which is stored in the shared storage section 2 in a parallel manner employing n processors 1-1 to 1-n.

The processor 1 can be implemented as a personal computer, for example. Alternatively, the processor 1 may be a computer specially designed for moving picture encoding, or a general-purpose engineering workstation. The shared storage section 2 may be implemented as a hard disk device, for example. The network 4 may be implemented as a bus or a local area network, for example.

The shared storage section 2 stores programs and data necessary for encoding processes. Before the execution of an encoding process, the shared storage section 2 stores an encoding process program, moving picture data to be encoded, and control information to be referred to during the encoding process. Programs stored in the shared storage section 2 are downloaded to the respective processors 1. In accordance with the downloaded program, each processor 1 reads out moving picture data and control information from the shared storage section 2, performs a predetermined encoding process, and writes intermediate results from the encoding process or a bitstream obtained as a result of the encoding process to the shared storage section 2. The intermediate results from the encoding process may include, for example, GOP (Group of Pictures) structures and/or motion vectors.

Figure 2:
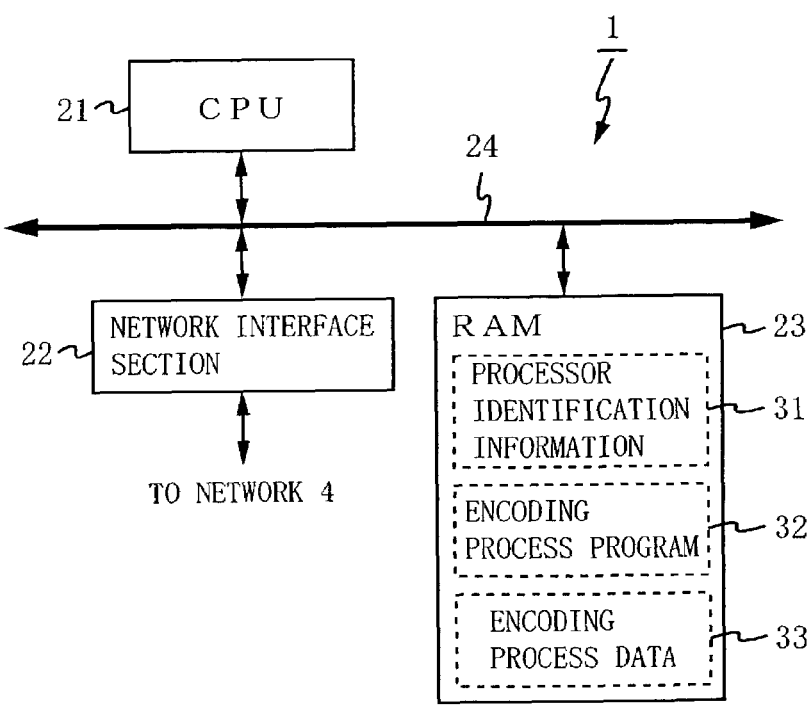
FIG. 2 is a diagram illustrating the detailed structure of each processor in a moving picture encoding apparatus according to the first to fifth embodiments of the present invention.

FIG. 2 is a diagram illustrating the detailed structure of the processor 1. As shown in FIG. 2, the processor 1 comprises a CPU 21, a network interface section 22, a PAM 23, and a local bus 24. The CPU 21, the network interface section 22, and the RAM 23 are coupled to the local bus 24 within the processor 1. It is to be understood that each of the n processors 1-1 to 1-n shown in FIG. 1 has the structure shown in FIG. 2.

The CPU 21, which is a main computation unit for the processor 1, operates in accordance with an encoding process program 32 stored in the RAM 23. The network interface section 22 couples the network 4 to the local bus 24. The RAM 23, which is a storage device provided in each processor 1, stores processor identification information 31, the encoding process program 32 and encoding process data 33. The processor identification information 31 is identification information which is assigned for identifying each processor 1. The encoding process program 32 is a program downloaded from the shared storage section 2. The encoding process data 33 is the data which is necessary for the processor 1 to perform an encoding process. The encoding process data 33 includes moving picture data to be encoded, control information to be referred to during the encoding process, intermediate results from the encoding process, and a bitstream of the encoding result.

Referring back to FIG. 1, the system management section 3, which includes an input section (not shown) for receiving a command input, handles processes such as data input/output in accordance with an inputted command. For example, the system management section 3 performs a process of transferring moving picture data to be encoded from the image inputting section 11 to the shared storage section 2, and a process of transferring a bitstream of an encoding result from the shared storage section 2 to the image outputting section 12 and the stream storage section 13. Although the system management section 3 is illustrated to be separate from the n processors 1-1 to 1-n in FIG. 1, the system management section 3 may instead be provided in any of the n processors 1-1 to 1-n.

The image inputting section 11 includes a digital VTR 14 and a capture section 15. Moving picture data to be encoded is recorded in the digital VTR 14. The capture section 15 converts a video signal outputted from the digital VTR 14 into a predetermined format. The video signal after conversion is transferred to the shared storage section 2 via the network 4, under the control of the system management section 3.

The image outputting section 12 includes a decoding section 16 and a digital television set 17. A bitstream stored in the shared storage section 2 is transferred to the decoding section 16 via the network 4, under the control of the system management section 3. The decoding section 16 decodes the transferred bitstream and outputs a reproduced video signal. The digital television set 17 displays the reproduced video signal outputted from the decoding section 16 on a screen. This allows a user of the moving picture encoding apparatus to evaluate the quality of the image represented by the reproduced video signal.

The stream storage section 13 is constructed so that a detachable storage medium (not shown) can be attached thereto. The bitstream which is stored in the shared storage section 2 is transferred to the stream storage section 13 via the network 4, under the control of the system management section 3. The stream storage section 13 writes the transferred bitstream to the detachable storage medium. As the stream storage section 13, a digital VTR or a disk recording device can be used, for example.

The moving picture encoding apparatus shown in FIG. 1 includes features as follows. In the moving picture encoding apparatus shown in FIG. 1, moving picture data to be encoded is stored in the shared storage section 2 in split units which are individually encodable. An encoding process is divided into a plurality of unit processes such as feature extraction, scene detection, GOP structure determination, motion vector search, temporary encoding, bit allocation, and final encoding (i.e., the encoding to be performed after the temporary encoding). After completing a given unit process, each processor 1 arbitrarily selects a split unit of moving picture data, selects a unit process which is executable for the selected unit of moving picture data at that point, and executes the selected unit process. The selection and execution of a unit process in each processor 1 are performed at an arbitrary point in time, independently of the operation of any other processor.

Thus, since the execution control over encoding processes is distributed over the n processors 1-1 to 1-n, there is no need to provide a processor dedicated to management purposes, (i.e., for solely handling execution control over encoding processes); neither is it necessary to achieve synchronization among the n processors 1-1 to 1-n. Therefore, the speed-enhancing effect of parallel processing is not defeated by a consecutively-performed execution control over encoding processes, whereby the performance of the apparatus can be improved. Since the n processors 1-1 to 1-n may all have the same configuration, the execution control over encoding processes itself can be simplified.

Hereinafter, the features of the moving picture encoding apparatus illustrated in FIG. 1 will be described by way of five embodiments. The first and second embodiments will describe a mechanism for adding or deleting a processor during an encoding process. The third embodiment will describe a mechanism for switching, adding, or changing an encoding process during an encoding process. The fourth embodiment will describe a mechanism for detecting an abnormal processor during an encoding process. The fifth embodiment will describe the detailed structure of the shared storage section. In the following description, it is assumed that MPEG is adopted as the encoding method and moving picture data is split in sequence units as defined under MPEG, resulting in s sequences (where s is a natural number).

First Embodiment

In addition to the above-described execution control over encoding processes, a moving picture encoding apparatus according to a first embodiment of the present invention is characterized in that processor identification information is dynamically assigned so that a processor can be added or deleted during an encoding process, and that malfunctioning processors can be detected by employing generation numbers (defined below).

Figure 3:
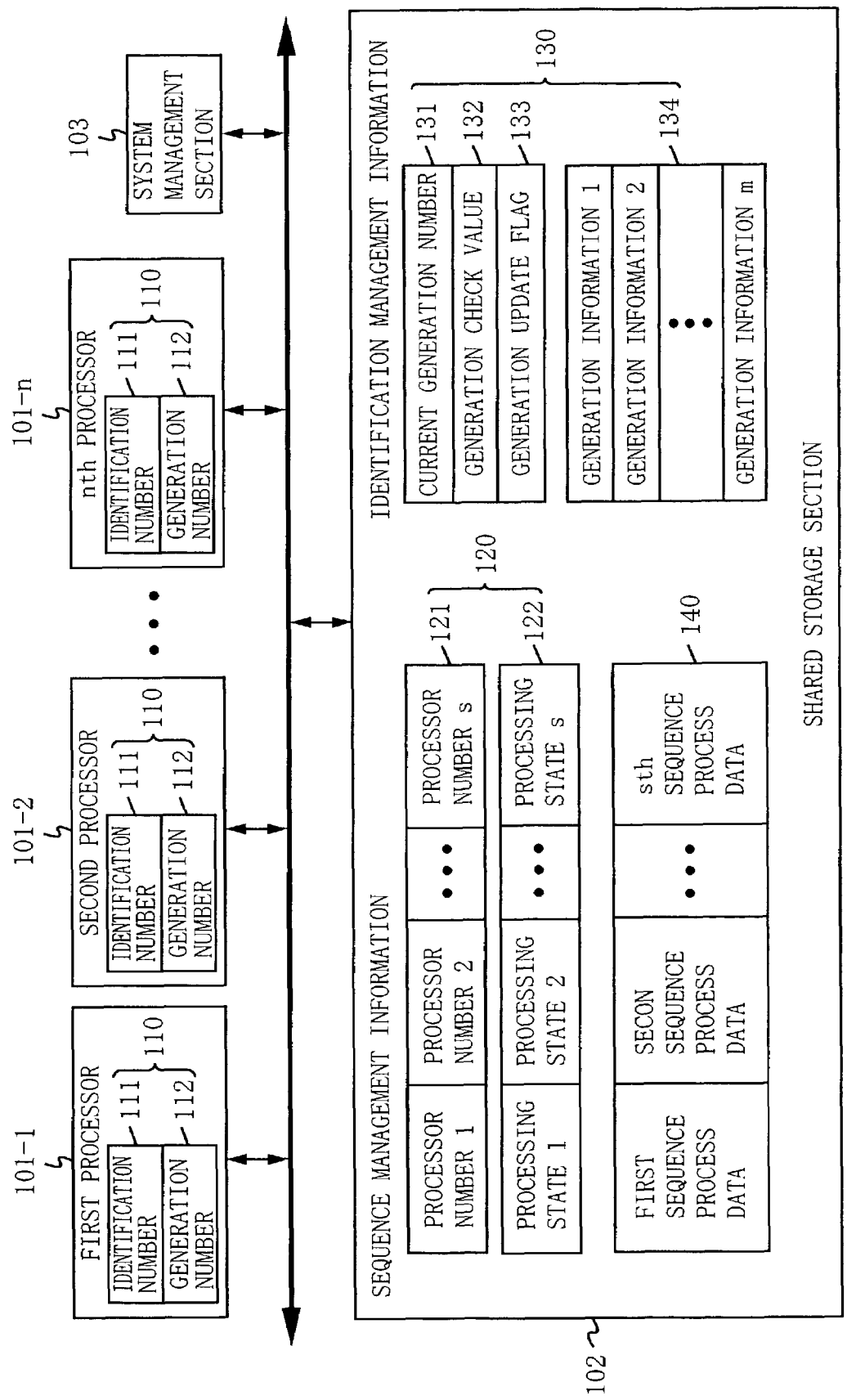
FIG. 3 is a data structure chart for the moving picture encoding apparatus according to the first embodiment of the present invention.

FIG. 3 is a data structure chart for the moving picture encoding apparatus according to the first embodiment of the present invention. FIG. 3 specifically shows n processors 101-1 to 101-n and a shared storage section 102, which correspond to the processors 1-1 to 1-n and the shared storage section 2, respectively, shown in FIG. 1. FIG. 3 also shows a system management section 103, which corresponds to the system management section 3 shown in FIG. 1. FIG. 3 only shows data which is essential for the description of the features of the present embodiment, while omitting any other data. As shown in FIG. 3, each processor 101 stores processor identification information 110. The processor identification information 110, which is a more detailed representation of the processor identification information 31 shown in FIG. 2, contains an identification number 111 and a generation number 112. The identification number 111 is one of numbers 1 to m (as prepared in the entire apparatus) that has been acquired by this particular processor 101. The identification number 111 takes one of the values 1 to m while an encoding process is under execution, and takes "0" while no encoding process is in progress. The generation number 112 is employed for detecting a malfunctioning of the processor 101, as described later.

As shown in FIG. 3, the shared storage section 102 stores sequence process data 140 for each of the s sequences. The $i^{th}$ sequence process data 140 includes all data that is necessary for the encoding of an $i^{th}$ sequence, e.g., moving picture data, control information, intermediate results, and a bitstream.

The shared storage section 102 also stores sequence management information 120 and identification management information 130. The sequence management information 120 includes a processor number 121 and a processing state 122 for each of the s sequences. The processor number 121 is the identification number of a processor which is currently executing a unit process for that sequence. The processing state 122 indicates a unit process which is currently executed for that sequence.

The identification management information 130 includes a current generation number 131, a generation check value 132, a generation update flag 133, and m units of generation information 134. The current generation number 131 represents a current generation number. The generation check value 132 is used for checking whether the current generation number 131 is valid or not. The generation update flag 133 indicates whether the current generation number 131 has been updated or not There are m units of generation information 134 (where m is the number of identification numbers). When an identification number 111 "i" is acquired by a given processor 101, the current generation number 131 at that moment is set in an $i^{th}$ unit of generation information 134.

Figure 4:
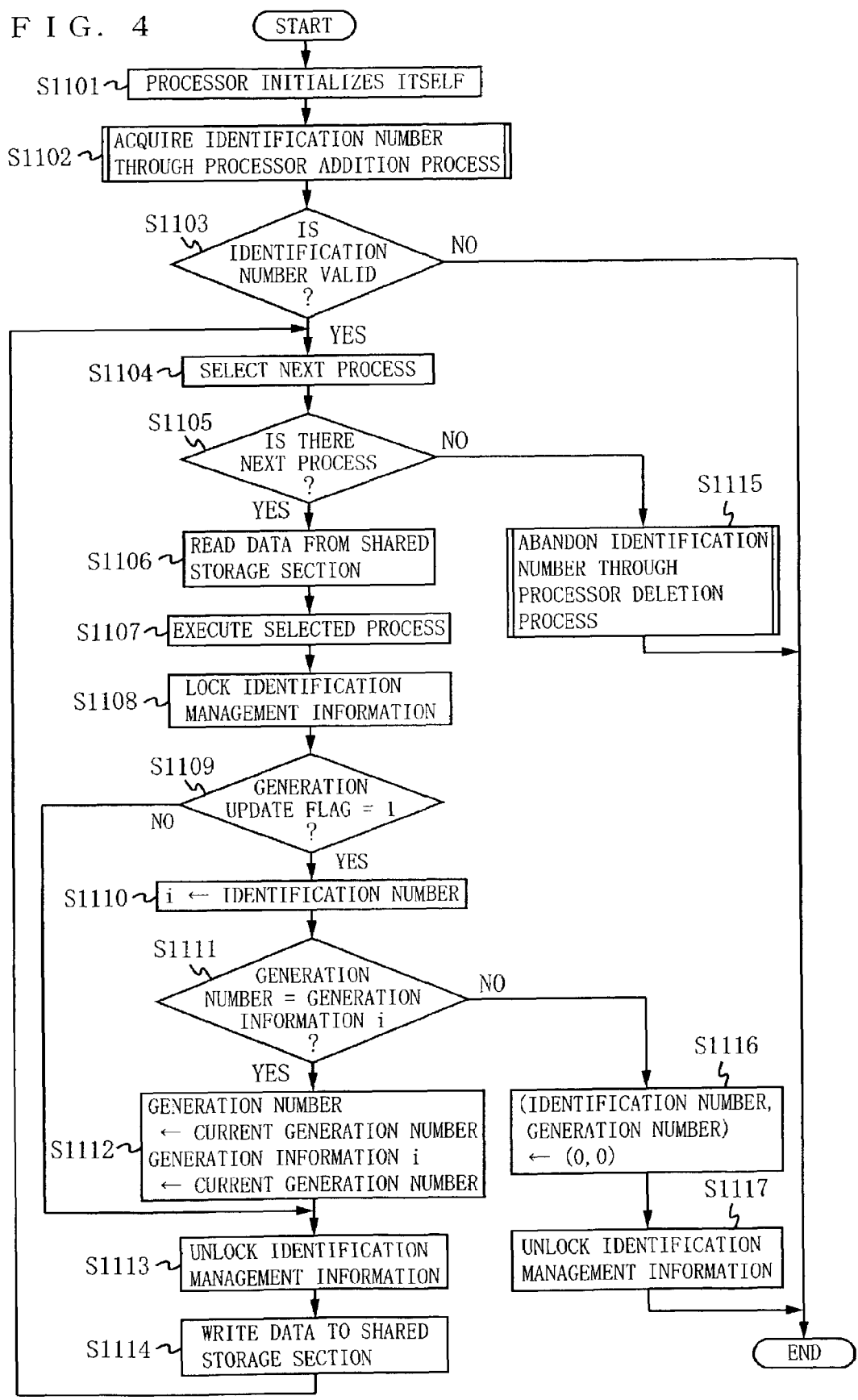
FIG. 4 is a flowchart illustrating a main process executed by each processor in the moving picture encoding apparatus according to the first embodiment of the present invention.

FIG. 4 is a flowchart illustrating the main process executed by each processor 101. When executing the encoding process program 32 shown in FIG. 2, each of the n processors 101-1 to 101-n operates in accordance with the flowchart shown in FIG. 4. The outline of the main process is as follows. Prior to executing the encoding process, the processor 101 executes a processor addition process (FIG. 5) to acquire one of the m identification numbers prepared in the entire apparatus. Thereafter, the processor 101 repetitively selects a unit process to be next executed and executes the selected unit process, and so on. When the encoding process has been completed with respect to every sequence, the processor 101 executes a processor deletion process (FIG. 6) to abandon its acquired identification number.

The current generation number 131 stored in the shared storage section 102 is occasionally updated by one. If the processor 101 detects that the current generation number 131 has been updated by the time when a unit process is completed, the processor 101 updates its own generation number 112 in accordance with the current generation number 131. Any processor 101 which fails to update its generation number 112 after a predetermined period of time since the update of the current generation number 131 is regarded as malfunctioning, and the identification number used by such a malfunctioning processor is abandoned (i.e., no longer occupied).

The details of the steps shown in FIG. 4 are as follows. Once activated, the processor 101 first performs an initialization process for itself (step S1101). In the initialization process, the processor 101 performs processes such as initialization of the encoding process data within the RAM (encoding process data 33 shown in FIG. 2). Next, the processor 101 performs the processor addition process (described later with reference to FIG. 5) to acquire an identification number 111 (step S1102).

Then, the processor 101 determines whether the acquired identification number 111 is valid or not (step S1103). If the acquired identification number 111 is not valid (following the "NO" path from step S1103), the processor 101 ends the process because no more processors can be added. If the acquired identification number 111 is valid (following the "YES" path from step S1103), the processor 101 proceeds to step S1104 to execute an encoding process in parallel with any other processor already in operation.

Next, the processor 101 selects a next process in accordance with a predetermined criterion (step S1104). In other words, based on information such as priorities assigned to the respective sequences, the processor 101 selects a sequence to be next processed, and from among the unit processes which are executable with respect to the selected sequence, selects one unit process as the next process.

Next, the processor 101 determines whether a next process exists or not (step S1105). If there exists no next process (following the "NO" path from step S1105), then the process has been completed with respect to all sequences, and therefore the processor 101 abandons its identification number 111 through a processor deletion process (FIG. 6; described later) (step S1115), and ends the process.

If a next process exists (following the "YES" path from step S1105), the processor 101 reads data which is necessary for executing the selected process from the shared storage section 102, and writes it to the processor's own RAM (i.e., the RAM 23 shown in FIG. 2) (step S1106). For example, with respect to the selected sequence, the processor 101 reads moving picture data, control information, intermediate results, and the like from the shared storage section 102 and writes these to its own RAM.

Then, the processor 101 executes the selected process (step S1107). Specifically, for the data which is on its own RAM, the processor 101 performs a unit process such as feature extraction, scene detection, GOP structure determination, motion vector search, temporary encoding, bit allocation, or final encoding, and writes the results therefrom to its own RAM.

Before writing the obtained results to the shared storage section 102, the processor 101 executes a generation management process from step S1108 to S1113. In the generation management process, the processor 101 first locks the identification management information 130 (step S1108). Then, the processor 101 determines whether the current generation number 131 has been updated or not (step S1109). Specifically, the processor 101 determines that the current generation number 131 has been updated if the generation update flag 133 is "1", and otherwise determines that the current generation number 131 has not been updated. If the current generation number 131 has not been updated (following the "NO" path from step S1109), the processor 101 immediately proceeds to step S1113.

If the current generation number 131 has been updated (following the "YES" path from step S1109), the processor 101 substitute its own identification number 111 for a variable i (step S1110), and determines whether or not its own generation number 112 coincides with the $i^{th}$ generation information 134 (step S1111). In the $i^{th}$ generation information 134, the current generation number 131 which existed at the time when the processor 101 acquired the identification number 111 is usually set; once the processor 101 malfunctions, "0" is set instead. Therefore, if the generation number 112 coincides with the $i^{th}$ generation information 134 (following the "YES" path from step S1111), the processor 101 sets the current generation number 131 both in its own generation number 112 and in the $i^{th}$ generation information 134, in order to continue on the encoding process (step S1112). On the other hand, if the generation number 112 does not coincide with the $i^{th}$ generation information 134 (following the "NO" path from step S1111), the processor 101 sets "0" in both its own identification number 111 and generation number 112 in order to stop the encoding process (step S1116), and unlocks the identification management information 130 (step S1117), thereby ending the process.

When continuing on the encoding process, the processor 101 unlocks the identification management information 130 (step S1113), reads the result obtained at step S1107 from its own RAM, and writes it to the shared storage section 102 (step S1114). Thereafter, the processor 101 proceeds to step S1104 and again executes the process from step S1104. The reason why the generation management process is executed after completing the predetermined process at step S1107 and before writing the obtained result to the shared storage section 102 is to prevent any results obtained at the malfunctioning processor from being written to the shared storage section 102.

Hereinafter, the processor addition process and the processor deletion process in accordance with the moving picture encoding apparatus of the present embodiment will be described. In the processor addition process shown in FIG. 5, the processor 101 first locks the identification management information 130 (step S1201). Next, the processor 101 performs a predetermined computation f for the current generation number 131, and compares the derived value against the generation check value 132 (step S1202). The predetermined computation f is selected so that, the result of the computation f for the current generation number 131 does not coincide with the generation check value 132 unless the identification management information 130 is initialized. For example, a bit-by-bit negation (NOT) can be employed as the computation f. By thus selecting the computation f, it becomes possible to determine that the identification management information 130 has already been initialized if the result of the computation f for the current generation number 131 coincides with the generation check value 132, and otherwise determine that the identification management information 130 has not been initialized yet. If the two values coincide, the processor 101 proceeds to step S1204, and otherwise proceeds to step S1203.

If step S1202 finds that the two values do not coincide (following the "NO" path from step S1202), the processor 101 determines that it is the first, among all processors in the apparatus, that is executing a processor addition process, and initializes the identification management information 130 (step S1203). Specifically, the processor 101 sets "1" in the current generation number 131, sets the result of the computation f for the current generation number (i.e., "1") in the generation check value 132, and sets "0" in the generation update flag 133 and the m units of generation information 134.

Next, through the process from step S1204 to S1207, the processor 101 determines the number of one of the m units of generation information 134 that is unused, i.e., has "0". More specifically, the processor 101 sets "1" in the variable i (step S1204), and checks whether the $i^{th}$ generation information 134 is "0" or not (step S1205). If the $i^{th}$ generation information 134 is "0" (following the "YES" path from step S1205), the processor 101 proceeds to step S1208. Otherwise (following the "NO" path from step S1205), the processor 101 proceeds to step S1206, and if the variable i is less than m (i.e., the number of identification numbers) (following the "YES" path from step S1206), adds one to the variable i (step S1207), and proceeds to step S1205.

If any unused generation information 134 is found (following the "YES" path from step S1205), the processor 101 sets the obtained number i and the current generation number 131 in its own identification number 111 and the generation number 112, respectively, and sets the current generation number 131 in the $i^{th}$ generation information 134 (step S1208). If there is no unused generation information 134 (following the "NO" path from step S1206), the processor 101 sets "0" in its own identification number 111 (step S1209). In this case, since it is possible that another processor may already be using the number i as an identification number, the processor 101 sets no value in the $i^{th}$ generation information 134.

Lastly, the processor 101 unlocks the identification management information 130 (step S1210), thereby completing the processor addition process. As described above, if a valid identification number is acquired in the processor addition process, the processor 101 selects a next process, and executes the selected process (the process from step S1104 to S1114 in FIG. 4), this loop being repeated. Thus, any processor 101 that has acquired a valid identification number 111 is incorporated into the encoding apparatus.

Figure 6:
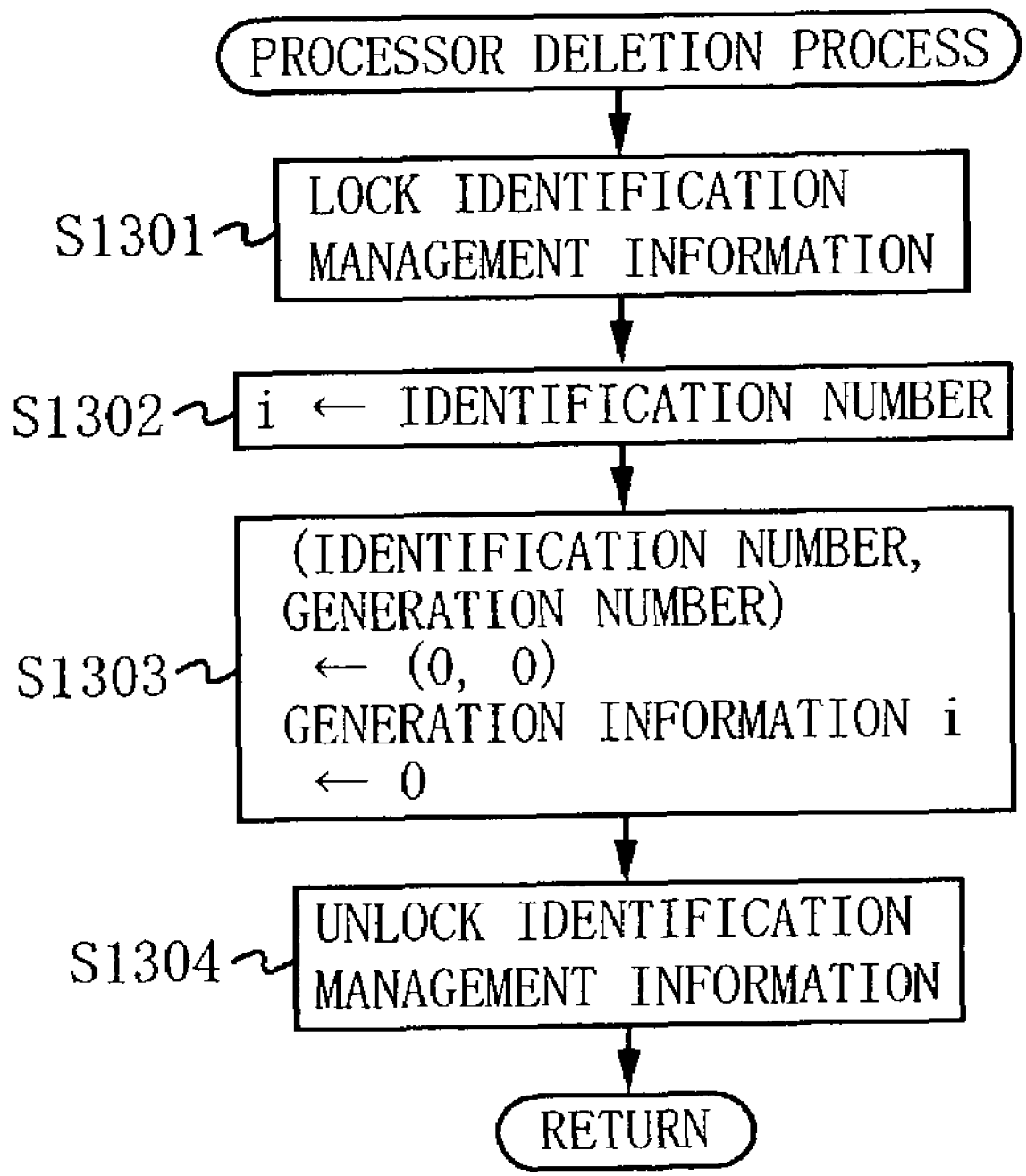
FIG. 6 is a flowchart illustrating a processor deletion process executed by each processor in the moving picture encoding apparatus according to the first embodiment of the present invention.

In the processor deletion process shown in FIG. 6, the processor 101 first locks the identification management information 130 (step S1301), and substitutes its own identification number 111 for a variable i (step S1302). Next, the processor 101 sets "0" in its own identification number 111 and generation number 112 as well as the $i^{th}$ generation information 134 (step S1303). Lastly, the processor 101 unlocks the identification management information 130 (step S1304), thereby ending the processor deletion process.

Through the processor deletion process shown in FIG. 6 or through the process of step S1116 in FIG. 4, the processor 101 abandons the hitherto-used identification number 111. Any processor 101 that has abandoned its hitherto-used identification number 111 is disengaged from the encoding apparatus. Any processor 101 that has been disengaged from the apparatus may execute a processor addition process at an arbitrary point in time to acquire a valid identification number 111, in order to be reincorporated into the encoding apparatus.

Figure 5:
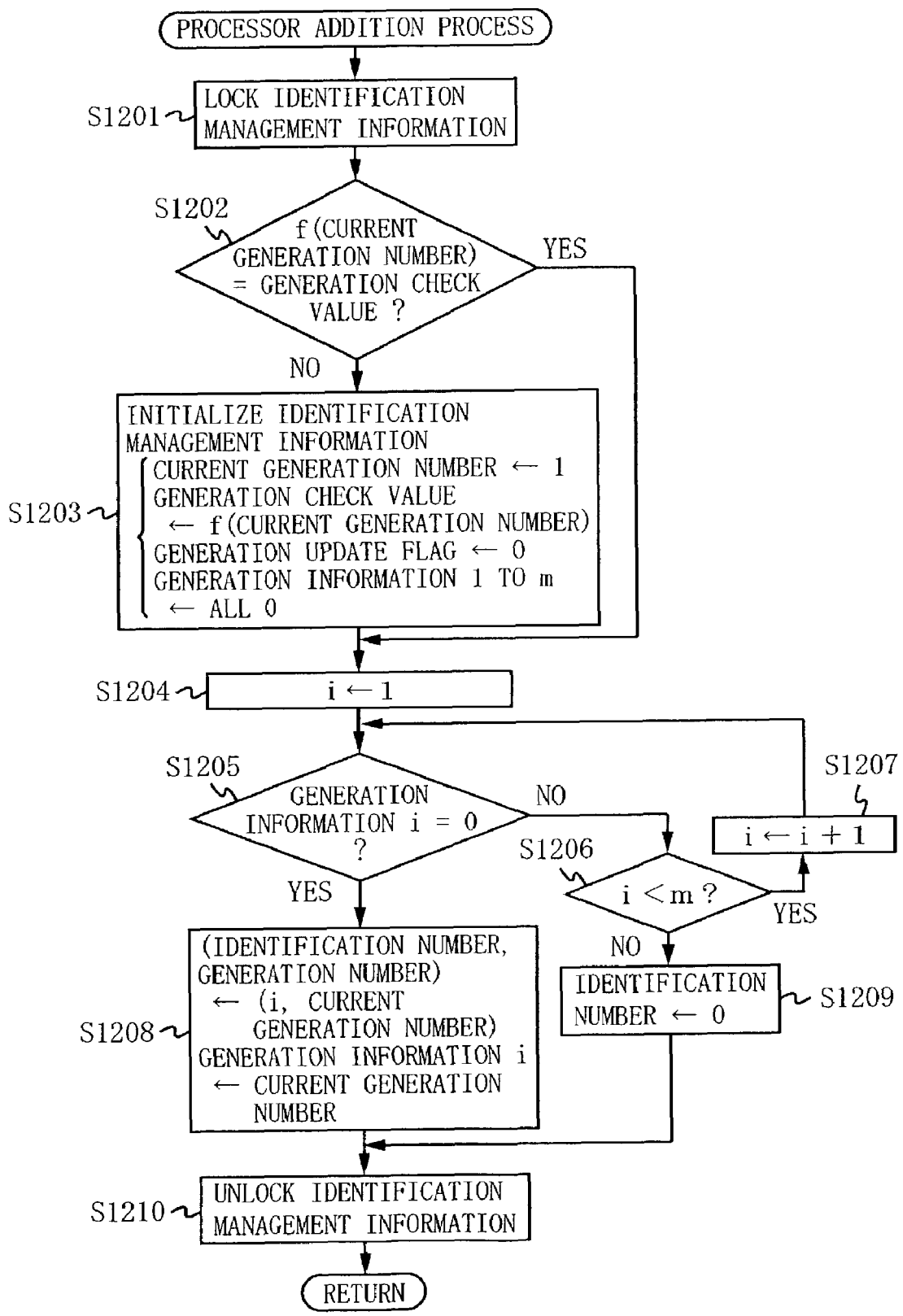
FIG. 5 is a flowchart illustrating a processor addition process executed by each processor in the moving picture encoding apparatus according to the first embodiment of the present invention.

In accordance with the processor addition process shown in FIG. 5 and the processor deletion process shown in FIG. 6, the processor 101 performs exclusive control for the identification management information 130 only when executing a processor addition process or a processor deletion process. Therefore, even if another processor happens to be accessing other data in the shared storage section 102 in order to execute the encoding process, the processor addition/deletion processes will not prevent such access. As a result, each processor can execute processor addition/deletion processes at arbitrary points in time, without affecting the encoding process executed by any other processor.

Figure 7:
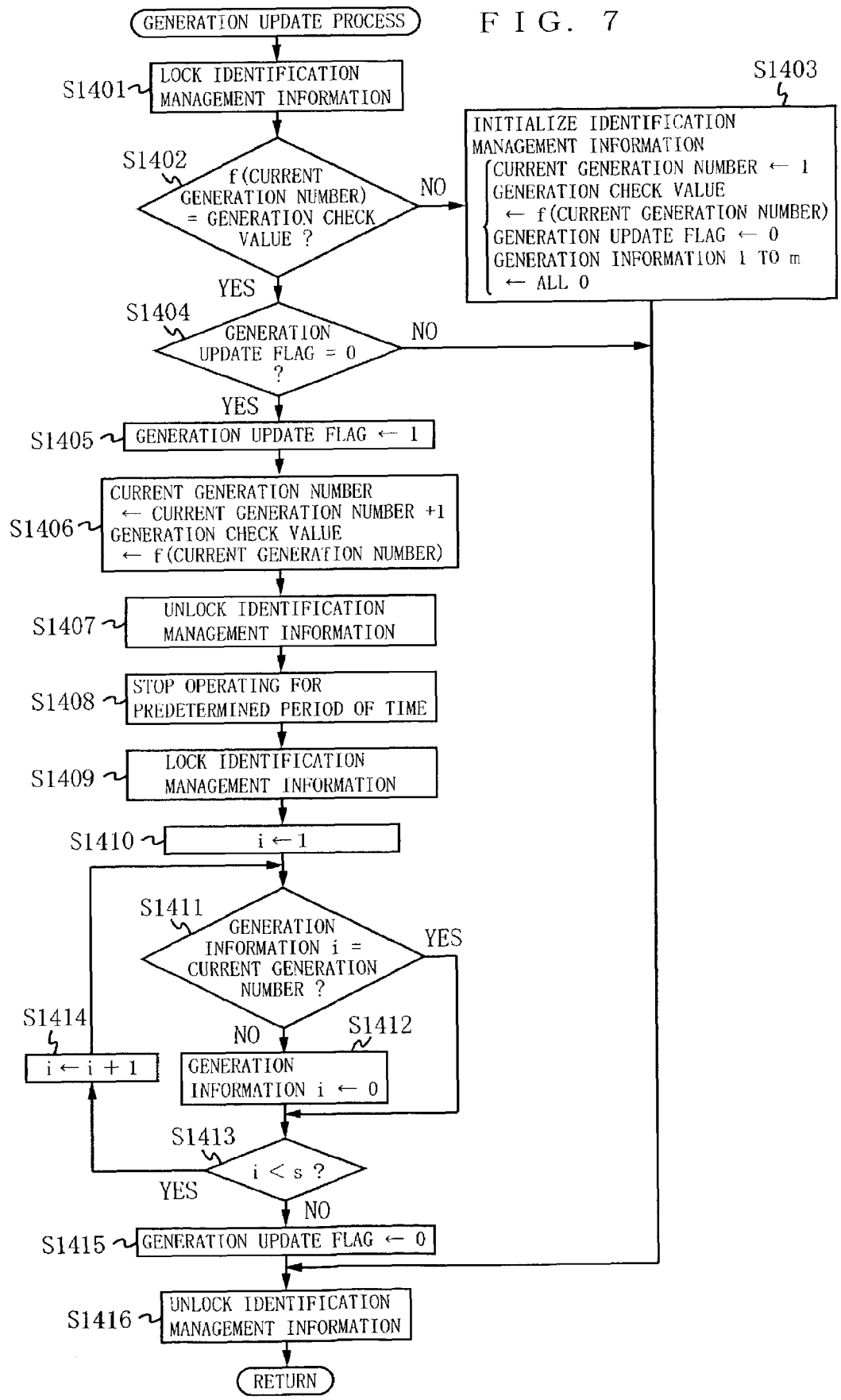
FIG. 7 is a flowchart illustrating a generation update process by the moving picture encoding apparatus according to the first embodiment of the present invention.

Next, a method for detecting a malfunctioning processor by employing generation numbers will be described. FIG. 7 is a flowchart illustrating a generation update process by the moving picture encoding apparatus according to the present embodiment. In order to disengage a malfunctioning processor from the apparatus, the system management section 103 performs a generation update process in response to the inputting of a predetermined command or at predetermined intervals. Alternatively, a step of calling the generation update process may be inserted at any appropriate portion in the flowchart of FIG. 4, so that the processor 101 will execute a generation update process at predetermined intervals. Although the following description illustrates the case where the generation update process is executed by the system management section 103, the same will also apply to the case where the generation update process is executed by the processor 101.

In the generation update process shown in FIG. 7, the system management section 103 first locks the identification management information 130 (step S1401). Next, the system management section 103 compares a result of a predetermined computation f for the current generation number 131 against the generation check value 132, and proceeds to step S1404 if the two values coincide, and otherwise proceeds to step S1403 (step S1402).

If the two values do not coincide (following the "NO" path from step S1402), the system management section 103 determines that the generation number has not been initialized yet, and therefore initializes the identification management information 130 (step S1403) and proceeds to step S1416. Steps S1402 and S1403 in FIG. 7 are identical to steps S1202 and S1203 in FIG. 5, respectively, and the descriptions thereof are omitted.

If step S1402 finds that the two values coincide (following the "YES" path from step S1402), the system management section 103 determines whether the generation update flag 133 is "0" or not (step S1404). If the generation update flag 133 is not "0" (following the "NO" path from step S1404), the system management section 103 determines that another processor is currently executing a generation update process, and proceeds to step S1416 without updating the current generation number 131. On the other hand, if the generation update flag 133 is "0" (following the "YES" path from step S1404), the system management section 103 proceeds to step S1405 to update the current generation number 131.

Next, in order to indicate that a generation update process is being executed, the system management section 103 sets "1" in the generation update flag 133 (step S1405). Then, the system management section 103 adds one to the current generation number 131, and sets the result of the computation f for the current generation number 131 after the addition in the generation check value 132 (step S1406). As a result, the current generation number 131 is updated by one each time, and the generation check value 132 is concurrently updated.

Next, the system management section 103 unlocks the identification management information 130 (step S1407), and stops operating for a predetermined period of time (step S1408). The predetermined period of time observed at step S1408 is set at a value within which a normally-functioning processor 101 is expected to be able to complete the process selected at step S1104 in FIG. 4. Therefore, assuming that the identification number 111 of the processor 101 is "i", the $i^{th}$ generation information 134 which exists at the time when the system management section 103 has reached step S1408 will coincide with the current generation number 131 so long as the processor 101 is normally functioning. On the other hand, if the processor 101 has not completed the selected process when the system management section 103 reaches step S1408 due to malfunctioning of the processor 101, the $i^{th}$ generation information 134 will not coincide with the current generation number 131.

Accordingly, once resuming operation from the stopped state, the system management section 103 locks the identification management information 130 (step S1409), and thereafter sets "0" which indicates "invalid data", in any unit of generation information 134 that does not coincide with the current generation number 131. More specifically, the system management section 103 substitutes "1" for a variable i (step S1410), and if the $i^{th}$ generation information 134 does not coincide with the current generation number 131 (following the "NO" path from step S1411), sets "0" in the $i^{th}$ generation information 134 (step S1412). Next, if the variable i is less than s (i.e., the number of sequences) (following the "YES" path from step S1413), the system management section 103 adds one to the variable i (step S1414) and proceeds to step S1411. Through the process from step S1410 to S1413, if any processor 101 is found that has not updated its own generation number 112 (assuming that such a processor 101 has an identification number "i"), the $i^{th}$ generation information 134 is "0". If its own generation number 112 does not coincide with the $i^{th}$ generation information 134, the processor 101 abandons the acquired generation number and ends the process (steps S1116 and S1117 in FIG. 4). Thus, the malfunctioning processor 101 is disengaged from the apparatus.

Next, the system management section 103 sets "0" in the generation update flag 133 in order to indicate that the generation update process has been completed (step S1415). Lastly, the system management section 103 unlocks the identification management information 130 (step S1416), thereby ending the generation update process.

Thus, in accordance with the generation update process shown in FIG. 7, the system management section 103 or the processor 101 keeps updating the current generation number 131 by one each time, and the identification number 111 used by any processor 101 that does not update its generation number 112 even after a predetermined period of time since the update of the current generation number 131 is abandoned. The abandoned identification number may be later used by another processor 101. Therefore, even during the execution of an encoding process, a malfunction occurring in a processor 101 can be detected and the malfunctioning processor 101 can be "deleted" from the apparatus, without affecting the encoding process executed by any other processor 101.

It may be possible, after a generation update process is performed, for a first processor having a current generation number 131 existing before the update and a second processor having a current generation number 131 resulting after the update to use the same identification number 111 and execute an encoding process at the same time. Even in such a case, since the shared storage section 102 stores data necessary for encoding processes in a sequence-by-sequence manner, the first and second processors will write their respective obtained results to different regions in the shared storage section 102. Therefore, the generation update process which is performed in order to detect malfunctioning processors will not unfavorably affect the encoding process executed by any of the n processors 101-1 to 101-n.

As described above, in accordance with the moving picture encoding apparatus of the present embodiment, execution control over encoding processes is performed in a distributed manner by a plurality of processors. Therefore, there is no need to provide a processor dedicated to management purposes (i.e., for solely handling execution control over encoding processes) neither is it necessary to achieve synchronization among processors. Each processor acquires or abandons identification information based on the identification management information stored in the shared storage section, and operates only while possessing identification information. The acquisition and abandonment of identification information by the processor is performed at an arbitrary point in time, independently of the operation of any other processor. Therefore, even while an encoding process is being executed by another processor, a processor can be added to or deleted from the apparatus at an arbitrary point in time, without affecting any other processor. Thus, when a problem occurs in a processor, for example, maintenance work for that processor can be performed without interrupting the encoding process performed by the entire apparatus.

Second Embodiment

In the second embodiment, a next-process selection process and processing states which are stored in the shared storage section will be described in detail.

Figure 8:
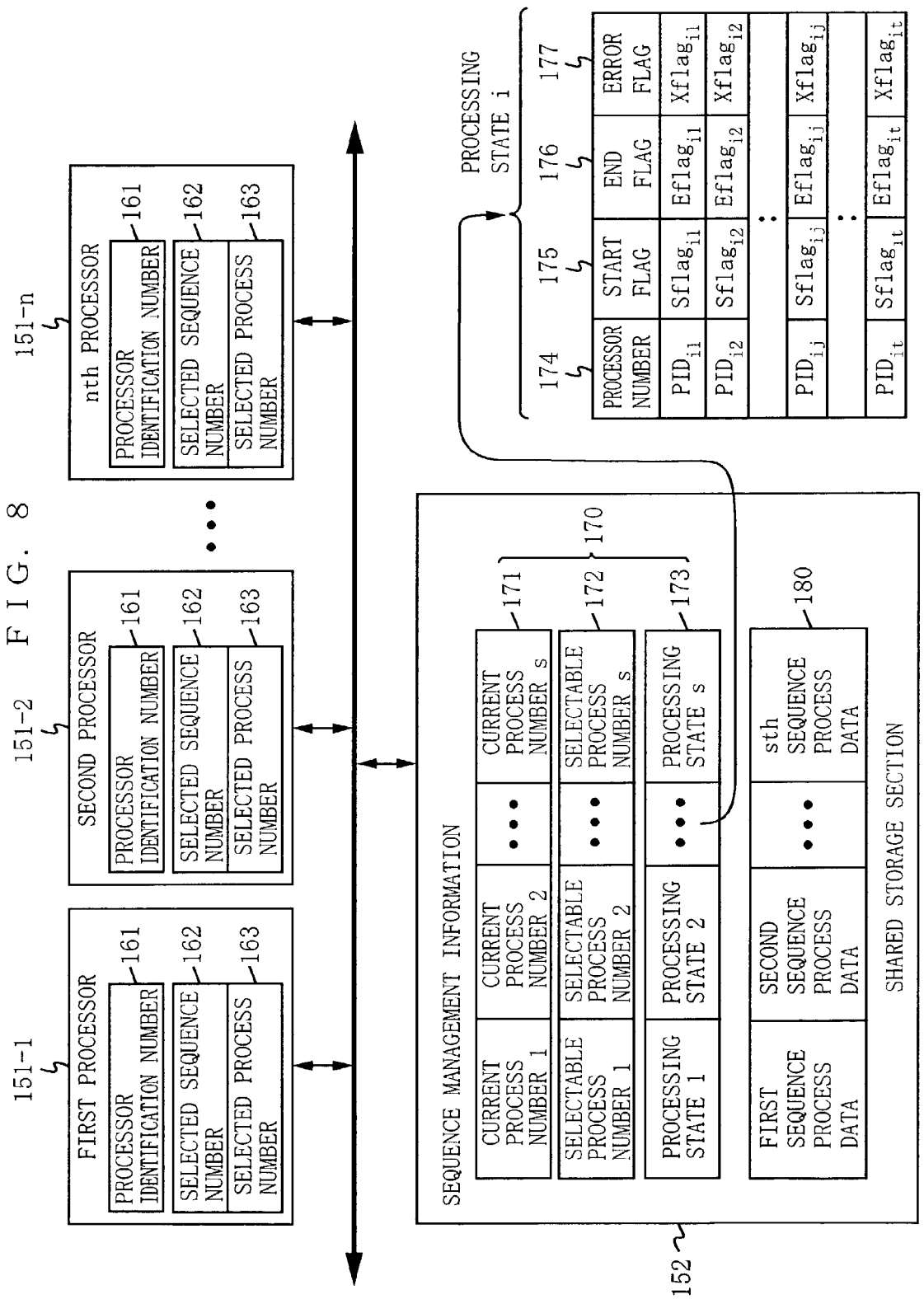
FIG. 8 is a data structure chart for the moving picture encoding apparatus according to the second embodiment of the present invention.

FIG. 8 is a data structure chart for the moving picture encoding apparatus of the present embodiment. FIG. 8 shows n processors 151-1 to 151-n and shared storage section 152, which are more detailed representations of the processors 1-1 to 1n and the shared storage section 2, respectively, shown in FIG. 1. FIG. 8 only shows data which is essential for the description of the features of the present embodiment, while omitting any other data. As shown in FIG. 8, each processor 151 stores processor identification information 161, a selected sequence number 162, and a selected process number 163. The processor identification information 161 corresponds to the processor identification information 31 shown in FIG. 2. The processor identification information 161 may be uniquely assigned to each processor 151 in advance, or may be dynamically acquired by each processor as illustrated in the first embodiment.

In the moving picture encoding apparatus shown in FIG. 8, the encoding process is divided into a plurality of unit processes, and each processor 151 selects a sequence and a unit process which is executable for that sequence, and executes the selected process. The selected sequence number 162 is the number of a sequence selected by the processor 151. The selected process number 163 is the number of a unit process selected by the processor 151. In the present embodiment, it is assumed that the encoding process is divided into t unit processes (where t is a natural number).

As shown in FIG. 8, the shared storage section 152 stores first to $s^{th}$ sequence process data 180 for each of the s sequences. The sequence process data according to the present embodiment is the same as that according to the first embodiment, and the description thereof is omitted.

The shared storage section 152 stores sequence management information 170, in order to monitor and control the progress of encoding processes. For each of the s sequences, the sequence management information 170 contains a current process number 171, a selectable process number 172, and a processing state 173. The current process number 171 is the number of a unit process which is currently executed with respect to a given sequence. The selectable process number 172 is the number of a unit process which a next processor can select for the given sequence. The current process number 171 and the selectable process number 172 each take any of values from 1 to t (i.e., the number of unit processes).

For each unit process, the processing state 173 contains a processor number 174, a start flag 175, an end flag 176, and an error flag 177. The $j^{th}$ elements of each data are summarized as follows. The processor number 174 is the processor identification information 161 of the processor 151 which executes a $j^{th}$ unit process. The start flag 175 takes "0" until the $j^{th}$ unit process is begun, and takes "1" once the $j^{th}$ unit process is begun. The end flag 176 takes "0" until the $j^{th}$ unit process is finished, and takes "1" once the $j^{th}$ unit process is finished. The error flag 177 takes "0" until an error occurs in the $j^{th}$ unit process, and takes "1" once an error occurs in the $j^{th}$ unit process. These data are updated by the processor 151, as described later.

Figure 9:
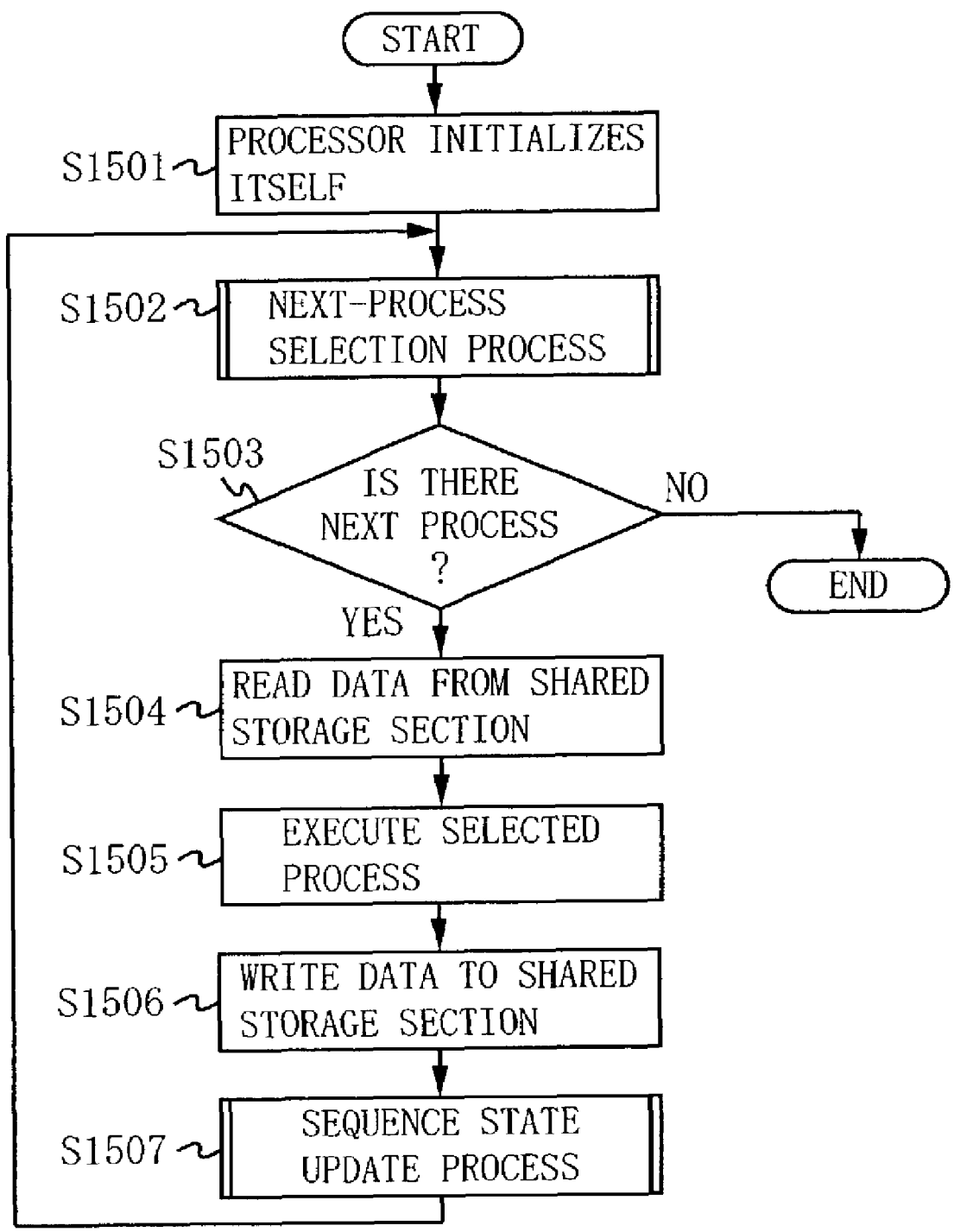
FIG. 9 is a flowchart illustrating a main process executed by each processor in the moving picture encoding apparatus according to the second embodiment of the present invention.
Figure 10:
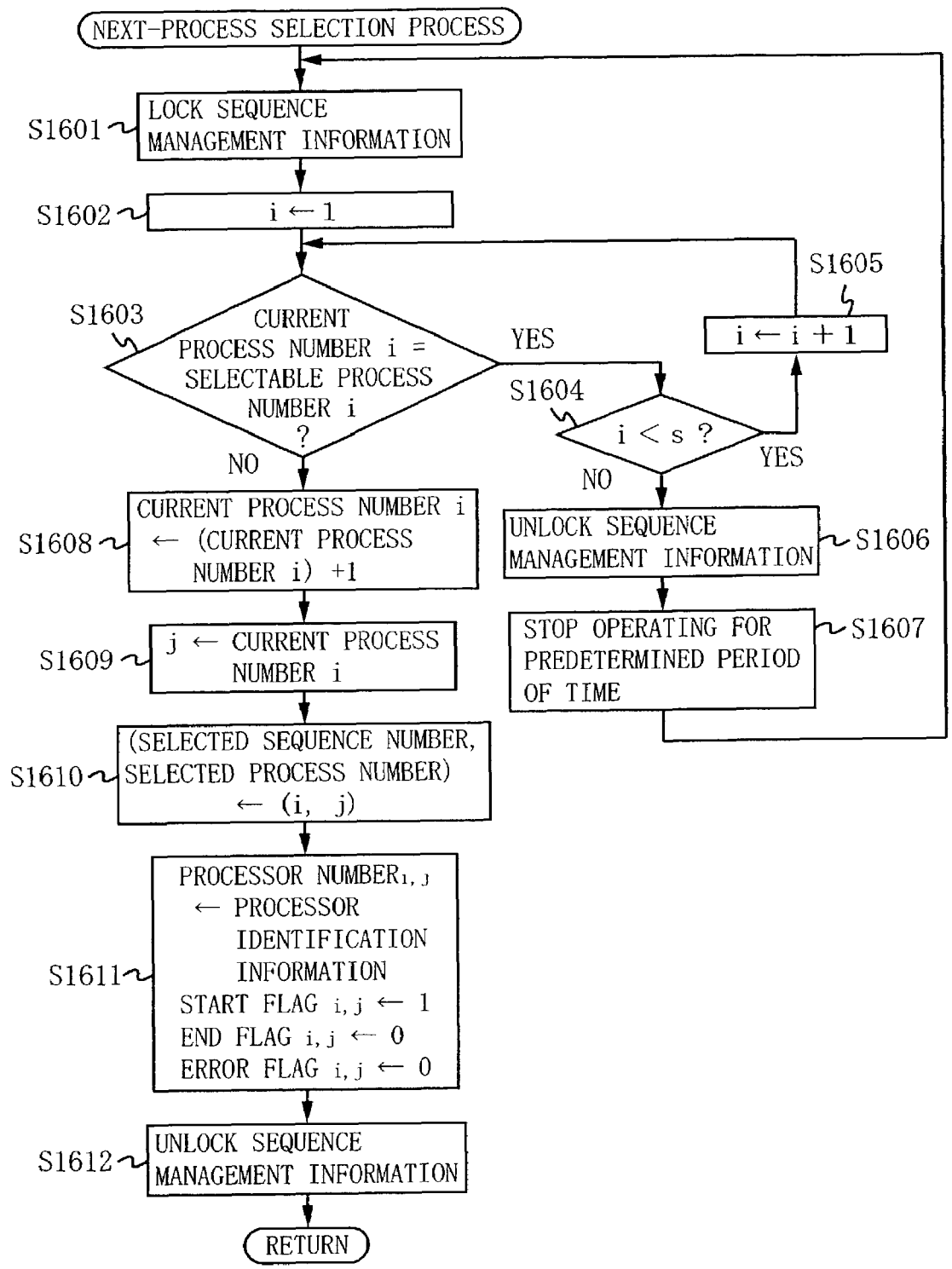
FIG. 10 is a flowchart illustrating a next-process selection process executed by each processor in the moving picture encoding apparatus according to the second embodiment of the present invention.
Figure 11:
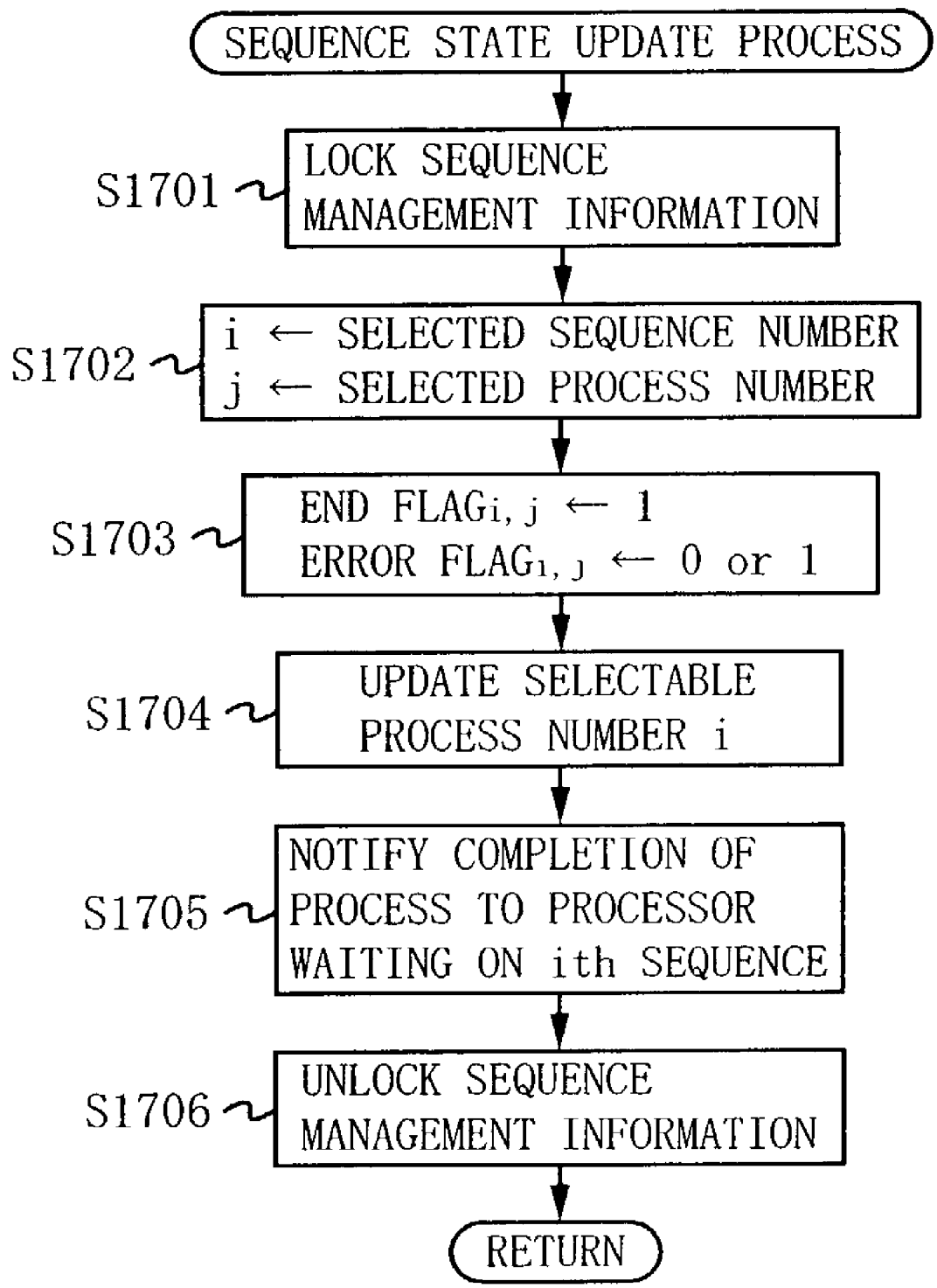
FIG. 11 is a flowchart illustrating a sequence state update process executed by each processor in the moving picture encoding apparatus according to the second embodiment of the present invention.

FIG. 9 is a flowchart illustrating a main process executed by each processor 151. When executing the encoding process program 32 shown in FIG. 2, each of the n processors 151-1 to 151-n operates in accordance with the flowchart shown in FIG. 9. The main process illustrated in FIG. 9, which is similar to that of the first embodiment (FIG. 4), is characterized in that unit process-by-unit process data contained in the processing state 173 is updated in a next-process selection process (FIG. 10) and in a sequence state update process (FIG. 11). Specifically, in a next-process selection process, the processor 151 sets its own processor identification information 161 in the processor number 174 and sets "1" in the start flag 175. In a sequence state update process, the processor 151 sets "1" in the end flag 176, and sets "1" in the error flag 177 when a malfunction occurs.

The details of the steps shown in FIG. 9 are as follows. Steps S1501, S1504, S1505, and S1506 in FIG. 9 are identical to steps S1101, S1106, S1107, and S1114 in FIG. 4, respectively, and the descriptions thereof are omitted. Once activated, the processor 151 first performs an initialization process for itself (step S1501). Next, the processor 151 executes a next-process selection process (FIG. 10) as described later, and updates its own selected sequence number 162 and selected process number 163, and the sequence management information 170 (step S1502).

Next, the processor 151 determines whether a next process exists or not (step S1503). If there exists no next process (following the "NO" path from step S1503), then the process has been completed with respect to all sequences, and therefore the processor 151 ends the process. If a next process exists (following the "YES" path from step S1503), the processor 151 reads necessary data from the shared storage section 102 (step S1504), executes the selected process (step S1505), and writes the obtained result to the shared storage section 102 (step S1506)

Next, the processor 151 executes a sequence state update process (FIG. 11) as described later, and updates the sequence management information 170 in accordance with the process result at step S1505 (step S1507). Thereafter, the processor 151 proceeds to step S1502, and repetitively executes the process from steps S1502 to S1507.

Hereinafter, the next-process selection process and the sequence state update process according to the moving picture encoding apparatus of the present embodiment will be described. In the next-process selection process shown in FIG. 10, the processor 151 first locks the sequence management information 170 (step S1601). Even while the sequence management information 170 is locked, the other processors can freely access the sequence process data 180.

Next, through the process from steps S1602 to S1607, the processor 151 selects one of the s sequences. More specifically, the processor 151 substitute "1" in a variable i (step S1602), and compares the current process number 171 against the selectable process number 172 for an $i^{th}$ sequence (step S1603). If the two numbers coincide (following the "YES" path from step S1603), then no process exists that is selectable with respect to the $i^{th}$ sequence, and therefore the processor 151 checks the next sequence. That is, if the variable i is less than s (i.e., the number of sequences) (following the "YES" path from step S1604), the processor 151 adds one to the variable i (step S1605), and proceeds to step S1603.

If step S1604 finds the variable i to be equal to or greater than s (following the "NO" path from step S1604), then no process exists that is selectable with respect to any sequence, and therefore the processor 151 temporarily unlocks the sequence management information 170 (step S1606), stops operating for a predetermined period of time (step S1607), and thereafter proceeds to step S1601. Thus, even when there remains a process(es) to be executed, if no process exists that is selectable with respect to any sequence at the moment, the processor 151 waits for a predetermined period of time and thereafter searches a selectable process again.

In step S1603, if the current process number 171 does not coincide with the selectable process number 172 (following the "NO" path from step S1603), the processor 151 selects a unit process which lies next to the unit process that is currently executed for the $i^{th}$ sequence, as a process to be next executed. Accordingly, the processor 151 adds one to the current process number 171 for the $i^{th}$ sequence (step S1608), and substitutes the current process number 171 after the addition for the variable j (step S1609). Then, the processor 151 sets the obtained i and j values in its own selected sequence number 162 and selected process number 163, respectively (step S1610). Next, with respect to the $j^{th}$ unit process for the $i^{th}$ sequence, the processor 151 sets the processor identification information 161 in the processor number 174, sets "1" in the start flag 175, and sets "0" in the end flag 176 and the error flag 177 (step S1611). Lastly, the processor 151 unlocks the sequence management information 170 (step S1612), thereby ending the next-process selection process.

In the sequence state update process shown in FIG. 11, the processor 151 first locks the sequence management information 170 (step S1701), and substitutes its own selected sequence number 162 and selected process number 163 for the variables i and j, respectively (step S1702). Next, with respect to the $j^{th}$ unit process for the $i^{th}$ sequence, the processor 151 sets "1" in the end flag 176, and sets "1" or "0" in the error flag 177 depending on whether a malfunction is occurring or not (step S1703).

Next, the processor 151 updates the selectable process number 172 for the $i^{th}$ sequence (step S1704). Specifically, the number of a unit process which has become newly selectable due to the completion of the $j^{th}$ unit process for the $i^{th}$ sequence is set in the selectable process number 172 for the $i^{th}$ sequence.

Next, the processor 151 notifies completion of the process to any other processor that is waiting for completion of the process with respect to the $i^{th}$ sequence (step S1705). As a result, any other processor that is waiting for completion of the process with respect to the $i^{th}$ sequence restarts the encoding process. Lastly, the processor 151 unlocks the sequence management information 170 (step S1706), thereby ending the sequence state update process.

Figure 12:
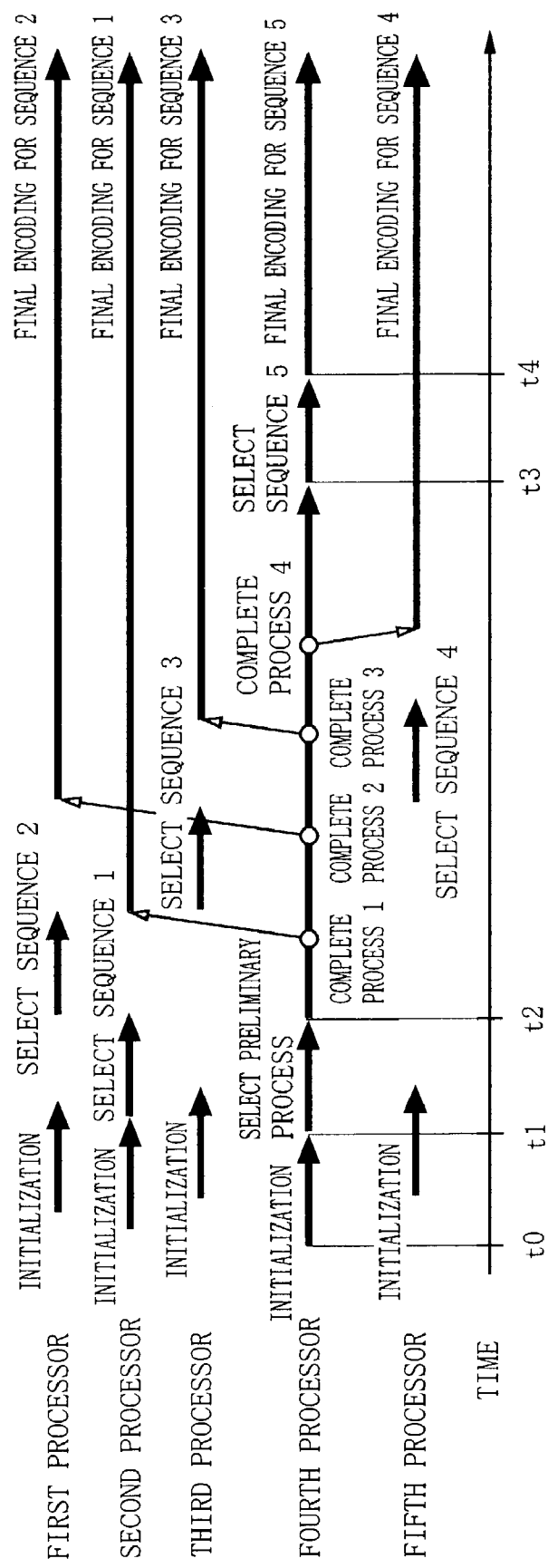
FIG. 12 is a timing diagram illustrating a manner in which each processor in the moving picture encoding apparatus according to the second embodiment of the present invention operates.

FIG. 12 is a timing diagram illustrating a manner in which each processor in the moving picture encoding apparatus of the present embodiment operates. For conciseness, it is assumed that five processors are used to encode six sequences. It is also assumed that the encoding process for each sequence consists of two kinds of unit processes, i.e., a preliminary process and a final encoding, such that after a preliminary process is completed with respect to every sequence, a final encoding is performed with respect to each sequence.

In FIG. 12, it is assumed that each of the five processors independently starts operating at an arbitrary time after time t0, such that the fourth processor is the first to complete an initialization process, which is completed at time t1. The fourth processor performs a next-process selection process in a period from time t1 to time t2, through which it selects a preliminary process as a process to be next executed. Thereafter, the second, first, third, and fifth processors each complete an initialization process, and sequentially select a final encoding for the first to fourth sequences through a next-process selection process. After selecting each next process, the second, first, third, and fifth processors wait for the preliminary process by the fourth processor to be completed.

Upon completing a preliminary process for each sequence, the fourth processor, which has selected a preliminary process, notifies completion of the process to the processors which have been waiting for the completion of the process for the respective sequence. For example, upon receiving the notification of completion of the process from the fourth processor, the second processor (which has been waiting for completion of the process for the first sequence) begins a final encoding for the first sequence. This similarly applies to the first, third, and fifth processors as well. Upon completing the preliminary processes for the first to sixth sequences at time t3, the fourth processor performs a next-process selection process in a period from time t3 to time t4, through which it selects a final encoding for the fifth sequence. After time t4, the fourth processor executes the final encoding for the fifth sequence.

As described above, in accordance with the moving picture encoding apparatus of the present embodiment, for each unit process for each sequence, the shared storage section stores the identification information of the processor which has executed the process, as well as a processing state including flags indicating the start, end, and errors of each process. Each processor updates the processing state through a next-process selection process and a sequence state update process. Therefore, during or after the execution of an encoding process, it is possible to detect malfunctioning of processors based on the processing states stored in the shared storage section.

In the first and second embodiments, each processor reads necessary data from the shared storage section, executes a predetermined process using data on the RAM, and writes the obtained result to the shared storage section (FIG. 4, FIG. 9). Therefore, the RAM comprised in each processor can be regarded as functioning as a data cache. By thus employing the RAM as a data cache, access to the shared storage section can be reduced, so that the data waiting time in each processor can be reduced. As a result, the performance of the moving picture encoding apparatus can be improved.

Third Embodiment

A moving picture encoding apparatus according to the third embodiment of the present invention is characterized by its capability of switching, adding, or changing an encoding process during an encoding process. Specifically, program code and program management information are stored in the shared storage section, and each processor refers to the program management information during the execution of a program which is stored in its own RAM, and executes a program update process as necessary.

Figure 13:
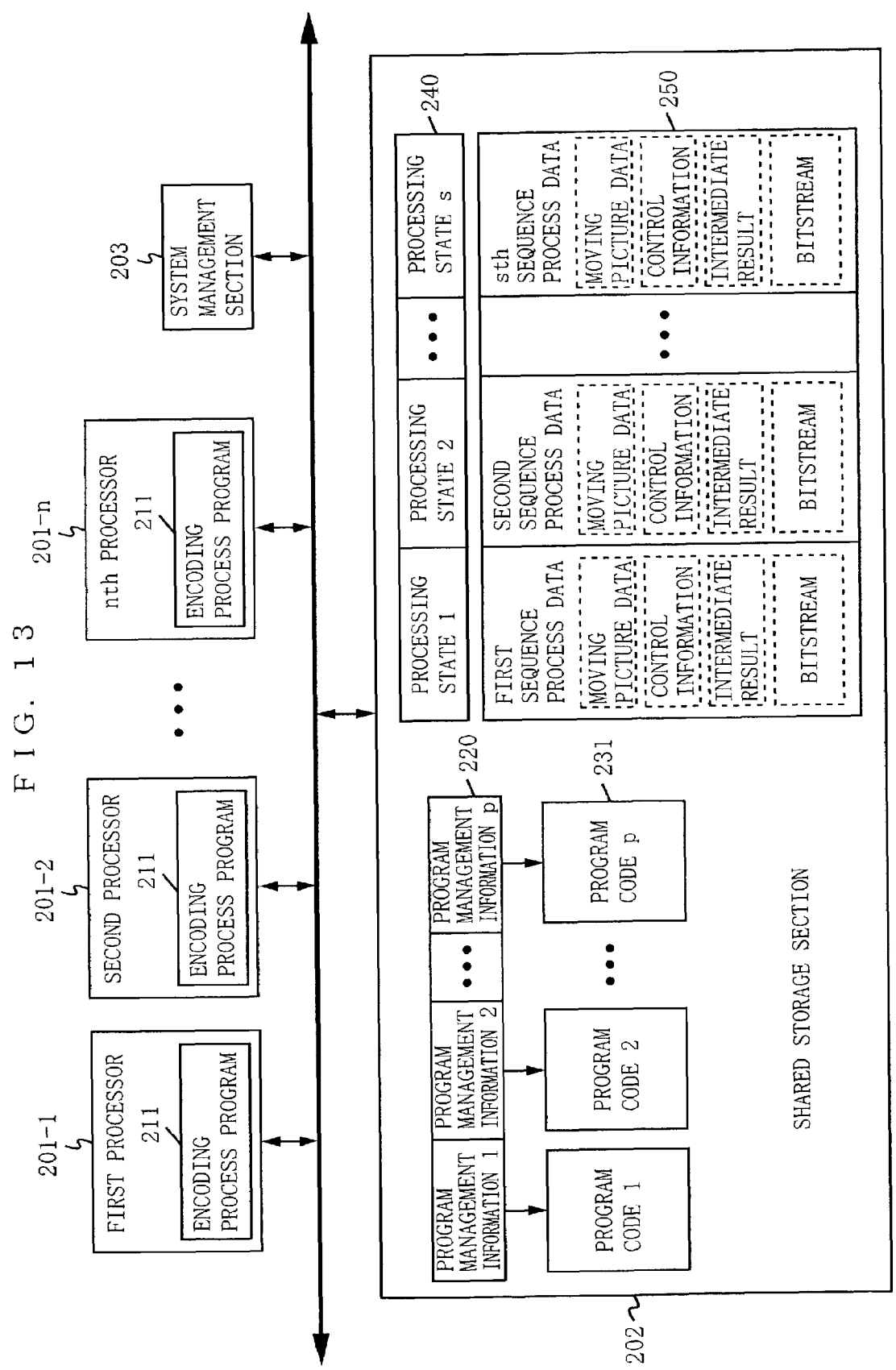
FIG. 13 is a data structure chart for the moving picture encoding apparatus according to the third embodiment of the present invention.

FIG. 13 is a data structure chart for the moving picture encoding apparatus according to the present embodiment. FIG. 13 shows n processors 201-1 to 201-n and a shared storage section 202, which are more detailed representations of the processors 1-1 to 1-n and the shared storage section 2, respectively, shown in FIG. 1. The system management section 203 corresponds to the system management section 3 shown in FIG. 1. FIG. 13 only shows data which is essential for the description of the features of the present embodiment, while omitting any other data. As shown in FIG. 13, the shared storage section 202 stores a processing state 240 and sequence process data 250 for each of the s sequences. An $i^{th}$ processing state 240 represents a processing state of an $i^{th}$ sequence. The $i^{th}$ sequence process data 250 includes all data that is necessary for the encoding of an $i^{th}$ sequence, e.g., moving picture data, control information, intermediate results, and a bitstream.

The shared storage section 202 also stores p programs to be downloaded to the processors 201. Specifically, for each of the p programs supporting different functions, the shared storage section 202 stores program management information 220 and program code 231. The program code 231 is the actual program code which is to be downloaded to a processor 201. As described later (FIG. 18), each processor 201 downloads a selected one of the p units of program code 231 from the shared storage section 202 to its own RAM (i.e., the RAM 23 shown in FIG. 2). The downloaded program code is shown in FIG. 13 as an encoding process program 211. Once the encoding process program 211 is updated, any processor 201 which has been operating in accordance with the old encoding process program 211 now operates in accordance with the updated encoding process program 211, without having to be reactivated.

The program management information 220 is used to manage the programs which are stored in the shared storage section 202. FIG. 14 is a diagram showing the details of the data contained in a unit of program management information 220 corresponding to one program. As shown in FIG. 14, the program management information 220 contains program update information 260, program code information 270, and program functional information 280.

The program update information 260 contains a validity flag 261, an update flag 262, a deletion flag 263, and a number of downloading instances 264, and is used for the management of registration, update and download of the program. The validity flag 261 takes "1" while the program is valid. The update flag 262 takes "1" while the program is being updated. The deletion flag 263 takes "1" while the program is being deleted. The number of downloading instances 264 represents the number of processors which are currently downloading the program.

The program code information 270 contains a program name 271, a top address 272, and a program size 273, and is referred to when the program is downloaded. The program name 271 represents the name of the program. The top address 272 represents the top address of a region in the shared storage section 202 in which the program code 231 of the program is stored. The program size 273 represents the size of the program code 231 of the program.

The program functional information 280 contains number of items 281 and a units of functional information 282 (where a is a natural number). The number of items 281 represents the number of units of functional information 282 contained in the program functional information 280. Assuming that the functions of the p programs stored in the shared storage section 202 can be classified into a functions, the a units of functional information 282 indicate which of the a functions are supported by this particular program. If a given function is not supported by the program, the unit of functional information 282 corresponding to that function takes "0".

For example, assume that the first function among the a functions is a fade function (i.e., a function associated with fading images) and the second process is a motion vector search function. It is further assumed that each program either supports or does not support the fade function, and that each program either supports one of first to fourth search methods of the motion vector search function, or does not support any search method. Under these assumptions, the first functional information of any program which does not support the fade function takes "0", whereas the first functional information of any program which supports the fade function takes "1". Moreover, the second functional information of any program which does not support the motion vector search function takes "0", whereas the second functional information of any program which supports the motion vector search function takes "1", "2", "3", or "4".

Hereinafter, an encoding process according to the moving picture encoding apparatus of the present embodiment will be described. In order to encode moving picture data in compliance with MPEG, it is necessary to perform a predetermined process in each of a number of layers: a sequence layer, a GOP layer, a picture layer, a slice layer, a macroblock layer, and a block layer. When encoding processes are classified into a number of layers as shown in FIG. 15, it can be seen that, once all or some of the processes included in a given layer are completed, it becomes possible to execute the processes in the lower layers in a parallel manner. For example, once a slice header production process is completed, macroblock encoding processes can be executed in parallel with respect to all macroblocks contained in the relevant slice. Therefore, the respective processes shown in the right column of FIG. 15 may be regarded as the aforementioned unit processes. Alternatively, in order to provide for an improved processing speed, the processes in the picture layer and any lower layer (i.e., picture header production, slice header production, and macroblock encoding) may collectively be regarded as one unit process.

Figure 16:
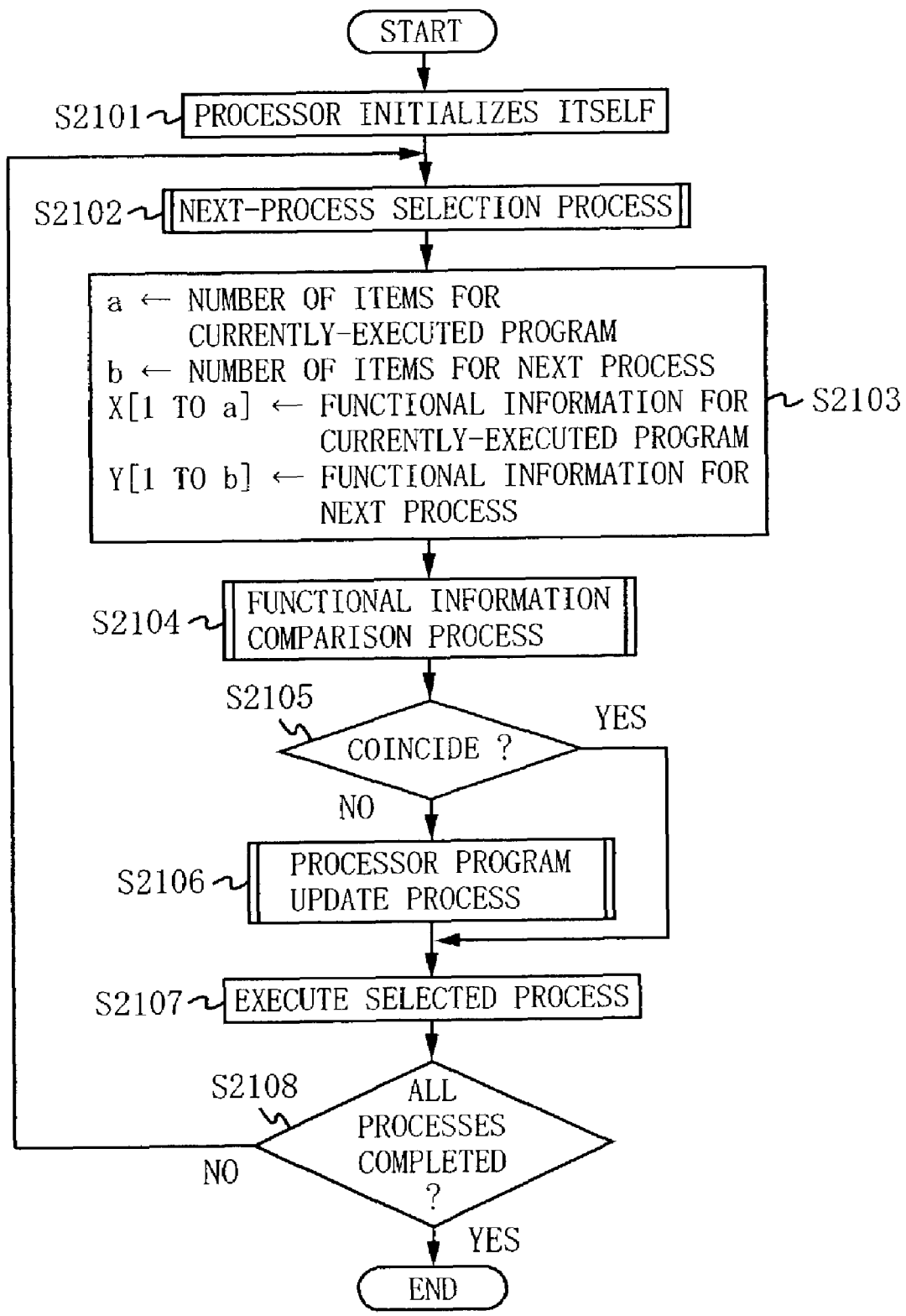
FIG. 16 is a flowchart illustrating a main process executed by each processor in the moving picture encoding apparatus according to the third embodiment of the present invention.

FIG. 16 is a flowchart illustrating a main process executed by each processor 201. When executing the encoding process program 32 shown in FIG. 2, each of the n processors 201-1 to 201-n operates in accordance with the flowchart shown in FIG. 16. As shown in FIG. 16, each processor 201 selects a process to be next executed, and after updating its own encoding process program 211 as necessary, executes the selected process.

The details of the steps shown in FIG. 16 are as follows. Once activated, the processor 201 first performs an initialization process (step S2101). In the initialization process, the processor 201 performs processes such as initialization of the encoding process data within the RAM (encoding process data 33 shown in FIG. 2). Next, the processor 201 selects a process to be next executed through a next-process selection process (FIG. 17; described later) (step S2102). At step S2102, the processor 201 selects a sequence and a GOP to be next processed, and selects one of the unit processes which are executable with respect to the selected GOP. Hereinafter, the process which is selected at step S2102 will be referred to as the "next process".

Next, the processor 201 compares the function(s) supported by the currently-executed program against the function(s) which are necessary for executing the next process. Specifically, the processor 201 substitutes the "number of items" associated with the currently-executed program for a variable a, substitutes the "number of items" associated with the next process for a variable b, substitutes the a units of functional information associated with the currently-executed program for an array-type variable X, and substitutes the b units of functional information associated with the next process for an array-type variable Y (step S2103), and executes a functional information comparison process (FIG.

19; described later) (step S2104). It is assumed that the processor 201 copies the program functional information 280 associated with the currently executed program from the shared storage section 202 to its own RAM, and ascertains the number of items and the functional information associated with the currently-executed program based on the copied program functional information. It is further assumed that, in the next-process selection process, the processor 201 obtains information concerning the functions which are necessary for executing the next process (i.e., number of items and functional information) in the same format as that of the program functional information 280.

Next, the processor 201 determines through the functional information comparison process whether the two sets of functional information coincide or not (step S2105) If the two sets coincide (following the "YES" path from step S2105), the processor 201 proceeds to step S2107. If the two sets do not coincide (following the "NO" path from step S2105), the processor 201 executes a processor program update process (FIG. 18; described later) (step S2106), and thereafter proceeds to step S2107.

Next, the processor 201 executes the process selected at step S2102 (step S2107). More specifically, the processor 201 reads necessary data from the shared storage section 202 and writes it to its own RAM, executes the selected process for the data within its own RAM, and reads the result of the process from its own RAM and writes it to the shared storage section 202. Then, the processor 201 determines whether all encoding processes have been completed or not (step S2108). If all encoding processes have been completed (following the "YES" path from step S2108), the process is ended. On the other hand, if any processes are left uncompleted (following the "NO" path from step S2108), the processor 201 proceeds to step S2102 to continue on the encoding process.

Figure 17:
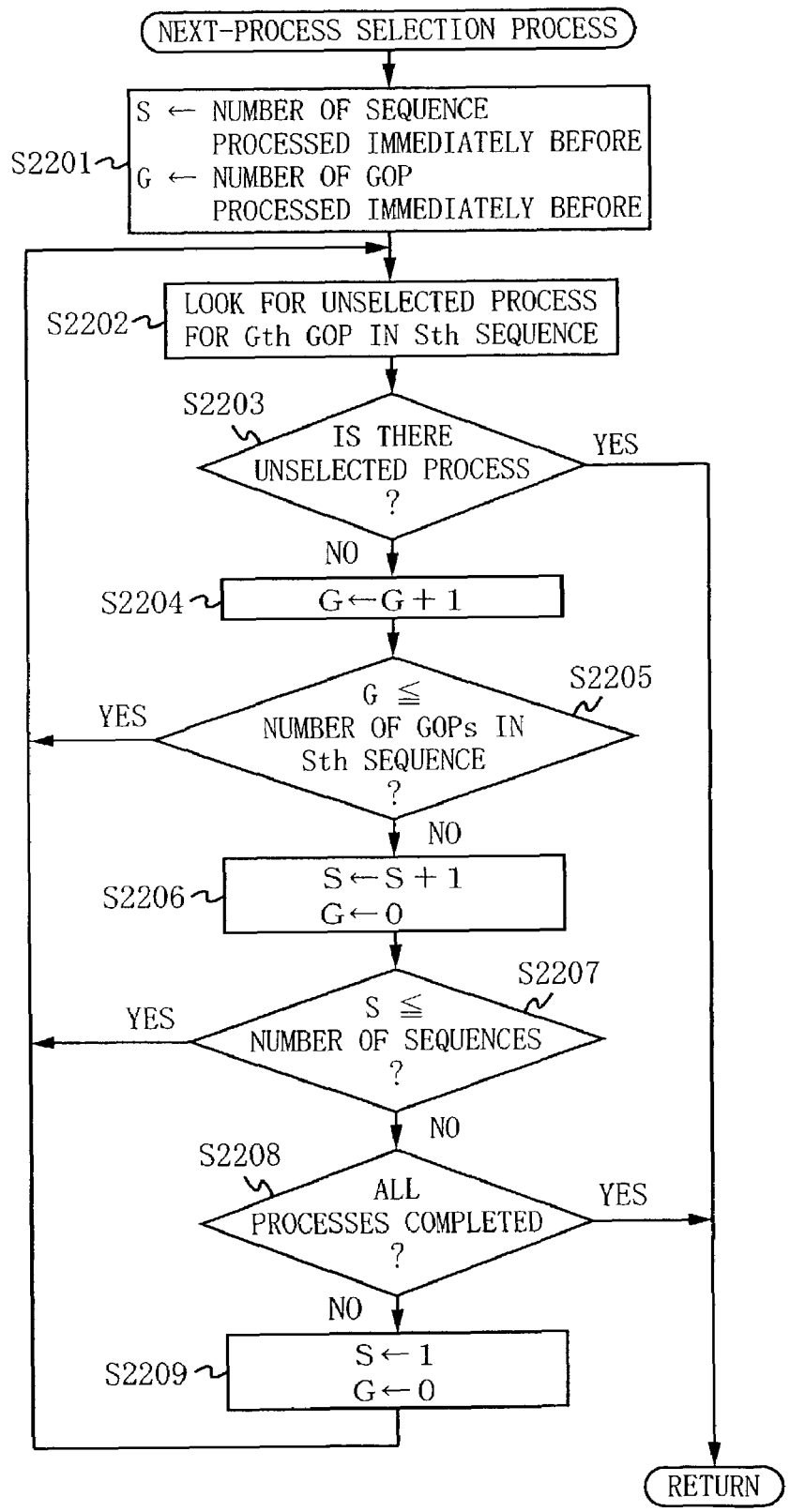
FIG. 17 is a flowchart illustrating a next-process selection process executed by each processor in the moving picture encoding apparatus according to the third embodiment of the present invention.

FIG. 17 is a flowchart illustrating the next-process selection process. In the next-process selection process, the processor 201 first substitutes the number of a sequence which has been processed immediately before for a variable S, and substitutes the number of a GOP which has been processed immediately before, for a variable G (step S2201). Next, the processor 201 looks for a process which has not been selected with respect to a $G^{th}$ GOP in an $S^{th}$ sequence (step S2202).

Next, the processor 201 determines whether any unselected process was detected at step S2202 (step S2203). If an unselected process was found (following the "YES" path from step S2203), the processor 201 selects that process as a process to be next executed, thereby ending the next-process selection process.

On the other hand, if no unselected process was found (following the "NO" path from step S2203), the processor 201 proceeds to step S2204, and updates the variables S and G in order to look for a process which has not been selected with respect to the next GOP, as follows. The processor 201 adds one to the variable G (step S2204), and if the variable G is equal to or less than the number of GOPs in the $S^{th}$ sequence (following the "YES" path from step S2205), the processor 201 proceeds to step S2202. If the variable G is greater than the number of GOPs in the $S^{th}$ sequence (following the "NO" path from step S2205), the processor 201 adds one to the variable S, and substitutes "0" for the variable G (step S2206). Next, if the variable S is equal to or less than the total number of sequences (following the "YES" path from step S2207), the processor 201 proceeds to step S2202. If the variable S is greater than the total number of sequences (following the "NO" path from step S2207), the processor 201 determines whether all encoding processes have been completed or not (step S2208). If all encoding processes have been completed (following the "YES" path from step S2208), the processor 201 ends the next-process selection process, without selecting a process to be next executed. If any process is still left unexecuted (following the "NO" path from step S2208), the processor 201 substitutes "1" for the variable S, substitutes "0" for the variable G (step S2209), and proceeds to step S2202.

Figure 18:
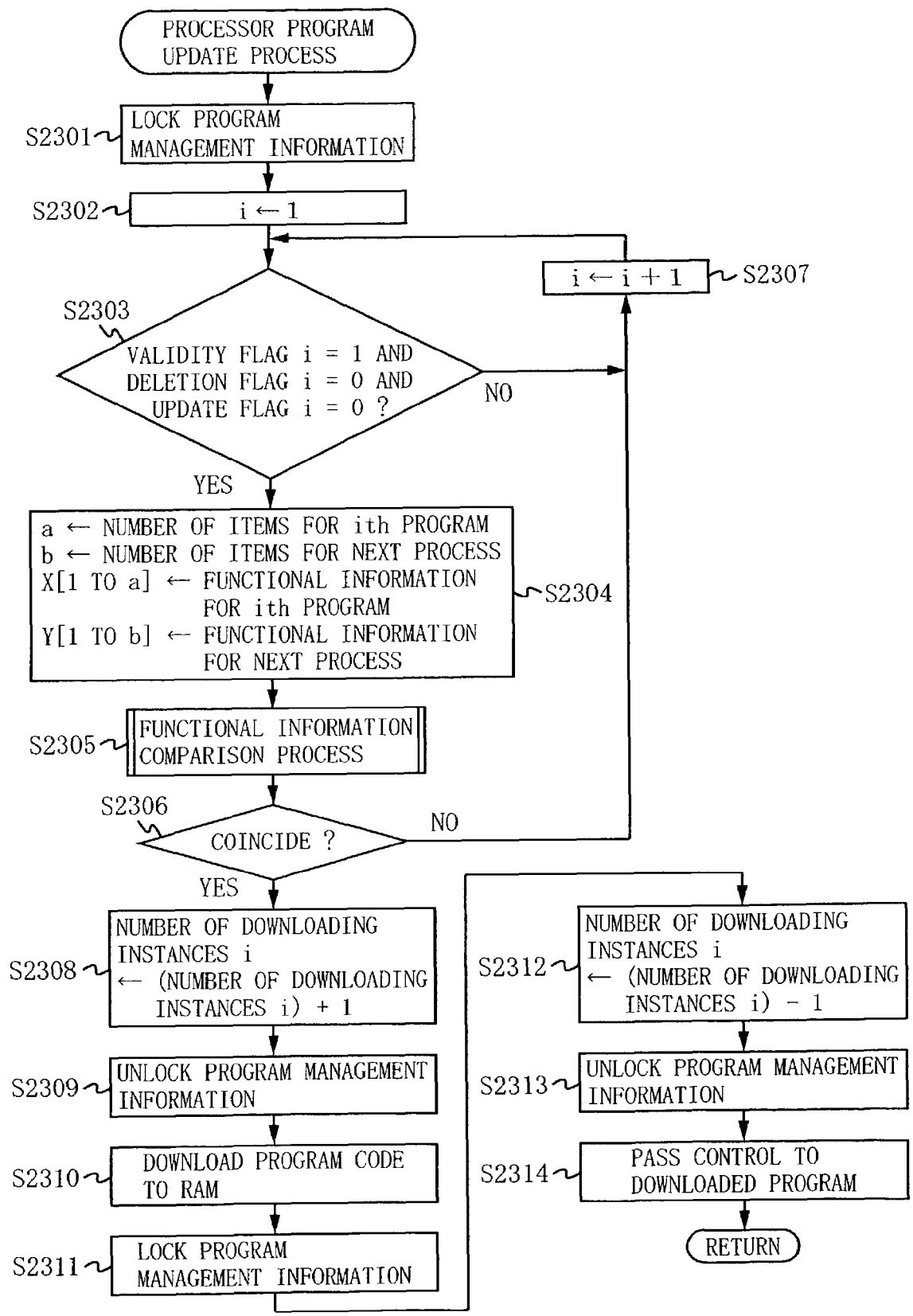
FIG. 18 is a flowchart illustrating a processor program update process executed by each processor in the moving picture encoding apparatus according to the third embodiment of the present invention.

FIG. 18 is a flowchart illustrating the processor program update process. In this process, the processor 201 first locks the program management information 220 (step S2301), and substitutes "1" for a variable i (step S2302).

Next, through the process from steps S2303 to S2307, the processor 201 looks for a program which supports the function(s) for executing the next process, from among the p programs stored in the shared storage section 202. Specifically, if the $i^{th}$ program is not valid (following the "NO" path from step S2303), or if the function(s) of the $i^{th}$ program does not match the function(s) necessary for executing the next process (following the "NO" path from step S2306), the processor 201 adds one to the variable i (step S2307), and proceeds to step S2303. On the other hand, if the $i^{th}$ program is valid (following the "YES" path from step S2303) and the function(s) of the $i^{th}$ program matches the function(s) necessary for executing the next process (following the "YES" path from step S2306), the processor 201 proceeds to step S2308.

Note that the determination of a valid $i^{th}$ program at step S2303 is made if the validity flag 261 of the $i^{th}$ program is "1" and the update flag 262 and the deletion flag 263 are both "0". The process from steps S2304 to S2306 is the same as the process from steps S2103 to S2105 (FIG. 16) except that the comparison is made against the $i^{th}$ program, instead of a currently-executed program.

When the processor 201 reaches step S2308, the variable i is equal to the number of programs to be downloaded to the processor 201. Therefore, the processor 201 adds one to the number of downloading instances 264 of the $i^{th}$ program (step S2308), temporarily unlocks the program management information 220 (step S2309), and downloads the program code 231 of the $i^{th}$ program to its own RAM (step S2310).

Next, the processor 201 subtracts one from the number of downloading instances 264 of the $i^{th}$ program (step S2312), and thereafter passes control to the downloaded program (step S2314), without performing an initialization again. Note that the processor 201 locks the program management information 220 (step S2311) before subtracting one from the number of downloading instances 264, and unlocks the program management information 220 after the subtraction (step S2313). Thus, the processor 201 ends the processor program update process.

Figure 19:
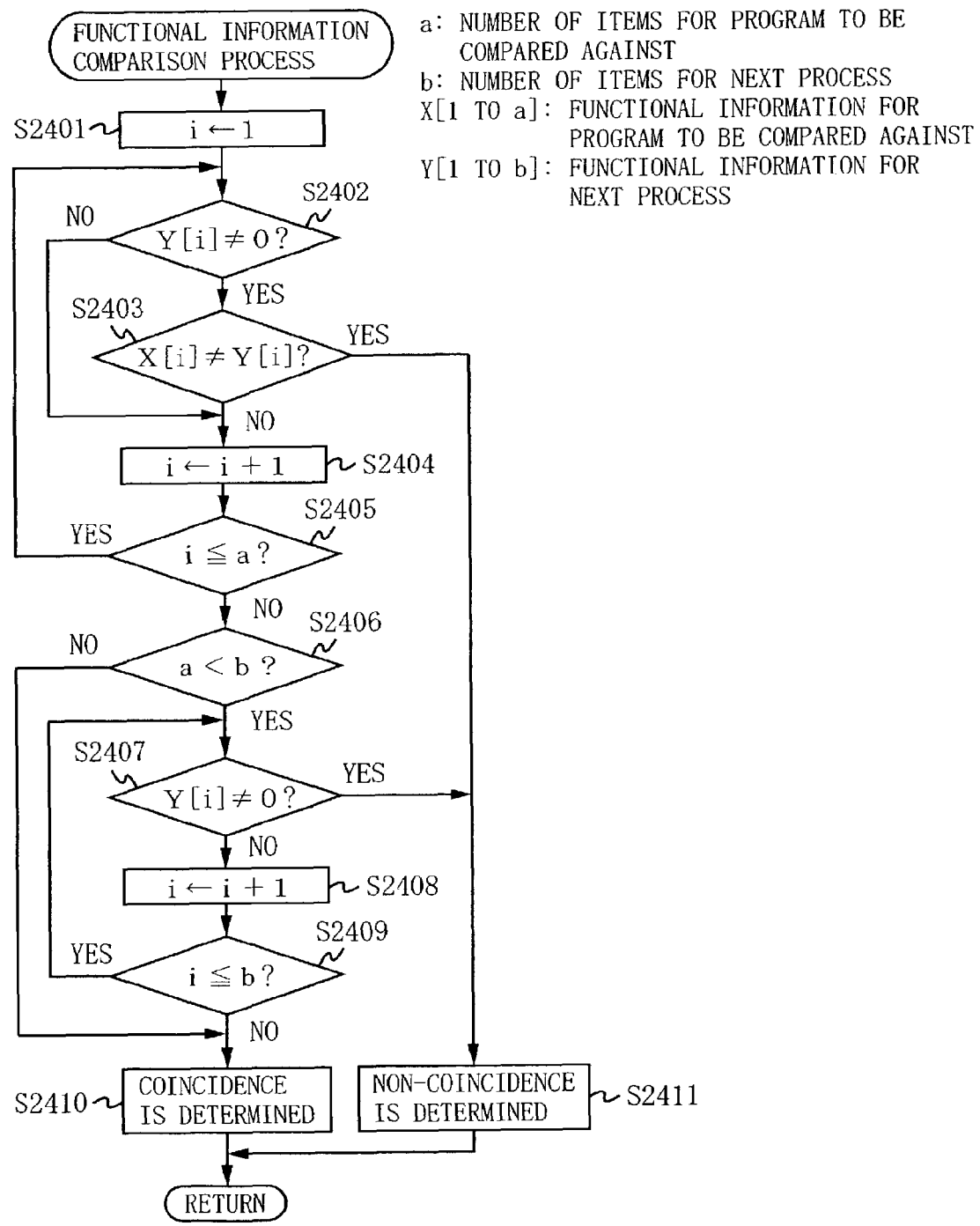
FIG. 19 is a flowchart illustrating a functional information comparison process executed by each processor in the moving picture encoding apparatus according to the third embodiment of the present invention.

FIG. 19 is a flowchart illustrating the functional information comparison process. The functional information comparison process is called from step S2104 in FIG. 16 or from step S2305 in FIG. 18. When this process is called, the "number of items" associated with a program to be compared against has been set in the variable a, the "number of items" associated with the next process has been set in the variable b, the a units of functional information associated with the program to be compared against have been set in the array-type variable X, and the b units of functional information associated with the next process have been set in the array-type variable Y. It is assumed that, for any function which does not need to be supported for executing the next process, "0" is set in the corresponding functional information.

In the functional information comparison process, the processor 201 first substitutes "1" in a variable i (step S2401). Next, through the process from steps S2402 to S2405, the processor 201 checks for any non-correspondency in the first to $a^{th}$ units of functional information. More specifically, if the $i^{th}$ element Y[i] of the variable Y is not "0" (following the "YES" path from step S2402) and the $i^{th}$ elements X[i] of the variable X and Y[i] are not equal (following the "YES" path from step S2403), the processor 201 proceeds to step S2411. On the other hand, if Y[i] is "0" (following the "NO" path from step S2402), or if the X[i] and Y[i] are equal (following the "NO" path from step S2403), the processor 201 proceeds to step S2404. In this case, the processor 201 adds one to the variable i (step S2404), and if the resultant variable i is equal to or less than a (i.e., the "number of items" associated with the program to be compared against), the processor 201 proceeds to step S2402, and otherwise proceeds to step S2406.

Next, the processor 201 compares the variable a and the variable b (step S2406). If a is smaller than b, the processor 201 proceeds to step S2407, and otherwise proceeds to step S2410. If the former is the case, through the process from steps S2407 to S2409, the processor 201 checks whether there is any non-zero element among the $(a+1)^{th}$ to $b^{th}$ elements of the variable Y. More specifically, if Y[i] is not "0" (following the "YES" path from step S2407), the processor 201 proceeds to step S2411. On the other hand, if Y[i] is "0" (following the "NO" path from step S2407), the processor 201 adds one to the variable i (step S2408), and further if the variable i is equal to or less than b (i.e., the "number of items" associated with the next process), the processor 201 proceeds to step S2407, and otherwise the processor 201 proceeds to step S2410.

If the processor 201 reaches step S2410, the processor 201 determines that the functions of the program to be compared against coincide with the functions necessary for the next process. If the processor 201 reaches step S2411, the processor 201 determines that they do not coincide. After making the above determination, the processor 201 ends the functional information comparison process.

In accordance with the functional information comparison process shown in FIG. 19, it is possible to compare two sets of functional information not only in the case where the numbers of units associated with the two are identical but also in the case where the numbers of units are not identical. Although the process shown in FIG. 19 determines that the two sets of functional information do not coincide when X[i] is not equal to Y[i], a non-coincidence between the two sets of functional information may alternatively be determined when Y[i] is greater than X[i], for example.

Figure 21:
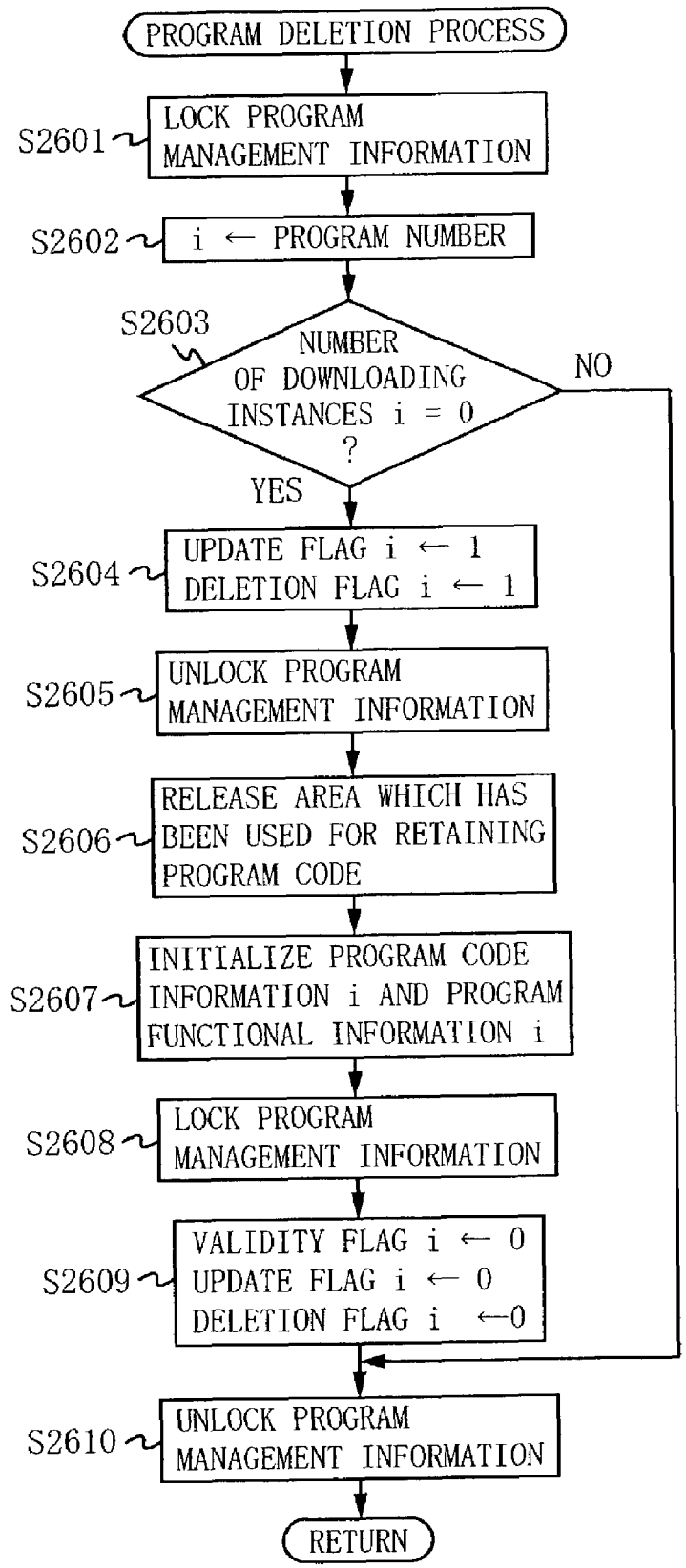
FIG. 21 is a flowchart illustrating a program deletion process by the moving picture encoding apparatus according to the third embodiment of the present invention.
Figure 22:
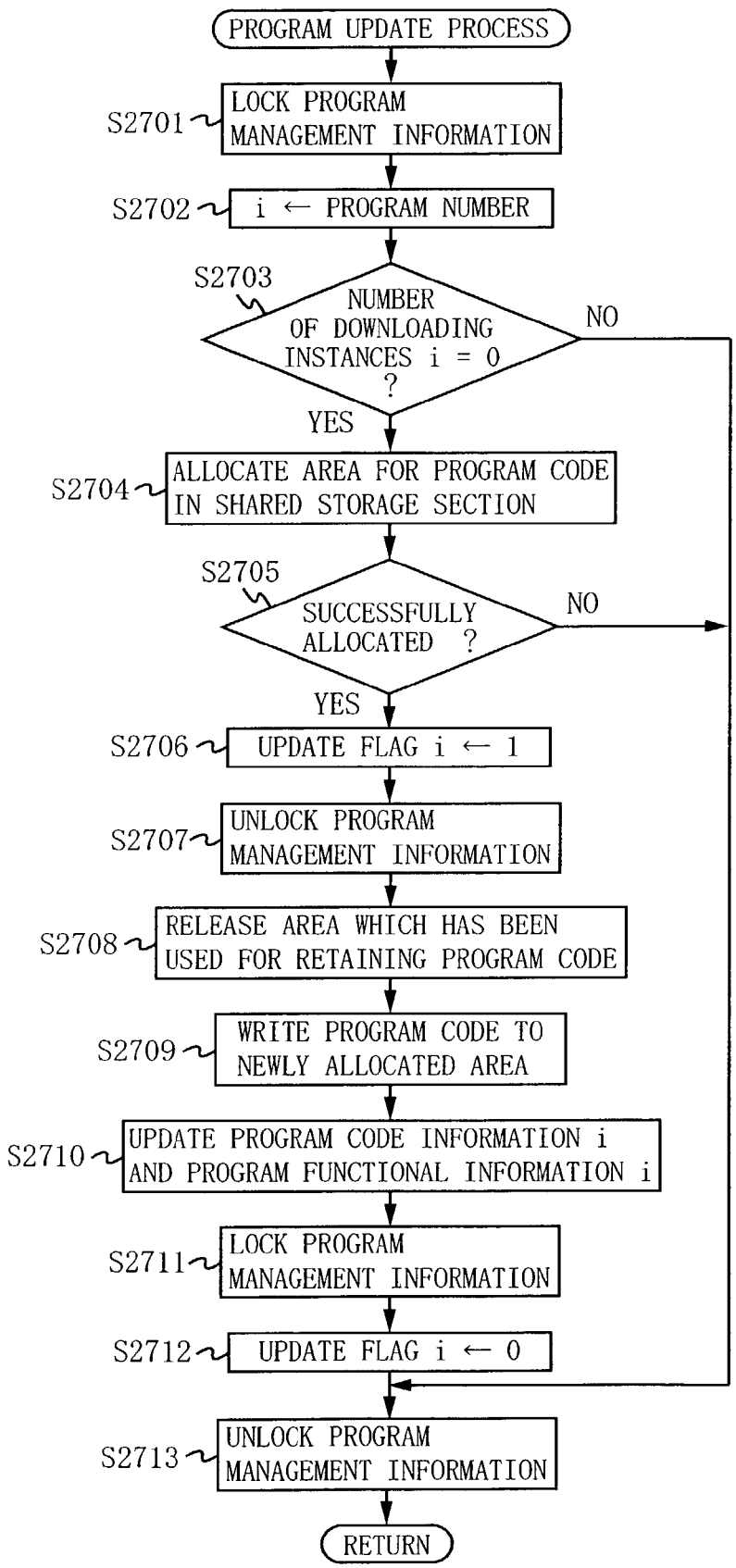
FIG. 22 is a flowchart illustrating a program update process by the moving picture encoding apparatus according to the third embodiment of the present invention.

Next, methods for registering, deleting or updating a program in the shared storage section 202 in the moving picture encoding apparatus of the present embodiment will be described. These operations to the shared storage section 202 are performed by the system management section 203. In accordance with an inputted command, the system management section 203 executes a program registration process (FIG. 20), a program deletion process (FIG. 21), and/or a program update process (FIG. 22) as described below. The processes illustrated in FIGS. 20, 21, and 22 are performed at arbitrary points in time; these processes may even be performed while the processor 201 is executing an encoding process.

Figure 20:
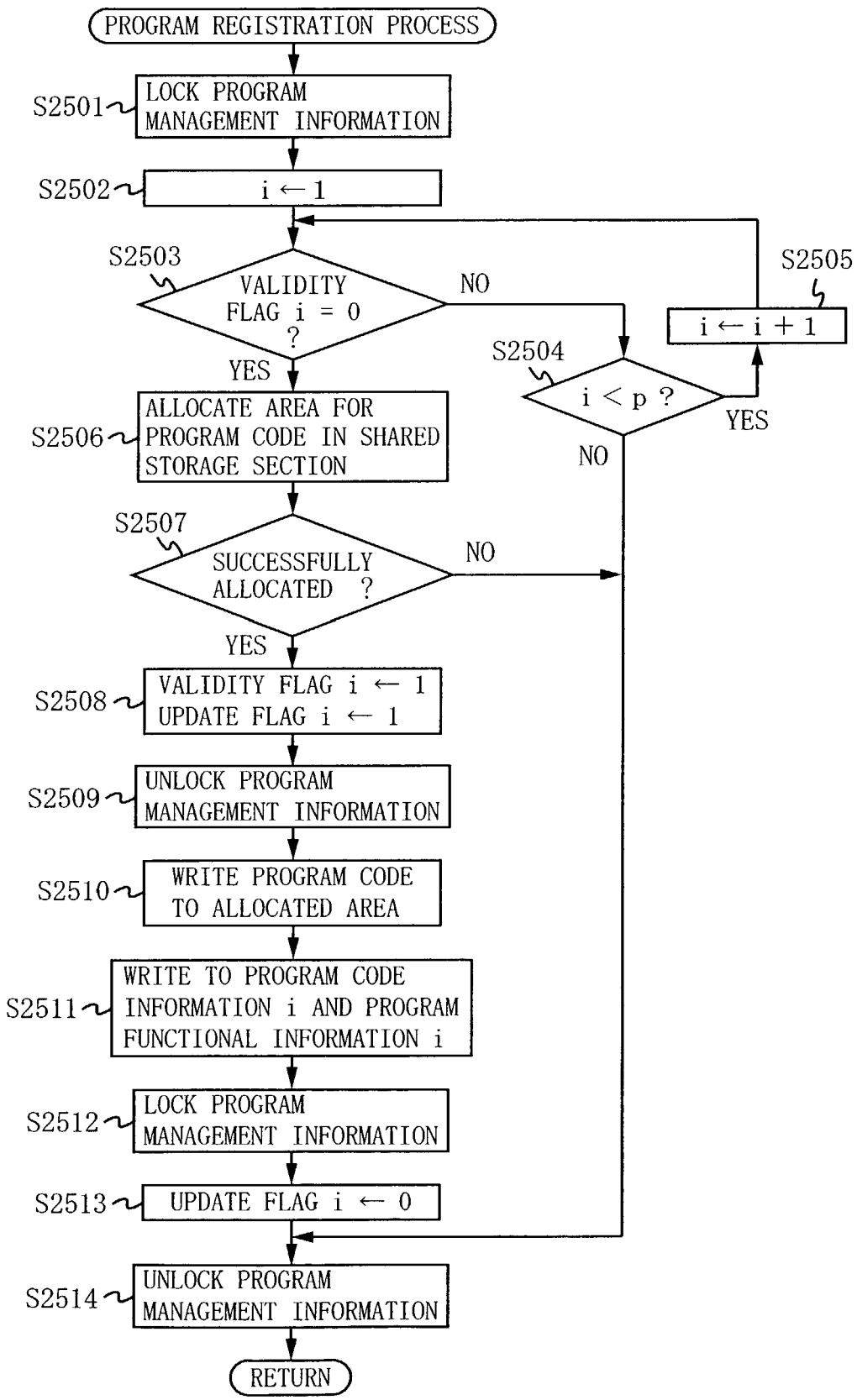
FIG. 20 is a flowchart illustrating a program registration process executed by each processor in the moving picture encoding apparatus according to the third embodiment of the present invention.

FIG. 20 is a flowchart illustrating the program registration process. In the program registration process, the system management section 203 first locks the program management information 220 (step S2501), and substitutes "1" for a variable i (step S2502). Next, through the process from steps S2503 to S2505, the system management section 203 determines a unit of program management information 220 whose validity flag 261 is "0". More specifically, if an $i^{th}$ validity flag 261 is not "0" (following the "NO" path from step S2503) and the variable i is less than p (i.e., the number of programs) (following the "YES" path from step S2504), then the system management section 203 adds one to the variable i (step S2505), and proceeds to step S2503. If the $i^{th}$ validity flag 261 is not "0" (following the "NO" path from step S2503) and the variable i is equal to or greater than p (following the "NO" path from step S2504), then the system management section 203 proceeds to step S2514.

If the $i^{th}$ validity flag 261 is "0" (following the "YES" path from step S2503), the system management section 203 allocates an area in the shared storage section 202 for retaining program code (step S2506). If the system management section 203 fails to allocate such an area (following the "NO" path from step S2507), the system management section 203 proceeds to step S2514.

If the system management section 203 successfully allocates the aforementioned area (following the "YES" path from step S2507), the system management section 203 sets "1" in the $i^{th}$ validity flag 261 and the update flag 262 (step S2508). Next, the system management section 203 temporarily unlocks the program management information 220 (step S2509), writes the program code of a program to be registered to the area allocated in the shared storage section 202 (step S2510), and writes the information concerning the program to be registered to the $i^{th}$ program code information 270 and program functional information 280 (step S2511).

Next, the system management section 203 sets "0" in the $i^{th}$ update flag 262 (step S2513) Note that the system management section 203 locks the program management information 220 (step S2512) before setting "0" in the $i^{th}$ update flag 262, and unlocks the program management information 220 after the setting (step S2514). Thus, the system management section 203 ends the program registration process.

FIG. 21 is a flowchart illustrating the program deletion process. In the processor deletion process, the system management section 203 first locks the program management information 220 (step S2601), and substitutes the number of a program to be deleted for a variable i (step S2602).

Next, the system management section 203 checks whether the $i^{th}$ "number of downloading instances" 264 is "0" or not (step S2603). If the $i^{th}$ "number of downloading instances" 264 is not "0" (following the "NO" path from step S2603), one of the processors 201 is downloading the program to be deleted through the processor program update process (FIG. 18). Therefore, the system management section 203 proceeds to step S2610 without deleting the designated program. In order to properly delete the program, the system management section 203 needs to again execute the program deletion process.

If the $i^{th}$ "number of downloading instances" is "0" (following the "YES" path from step S2603), the system management section 203 sets "1" in the $i^{th}$ update flag 262 and the deletion flag 263 (step S2604), and temporarily unlocks the program management information 220 (step S2605). Then, the system management section 203 releases the area in the shared storage section 202 which has been used for retaining the program code 231 of the $i^{th}$ program (step S2606), and initializes the $i^{th}$ program code information 270 and program functional information 280 (step S2607).

Next, the system management section 203 sets "0" in the $i^{th}$ validity flag 261, the update flag 262, and the deletion flag 263 (step S2609). Note that the system management section 203 locks the program management information 220 before setting "0" in these flags (step S2608), and unlocks the program management information 220 after the setting (step S2610). Thus, the system management section 203 ends the program deletion process.

FIG. 22 is a flowchart illustrating the program update process. The program update process is performed as a single process containing both the program registration process and the program deletion process. In the program update process, the system management section 203 first locks the program management information 220 (step S2701), and substitutes the number of a program to be updated for a variable i (step S2702).

Next, the system management section 203 checks whether the $i^{th}$ "number of downloading instances" 264 is "0" or not (step S2703). If the $i^{th}$ "number of downloading instances" 264 is not "0" (following the "NO" path from step S2703), one of the processors 201 is downloading the program to be updated through the processor program update process (FIG. 18). In this case, the system management section 203 proceeds to step S2713 without updating the designated program. Therefore, in order to properly update the program, the system management section 203 needs to again perform the program update process.

If the $i^{th}$ "number of downloading instances" is "0" (following the "YES" path from step S2703), the system management section 203 allocates an area for retaining program code in the shared storage section 202 (step S2704). If the system management section 203 fails to allocate such an area (following the "NO" path from step S2705), the system management section 203 proceeds to step S2713.

If the system management section 203 successfully allocates the aforementioned area (following the "YES" path from step S2705), the system management section 203 sets "1" in the $i^{th}$ update flag 262 (step S2706). Then, the system management section 203 temporarily unlocks the program management information 220 (step S2707), and releases the area in the shared storage section 202 which has been used for retaining the program code 231 of the $i^{th}$ program (step S2708). Next, the system management section 203 writes the program code of the program to be registered to an area which is newly allocated in the shared storage section 202 (step S2709), and updates the $i^{th}$ program code information 270 and program functional information 280 by using the information concerning the program to be registered (step S2710).

Next, the system management section 203 sets "0" in the $i^{th}$ update flag 262 (step S2712). Note that the system management section 203 locks the program management information 220 before setting "0" in the $i^{th}$ update flag 262 (step S2711), and unlocks the program management information 220 after the setting (step S2713). Thus, the system management section 203 ends the program update process.

As illustrated in FIGS. 20 to 22, the system management section 203 accesses the program management information 220 while performing exclusive control. Moreover, as illustrated in FIG. 18, the processor 201 also accesses the program management information 220 while performing exclusive control. By thus performing exclusive control for the program management information 220 separately from the program code 231, it is possible for a plurality of processors to simultaneously download programs from the shared storage section 202.

Now, an exemplary operation of the moving picture encoding apparatus of the present embodiment will be described, where the processor 201 reads a program for executing a next process from the shared storage section 202 and executes such a program, assuming the following situation. It is assumed that the first function among the a functions in the moving picture encoding apparatus is a fade function, and only an eighth program among the p programs stored in the shared storage section 202 supports the fade function. It is further assumed that image fading does not occur in a fourth sequence among the s sequences stored in the shared storage section 202, whereas image fading does occur in a fifth sequence. It is further assumed that a third processor has completed a process concerning the fourth sequence (e.g., a macroblock encoding process) by employing a seventh program, and has selected a process concerning the fifth sequence as a next process.

In this case, the seventh program being used by the third processor does not support the fade function, so that the fourth sequence cannot be processed. Therefore, the third processor selects the eighth program from among the p programs stored in the shared storage section 202, and downloads the program code 231 of the eighth program from the shared storage section 202 to its own RAM. Thereafter, in accordance with the downloaded eighth program, the third processor executes a moving picture encoding process, including the fade function, on the fourth sequence.

As described above, in accordance with the moving picture encoding apparatus of the present embodiment, each processor selects a program which is necessary for a next process based on functional information stored in the shared storage section, and transfers and executes the selected program. The selection, transfer, and execution of a program by each processor are performed at arbitrary points in time, independently from the operation of any other processor. Therefore, each processor can select and execute a program necessary for the next process without affecting the operation of any other processor. Thus, the content of an encoding process can be switched during an encoding process, without affecting any encoding process under execution. Moreover, changing of the content of an encoding process, or addition of a new function can also be performed without interrupting an encoding process.

Fourth Embodiment

A moving picture encoding apparatus according to the fourth embodiment of the present invention is characterized in that each processor detects an abnormality (if any) when executing a selected process, and upon detection of an abnormality, stops itself from operating. Specifically, if a bitstream is produced as a result of executing a selected process, each processor checks the size, syntax, and the like of the produced bitstream, and determines whether or not an abnormality has occurred in the selected process based on the check results.

Figure 23:
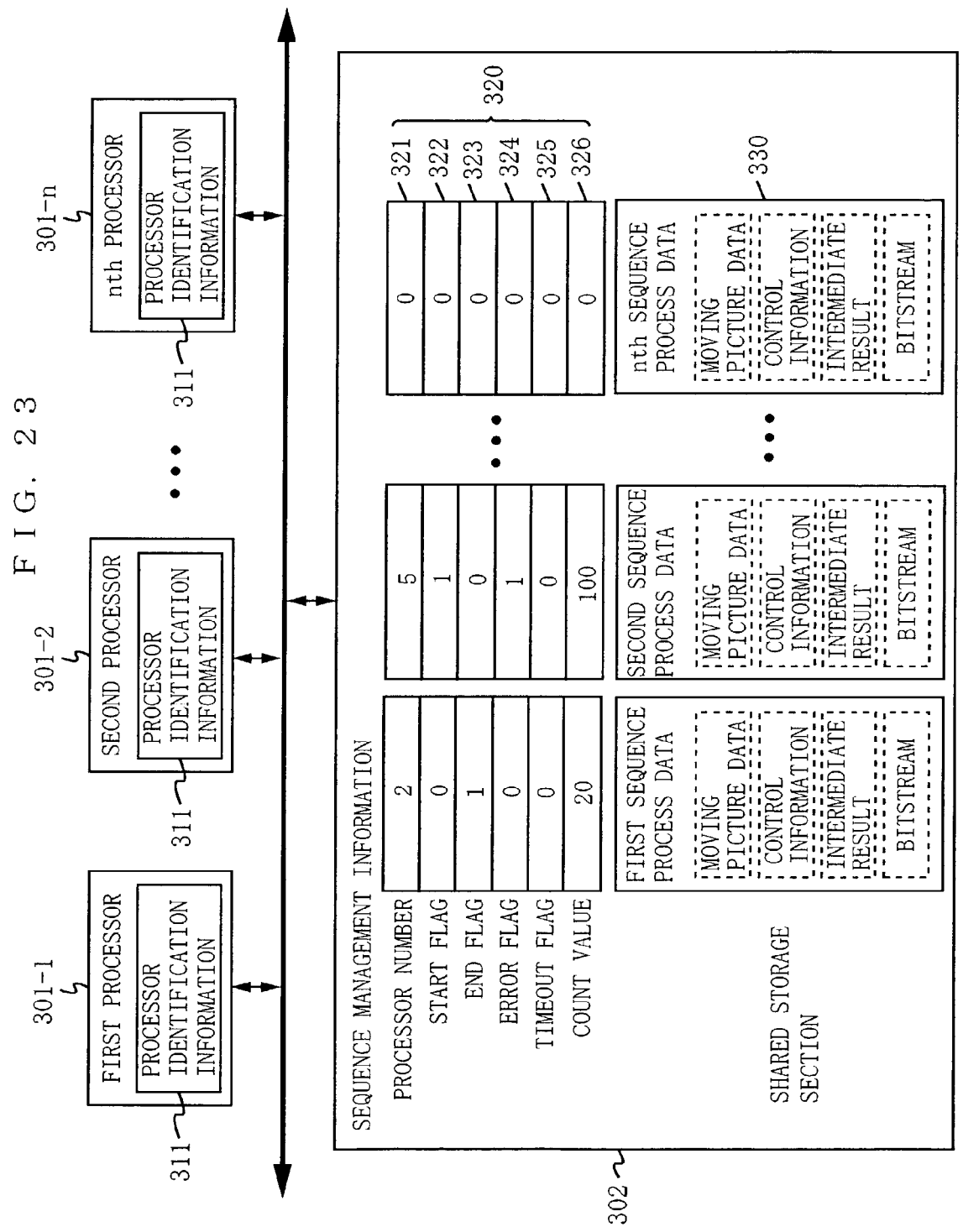
FIG. 23 is a data structure chart for the moving picture encoding apparatus according to the fourth embodiment of the present invention.

FIG. 23 is a data structure chart for the moving picture encoding apparatus according to the present embodiment. FIG. 23 shows n processors 301-1 to 301-n and a shared storage section 302, which are more detailed representations of the processors 1-1 to 1-n and the shared storage section 2, respectively, shown in FIG. 1. FIG. 23 only shows data which is essential for the description of the features of the present embodiment, while omitting any other data. As shown in FIG. 23, each processor 301 stores processor identification information 311, and the shared storage section 302 stores sequence management information 320 and sequence process data 330 for each of the s sequences. The $i^{th}$ sequence process data 330 includes all data that is necessary for the encoding of an $i^{th}$ sequence, e.g., moving picture data, control information, intermediate results, and a bitstream.

The sequence management information 320 contains a processor number 321, a start flag 322, an end flag 323, an error flag 324, a timeout flag 325, and a count value 326. The processor number 321 is processor identification information 31 of a processor which is currently executing a process for this sequence. The start flag 322, the end flag 323, the error flag 324, the timeout flag 325, and the count value 326 are set by each processor 301, and referred to by that processor 301. In the start flag 322, "1" is set when a process for this sequence is begun. In the end flag 323, "1" is set when a process for this sequence is completed. In the error flag 324, "1" is set when an abnormality is detected in a process for this sequence. In the timeout flag 325, "1" is set when a process for this sequence has reached timeout. The count value 326 is used for detecting a processor in which an abnormality has occurred. The specific manners of using the various data contained in the sequence management information 320 will be described later.

Figure 24:
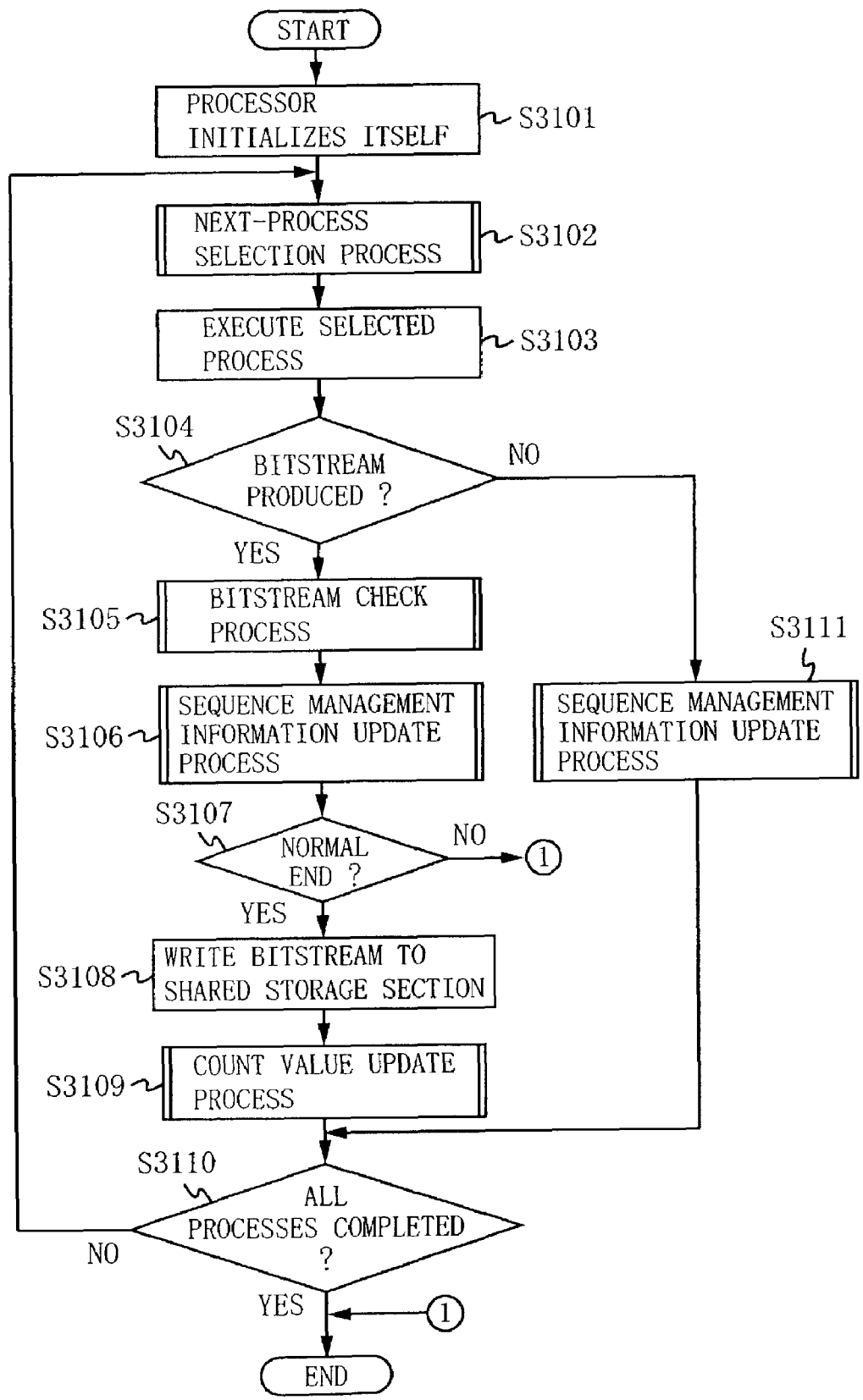
FIG. 24 is a flowchart illustrating a main process executed by each processor in the moving picture encoding apparatus according to the fourth embodiment of the present invention.

FIG. 24 is a flowchart illustrating a main process executed by each processor 301. When executing the encoding process program 32 shown in FIG. 2, each of the n processors 301-1 to 301-n operates in accordance with the flowchart shown in FIG. 24. As shown in FIG. 24, each processor 301 selects a process to be next executed through a next-process selection process (FIG. 25), and if a bitstream has been produced in the selected process, executes a bitstream check process (FIG. 26), a sequence management information update process (FIG. 27), and a count value update process (FIG. 28).

The details of the steps shown in FIG. 24 are as follows. Once activated, the processor 301 first performs an initialization process (step S3101). In the initialization process, the processor 301 performs processes such as initialization of the encoding process data within its own RAM (encoding process data 33 shown in FIG. 2). Then, the processor 301 selects a process to be next executed through the next-process selection process (FIG. 25; described later) (step S3102). At step S3102, the processor 301 selects a sequence and a GOP to be next processed, and selects a unit process among the process(es) which are executable with respect to the selected GOP.

Next, the processor 301 executes the process selected at step S3102 (step S3103). More specifically, the processor 301 reads necessary data from the shared storage section 302 and writes it to its own RAM (i.e., the RAM 23 shown in FIG. 2), and executes the selected process for the data in the RAM. In addition, unless a bitstream has been produced in the selected process, the processor 301 reads the result obtained in the selected process from its own RAM and writes it to the shared storage section 302. Thereafter, if a bitstream has been produced in the process of step S3103, the processor 301 proceeds to step S3105, and otherwise proceeds to step S3111 (step S3104).

If a bitstream has been produced in the process of step S3103 (following the "YES" path from step S3104), the processor 301 performs the bitstream check process (FIG. 26; described later) to check whether the produced bitstream is normal or not (step S3105). Then, through the sequence management information update process (FIG. 27; described later), the processor 301 updates the sequence management information 320, based on the result of the bitstream check process (step S3106). If an abnormality is detected in the bitstream check process, the processor 301 records the detection of the abnormality in the sequence management information 320.

Next, the processor 301 determines whether the process of step S3103 has reached a normal end or not. If it is determined that a normal end has been reached, the processor 301 proceeds to step S3108 (step S3107). In this case, the processor 301 writes the bitstream produced at step S3103 to the sequence process data 330 in the shared storage section 302 (step S3108), and executes the count value update process (FIG. 28; described later) (step S3109). Note that step S3107 detects a failure to reach a normal end not only if an abnormality is detected in the bitstream check process, but also if another processor determines that the process of step S3103 has reached timeout (as described later).

If a bitstream has not been produced in the process of step S3103 (following the "NO" path from step S3104), the processor 301 performs the sequence management information update process, which is the same as that performed at step S3106 (FIG. 27) (step S3111), and proceeds to step S3110. It is assumed that the process of step S3103 is always considered to reach a normal end in the sequence management information update process of step S3111.

If it is determined that the process of step S3103 has reached a normal end, the processor 301 reaches step S3110. In this case, the processor 301 determines whether all encoding processes have been completed or not (step S3110). If all encoding processes have been completed (following the "YES" path from step S3110), the processor 301 ends the process. On the other hand, if any process is still left (following the "NO" path from step S3110), the processor 301 proceeds to step S3102 to continue on the encoding process.

If it is determined that the process of step S3103 has not reached a normal end (following the "NO" path from step S3107), the processor 301 determines that it is impossible to continue the encoding process, and ends the process. In this case, even if a bitstream has been produced in the process of step S3103, the processor 301 discards the bitstream without writing it to the shared storage section 302. The processor 301 which has detected an abnormality and stopped itself from operating will remain stopped until an instruction for reactivation is given from the user, who has presumably finished a maintenance checking and the like.

Figure 25:
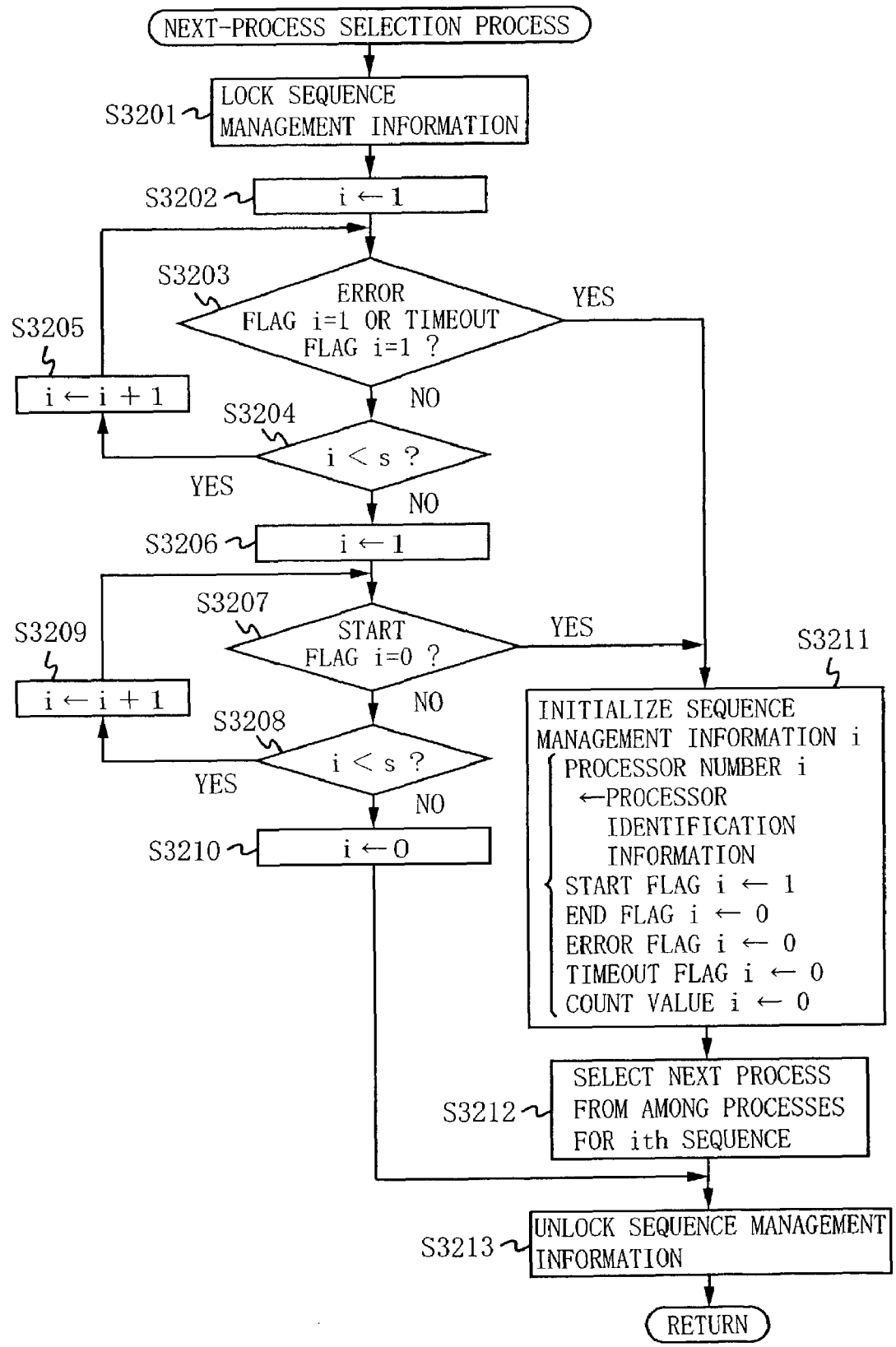
FIG. 25 is a flowchart illustrating a next-process selection process executed by each processor in the moving picture encoding apparatus according to the fourth embodiment of the present invention.

FIG. 25 is a flowchart illustrating the next-process selection process. As shown in FIG. 25, the processor 301 selects a sequence to be next processed from among the s sequences stored in the shared storage section 302, initializes the sequence management information 320 of the selected sequence, and then selects a process to be next executed from among a plurality of processes which are executable with respect to the selected sequence. The process shown in FIG. 25 is characterized in that processes which, when executed by another processor, have had an abnormality or reached timeout (i.e., processes whose error flag 324 or timeout flag 325 is "1") are selected with a higher priority.

The details of the steps shown in FIG. 25 are as follows. In the next-process selection process, the processor 301 first locks the sequence management information 320 (step S3201), and substitutes "1" for a variable i (step S3202).

Next, through the process from steps S3203 to S3205, the processor 301 looks for an element whose error flag 324 or timeout flag 325 is "1" from among the s elements in the sequence management information 320. More specifically, if the $i^{th}$ error flag 324 or the $i^{th}$ timeout flag 325 is "1" (following the "YES" path from step S3203), the processor 301 proceeds to step S3211. In this case, a process for the $i^{th}$ sequence is selected as a process to be next executed. If the $i^{th}$ error flag 324 and the $i^{th}$ timeout flag 325 are both "0" (following the "NO" path from step S3203) and the variable i is less than s (i.e., the total number of sequences) (following the "YES" path from step S3204), the processor 301 adds one to the variable i (step S3205), and proceeds to step S3203.

If the $i^{th}$ error flag 324 and the $i^{th}$ timeout flag 325 are both "0" (following the "NO" path from step S3203) and the variable i is equal to or greater than s (following the "NO" path from step S3204), the processor 301 proceeds to step S3206. In this case, the processor 301 substitutes "1" for the variable i (step S3206), and thereafter looks for an element whose start flag 322 is "0" among the s elements in the sequence management information 320, through the process from steps S3207 to S3209. More specifically, if the $i^{th}$ start flag 322 is "1" (following the "YES" path from step S3207), the processor 301 proceeds to step S3211. In this case, a process for the $i^{th}$ sequence is selected as a process to be next executed. If the $i^{th}$ start flag 322 is "1" (following the "NO" path from step S3207) and the variable i is less than s (i.e., the number of sequences) (following the "YES" path from step S3208), the processor 301 adds one to the variable i (step S3209), and proceeds to step S3207.

If the $i^{th}$ start flag 322 is "1" (following the "NO" path from step S3207) and the variable i is equal to or greater than s (following the "NO" path from step S3208), the processor 301 proceeds to step S3210. In this case, the processor 301 determines that no process to be next executed exists, and substitutes "0" for the variable i to indicate "no next process" (step S3210), and thereafter proceeds to step S3213.

When a sequence to be next processed is selected at step S3203 or S3207, the processor 301 initializes the $i^{th}$ sequence management information 320 (step S3211). In other words, for the $i^{th}$ sequence management information 320, the processor 301 sets its own processor identification information 31 in the processor number 321, sets "1" in the start flag 322, and sets "0" in the end flag 323, the error flag 324, the timeout flag 325, and the count value 326. Then, processor 301 selects one of the unit processes which are executable for the $i^{th}$ sequence at this point as a process to be next executed (step S3212). Next, the processor 301 unlocks the sequence management information 320 (step S3213), thereby ending the next-process selection process.

In the next-process selection process shown in FIG. 25, those processes which have experienced an abnormality when executed by another processor (i.e., processes whose error flag 324 or timeout flag 325 is "1") are selected with a higher priority. If no such process exits, a sequence and a process whose start flag 322 is "0", i.e., a process which is not being executed by another processor, is selected. By thus executing a process which has experienced an abnormality at an early time, it is possible to execute the moving picture encoding process safely and securely.

Figure 26:
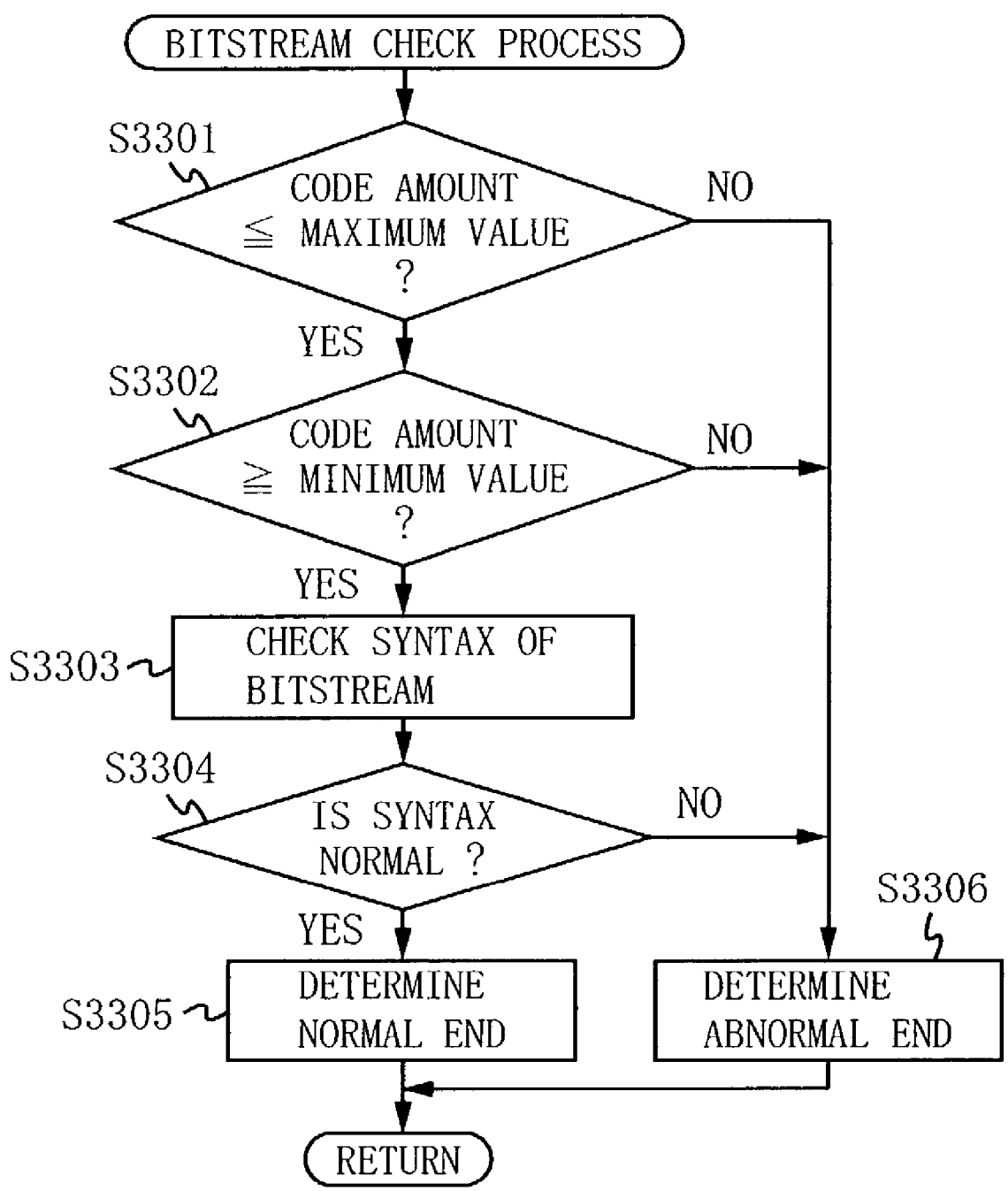
FIG. 26 is a flowchart illustrating a bitstream check process executed by each processor in the moving picture encoding apparatus according to the fourth embodiment of the present invention.

FIG. 26 is a flowchart illustrating the bitstream check process. In the bitstream check process, the processor 301 first checks whether the size (code amount) of the bitstream produced at step S3103 is within a predetermined range or not. More specifically, if the code amount is equal to or less than a predetermined maximum value (following the "YES" path from step S3301) and the code amount is equal to or greater than a predetermined minimum value (following the "YES" path from step S3302), the processor 301 proceeds to step S3303, and otherwise proceeds to step S3306.

Next, the processor 301 performs a detailed syntax check for the bitstream produced at step S3103 (step S3303). Then, if it is determined that the produced bitstream passes the syntax check, the processor 301 proceeds to step S3305, and otherwise proceeds to step S3306 (step S3304).

If the produced bitstream has passed all of the above three checks, the processor 301 determines that the bitstream is normal and that the process of step S3103 has reached a normal end (step S3305). On the other hand, if the produced bitstream fails to pass any of the above three checks, the processor 301 determines that the bitstream is abnormal and that the process of step S3103 has reached an abnormal end (step S3306). Upon thus making the determination of S3305 or S3306, the processor 301 completes the bitstream check process.

Figure 27:
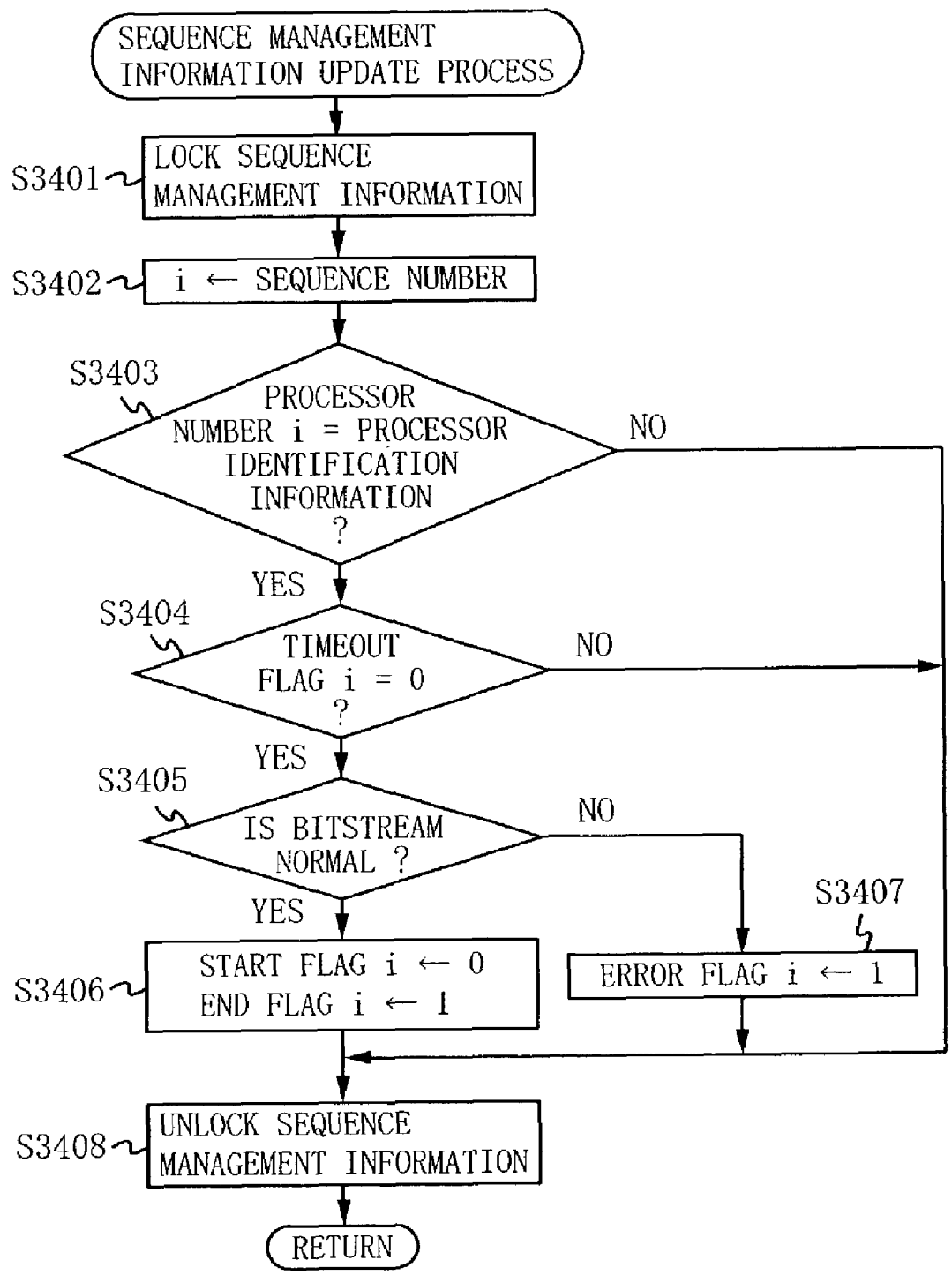
FIG. 27 is a flowchart illustrating a sequence management information update process executed by each processor in the moving picture encoding apparatus according to the fourth embodiment of the present invention.
Figure 28:
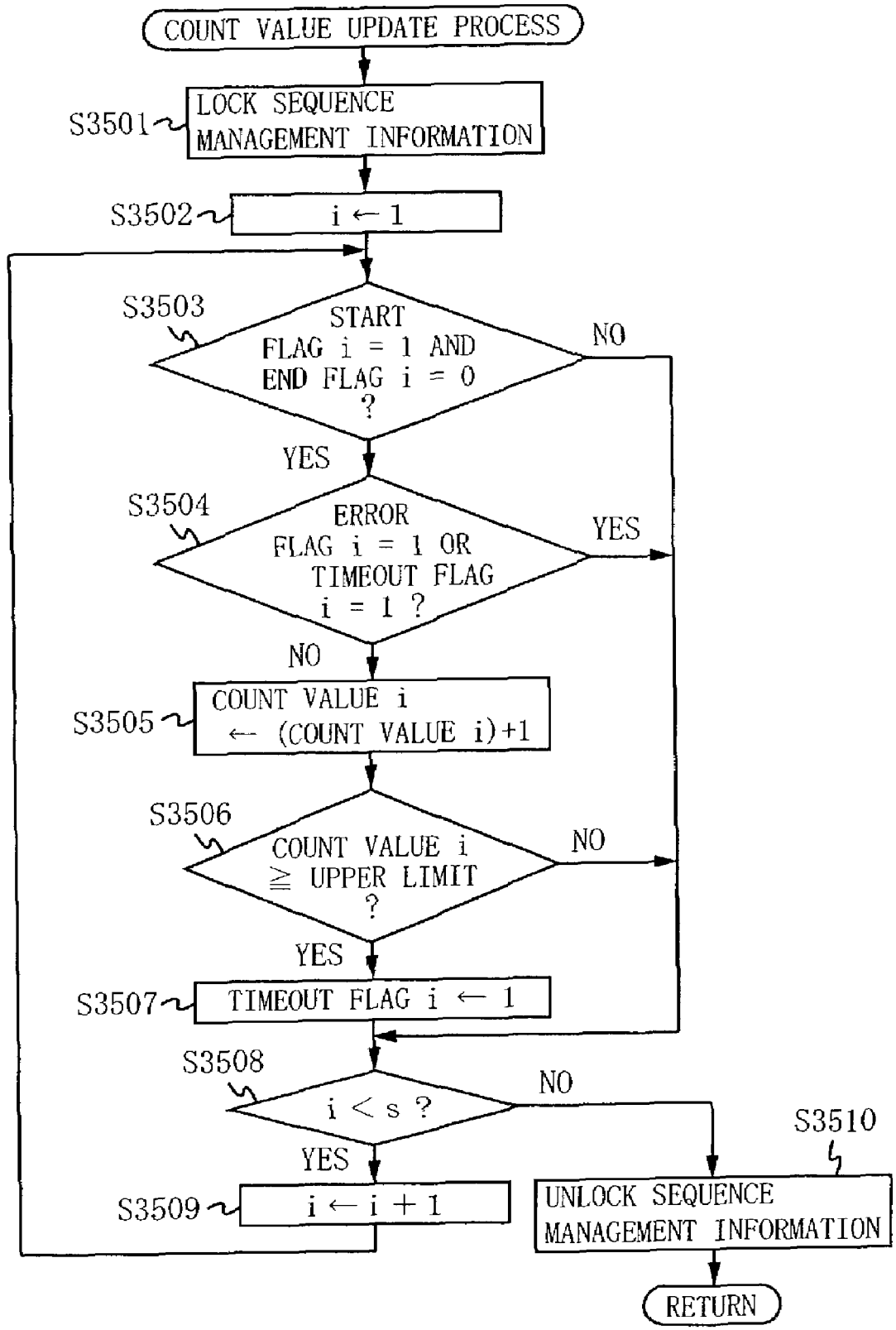
FIG. 28 is a flowchart illustrating a count value update process executed by each processor in the moving picture encoding apparatus according to the fourth embodiment of the present invention.

FIG. 27 is a flowchart illustrating the sequence management information update process. In the sequence management information update process, the processor 301 first locks the sequence management information 320 (step S3401), and substitutes the sequence number of the sequence processed at step S3103 for a variable i (step S3402).

Next, through the process of steps S3404 and S3403, the processor 301 determines if the sequence processed by the processor 301 itself is not being processed by another processor. More specifically, if the $i^{th}$ processor number 321 coincides with its own processor identification information 311 (following the "YES" path from step S3403) and the $i^{th}$ timeout flag 325 is "0" (following the "YES" path from step S3404), the processor 301 proceeds to step S3405; otherwise, the processor 301 proceeds to step S3408.

In the former case, the processor 301 updates the $i^{th}$ sequence management information 320 in accordance with the result of executing the process of step S3103. More specifically, the processor 301 determines whether the process of step S3103 has reached a normal end or not (step S3405). If the process has reached a normal end (following the "YES" path from step S3405), the processor 301 sets "0" in the $i^{th}$ start flag 322, and sets "1" in the $i^{th}$ end flag 323 (step S3406). If the process has not reached a normal end (following the "NO" path from step S3405), the processor 301 sets "1" in the $i^{th}$ error flag 324 (step S3407). Then, the processor 301 unlocks the sequence management information 320 (step S3408), thereby ending the sequence management information update process.

In accordance with the sequence management information update process shown in FIG. 27, if an abnormality occurs when executing a selected process, the detection of the abnormality is recorded in the error flag 324 of the sequence management information 320 stored in the shared storage section 302. The error flag 324 is referred to when selecting a process to be next executed in the above-described next-process selection process (FIG. 25).

FIG. 28 is a flowchart illustrating the count value update process. In the count value update process, the processor 301 first locks the sequence management information 320 (step S3501), and substitutes "1" for the variable i (step S3502).

Next, through the process from steps S3503 to S3509, the processor 301 updates the count value 326 for each sequence, and detects whether or not a process by another processor has reached timeout using the count value 326, in the following manner. If the $i^{th}$ start flag 322 is "1" and the $i^{th}$ end flag 323 is "0", the processor 301 proceeds to step S3504, and otherwise proceeds to step S3508 (step S3503). At step S3504, if the $i^{th}$ error flag 324 or the $i^{th}$ timeout flag 325 is "1", the processor 301 proceeds to step S3508, and otherwise proceeds to step S3505.

In the former case, the processor 301 adds one to the $i^{th}$ count value 326 (step S3505). Then, if the $i^{th}$ count value 326 is equal to or greater than a predetermined upper limit (following the "YES" path from step S3506), the processor 301 sets "1" in the $i^{th}$ timeout flag 325 (step S3507).

Next, if the variable i is less than s (i.e., the number of sequences) (following the "YES" path from step S3508), the processor 301 adds one to the variable i (step S3509), and thereafter proceeds to step S3503. In this case, the processor 301 performs the process from steps S3503 to S3508 for the next sequence. On the other hand, if the variable i is equal to or greater than s (following the "NO" path from step S3508), the processor 301 unlocks the sequence management information 320 (step S3510), thereby ending the count value update process.

In accordance with the count value update process shown in FIG. 28, the count value 326 of the sequence processed by the processor is updated, and if the updated count value 326 is equal to or greater than an upper limit, "1" is set in the timeout flag 325 of the sequence. The timeout flag 325 is referred to when making a determination as to whether a selected process has reached a normal end or not in the above-described sequence management information update process (FIG. 27).

In accordance with the flowcharts shown in FIGS. 24 to 28, the processor 301 detects any abnormality occurring when executing a selected process by checking the size, syntax, and processing time of the bitstream, and upon detection of an abnormality, records the detection of the abnormality in the sequence management information 320 and stops itself from operating. Moreover, upon detection of an abnormality, the processor 301 discards the produced bitstream without writing it back to the shared storage section 302, and remains stopped until an instruction for reactivation is given from the user, who has presumably finished a maintenance checking and the like.

Furthermore, the processor 301 updates the count value 326 of each sequence, and if the count value 326 (which was initialized at the beginning of a process) has become equal to or greater than a predetermined value, the processor 301 determines that the process has reached timeout, and records the detection of timeout in the sequence management information 320. Based on the sequence management information 320, upon detecting that its own process has reached timeout, the processor 301 stops itself from operating, as in the case where an abnormality is detected in the checking of the bitstream. In this case, the process which is determined to have reached timeout is executed with a higher priority, by a processor 301 other than the processor which has stopped operating.

FIG. 29 is a timing diagram illustrating a manner in which each processor in the moving picture encoding apparatus according to the present embodiment operates. In the example illustrated in FIG. 29, it is assumed that the moving picture encoding apparatus includes first to sixth processors and that the first processor has stopped operating due to malfunctioning. It is also assumed that the second to sixth processors execute encoding processes for different sequences, independently of one another, thereby generating bitstreams. In the example illustrated in FIG. 29, the fourth processor is the first to complete an encoding process (which is directed to the first sequence) among the five operating processors. Next to an encoding process, the fourth processor checks whether the produced bitstream is normal or not. The fourth processor determines that the bitstream is normal, and performs a next process selection process after time t1. At this point, the encoding process for the first sequence has already been completed, and encoding processes for the second to fifth sequences are being executed by other processors. Therefore, the fourth processor selects an encoding process for the sixth sequence as a process to be next executed, and begins to execute this process.

Next, the fifth processor may complete an encoding process for the second sequence. Next to its encoding process, the fifth processor checks whether the produced bitstream is normal or not. The fifth processor determines that the bitstream is not normal, and stops itself from operating at time t2.

Next, the second processor may complete an encoding process for the fourth sequence. Next to its encoding process, the second processor checks whether the produced bitstream is normal or not. The second processor determines that the bitstream is normal, and performs a next-process selection process after time t3. At this point, the occurrence of an abnormality in the process for the second sequence is recorded in the error flag 324 of the sequence management information 320 stored in the shared storage section 302. Therefore, the second processor selects the encoding process for the second sequence (in which an abnormality occurred when executed by another processor) as a process to be next executed, and begins to execute this process.

Next, the third processor may normally complete its encoding process for the third sequence. The third processor performs a next-process selection process after time t4, and begins an encoding process for the seventh sequence. Next, the sixth processor may normally complete its encoding process for the fifth sequence. The sixth processor performs a next-process selection process after time t5, and begins an encoding process for the eighth sequence.

As shown in FIG. 29, if an abnormality occurs in an encoding process for any sequence, the processor which executed this process stops operating, and another processor executes this process instead. While the example shown in FIG. 29 illustrates the case where the produced bitstream has an abnormality, the same similarly applies to the case where an encoding process reaches timeout.

As described above, in accordance with the moving picture encoding apparatus of the present embodiment, each processor selects and executes a next process based on the progress of an encoding process stored in the shared storage section, and if an abnormality occurs when executing the selected process, stops itself from operating. The selection and execution of a process, abnormality detection, and stopping of operation in each processor are performed at arbitrary points in time, independently from any other processor. Therefore, without the need to provide a processor dedicated to handling the execution control over encoding processes, it is possible to detect any processor which has become abnormal, during an encoding process. Thus, it is possible to easily repair or exchange a processor even during an encoding process, and continue the encoding process so long as at least one processor is operating normally.

By performing the abnormality detection based on the size and syntax of the produced bitstream, or the processing time of the selected process, etc., it is possible to easily detect an abnormal processor during an encoding process. Since a count value which is stored in the shared storage section is updated by each processor and abnormal processors can be detected based on such count values, it is possible to detect an abnormal processor by calculating the time required for the process, without the need to activate a timer in each processor. Since the detected abnormality of a processor is recorded in the shared storage section and each processor executes any process that has experienced an abnormality with a higher priority, the moving picture encoding process can be executed safely and securely.

If an abnormality has occurred in a bitstream, the bitstream which was produced before the occurrence of the abnormality is utilized in its intact form, and just as much encoding processing as is required for obtaining the subsequent portion of the bitstream is again executed. Since the process which has experienced an abnormality is recorded in the sequence management information, the abnormal processor can be easily identified by analyzing this information. Thus, the maintenance of the apparatus can be facilitated, and a decrease in the availability of the entire apparatus due to malfunctioning can be prevented.

If the sequences stored in the shared storage section or the program stored in each processor has an abnormality, a bug, or the like, the same abnormality will occur in all processors, so that the entire apparatus will stop operating. In this case, too, the process is interrupted at the time when the abnormality occurs, so that the cause for the abnormality can be easily examined, without allowing any abnormal bitstream to be outputted.

Since each processor checks for an abnormality when executing a selected process on its own and stops itself from operating upon detection of an abnormality, it is not necessary to perform a complicated abnormality detection process, which would otherwise be required for a parallel processing apparatus. Since each processor independently selects a process to be next executed, the reencoding process when an abnormality has occurred can be easily performed in the manner of a next-process selection process, and the function of adding or deleting a processor at an arbitrary point in time can be easily provided.

Fifth Embodiment

The moving picture encoding apparatus according to the fifth embodiment of the present invention is characterized by a shared storage section which has a distributed file system. Specifically, the shared storage section includes a plurality of image storage devices which are capable of independent access. During the execution of a motion vector search, moving picture data to be encoded is stored into each image storage device in a distributed manner.

FIG. 30 is a diagram showing the detail structure of the shared storage section in the moving picture encoding apparatus according to the present embodiment. FIG. 30 shows a shared storage section 402 and a switching hub 404, which are more detailed representations of the shared storage section 2 and the network 4, respectively, shown in FIG. 1. The n processors 401-1 to 401-n correspond to the processors 1-1 to 1-n shown in FIG. 1. The system management section 403 corresponds to the system management section 3 shown in FIG. 1. The image inputting section 411 corresponds to the image inputting section 11 shown in FIG. 1.

The image inputting section 411 includes a digital video cassette recorder (DVCR) 412 and a disc recorder 413. A cassette recording medium, in which moving picture data to be encoded is recorded, is mounted in the digital video cassette recorder 412. The disc recorder 413 stores the unencoded moving picture data outputted from the digital video cassette recorder 412 in a predetermined file format, frame by frame.

The shared storage section 402 includes a parameter storage device 421, q image storage devices 422-1 to 422-q, and a bitstream storage device 423. The parameter storage device 421 stores control parameters which are necessary for the encoding process by each processor 401, and is accessed by all of the n processors 401-1 to 401-n. The q image storage devices 422-1 to 422-q store the moving picture data which is necessary for the encoding process in each processor 401 in a distributed manner. The detailed method of storing moving picture data in a distributed manner will be described later. The bitstream storage device 423 stores a bitstream of the encoding result.

Each of the storage devices (illustrated as (q+2) storage devices in FIG. 30) included in the shared storage section 402, which can be implemented as a NAS (Network Attached Storage), is independently coupled to the switching hub 404. Therefore, each processor 401 can independently access the storage devices included in the shared storage section 402. The number q of image storage devices 422 is selected so that the access from the processors 401 will not bottleneck the encoding processes. So long as this condition is satisfied, the number q of image storage devices 422 may be smaller than n, i.e., the number of processors 401. For example, if n (the number processors 401) is about 10 to about 20, q (the number of image storage devices 422) may be about 2 to about 6.

Via a switching structure, the switching hub 404 interconnects the disc recorder 413, the n processors 401-1 to 401-n, the parameter storage device 421, the q image storage devices 422-1 to 422-q, and the bitstream storage device 423. The switching hub 404 has a sufficient data switching capacity so that the access from the processors 401 will not bottleneck the encoding processes. The switching hub 404 does not need to interconnect all the coupled devices via a switching structure. It will suffice if the switching hub 404 at least interconnects via a switching structure those devices which need to exchange data for executing a moving picture encoding process.

FIG. 31 is a diagram illustrating the details of control parameters stored in each parameter storage device 421. As shown in FIG. 31, the control parameters for each of the s sequences include sequence attribute information 430 and sequence management information 440. The sequence management information 440 contains a processor number 441, a start flag 442, an end flag 443, an error flag 444, a timeout flag 445, and a count value 446. The elements contained in the sequence management information 440 are the same as those described in the fourth embodiment (see FIG. 23), and the descriptions thereof are omitted.

As information representing the attributes of each sequence information, the sequence attribute information 430 contains a sequence number 431, a start time 432, an end time 433, GOP structural information 434, a server name 435, a target bit rate 436, an image storage device number 437, a bitstream production flag 438, and the like. The sequence number 431 represents the number of the sequence. The start time 432 and the end time 433 represent a start time and an end time of a sequence in units corresponding to frames. The GOP structural information 434 represents the GOP structure of the sequence. In the example illustrated in FIG. 31, the GOP structural information 434 for the first sequence indicates that a GOP consists of fifteen pictures, including three I pictures, and that the first picture in the GOP is an I picture. The server name 435 represents the name of a server in which the sequence was stored before the encoding process. The target bit rate 436 represents a desirable bit rate when encoding a sequence. The image storage device number 437 represents the number of the image storage device in which the sequence is stored during an encoding process. In the example illustrated in FIG. 31, the image storage device number 437 takes a value in the range from 1 to q. The bitstream production flag 438 indicates whether a bitstream has already been produced or not. The bitstream production flag 438 takes "1" if a bitstream has already been produced, and otherwise takes "0".

In general, the process which requires the greatest computation amount in a moving picture encoding process is a motion vector search. Therefore, the moving picture encoding apparatus of the present embodiment encodes moving picture data in a two-path process, which involves performing a process including a motion vector search process through a first path, and performing any process after the motion vector search process through a second path. More specifically, in the first path, not only the motion vector search but also processes such as feature extraction, scene detection, GOP structure determination, temporary encoding, and bit allocation are performed; and in the second path, a final encoding is performed by using the motion vector search result obtained through the first path. The final encoding includes processes such as interframe difference computation, orthogonal transform, quantization, variable length coding, local decoding, and encoding control. In the second path, a motion vector search may be performed for a number of macroblocks for which no motion vector search result has been obtained in the first path. When a moving picture encoding process is performed in a two-path process as such, the computation involved in the motion vector search bottlenecks the process in the first path, whereas the access to the shared storage section 402 bottlenecks the process in the second path. Therefore, during the execution of the process in the first path, the moving picture encoding apparatus of the present embodiment performs a process of storing moving picture data in the shared storage section 402 in a distributed manner, this being a preparation for executing the process in the second path.

Figure 32:
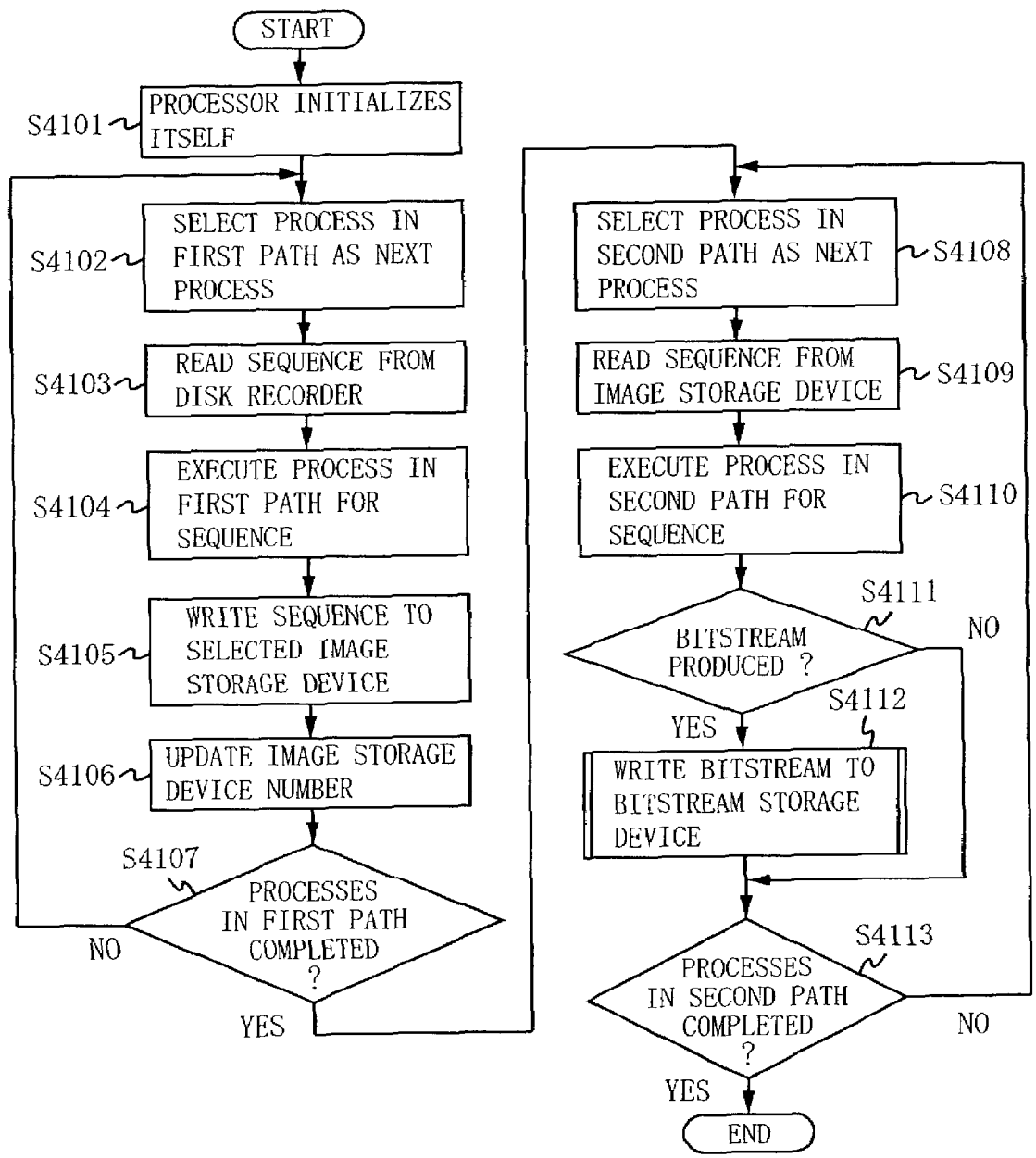
FIG. 32 is a flowchart illustrating a main process executed by each processor in the moving picture encoding apparatus according to the fifth embodiment of the present invention.

FIG. 32 is a flowchart illustrating a main process executed by each processor 401. When executing the encoding process program 32 shown in FIG. 2, each of the n processors 401-1 to 401-n operates in accordance with the flowchart shown in FIG. 32. It is assumed that, before the process shown in FIG. 32 is performed, moving picture data is read from the digital video cassette recorder 412 and stored frame-by-frame in the disc recorder 413 in a file format, under control by the system management section 403. FIG. 32 shows the operation of the processor 401 after being activated by the system management section 403.

Once activated, the processor 401 first performs an initialization process (step S4101). In the initialization process, the processor 401 performs processes such as initialization of the encoding process data (i.e., encoding process data 33 shown in FIG. 2) in its own RAM. Then, the processor 401 selects a process included in the first path as a next process (step S4102), and reads a sequence to be processed from the disc recorder 413. Then, the processor 401 performs the process selected at step S4102 for the sequence read at step S4103 (step S4104). In step S4104, processes such as feature extraction, scene detection, GOP structure determination, motion vector detection, temporary encoding, and bit allocation are performed.

Next, the processor 401 selects one of the q image storage devices 422-1 to 422-q, and writes the sequence which was read at step S4102 in the selected image storage device (step S4105). The method of selecting an image storage device will be described later. Next, the processor 401 updates the image storage device number 437 stored in the parameter storage device 421 (step S4106). For example, if an $i^{th}$ sequence is written to the $j^{th}$ image storage device 422-j, the processor 401 sets "j" in the image storage device number 437 for the $i^{th}$ sequence. Next, the processor 401 determines whether all of the processes in the first path have been completed or not (step S4107). If not all of the processes in the first path have been completed (following the "NO" path from step S4107), the processor 401 proceeds to step S4012 and again selects and executes a process in the first path.

If all processes in the first path have been completed (following the "YES" path from step S4107), the processor 401 proceeds to step S4108. In this case, the processor 401 selects a process included in the second path as a next process (step S4108), and reads the image storage device number 437 of a sequence which the next process is directed to from the parameter storage device 421, and reads the sequence from the image storage device 422 bearing that number (step S4109). Next, the processor 401 performs the process selected at step S4108 for the moving picture data which was read at step S4109 (step S4110). At step S4110, processes such as interframe difference computation, orthogonal transform, quantization, variable-length coding, local encoding, and encoding control are performed.

Next, the processor 401 determines whether a bitstream has been produced in the process of step S4110 or not (step S4111). If a bitstream has been produced (following the "YES" path from step S4111), a process of writing the produced bitstream to the bitstream storage device 423 (FIG. 33) is performed (step S4112). Then, the processor 401 determines whether all of the processes in the second path have been completed or not (step S4113). If not all of the processes in the second path have been completed (following the "NO" path from step S4113), the processor 401 proceeds to step S4018 and again selects and executes a process in the second path. If all of the processes in the second path have been completed (following the "YES" path from step S4113), the processor 401 ends the process.

Thus, processes in the first path are executed from steps S4102 to S4107, and processes in the second path are executed from steps S4108 to S4113. Any moving picture data which is inputted from the image inputting section 411 during the execution of a process in the first path is written to the q image storage devices 422-1 to 422-q in a distributed manner. Thus, a distributed file system which is necessary for the execution of the second path is established during the execution of the processes in the first path.

Various methods are possible for selecting an image storage device to write a sequence to at step S4105 from among the q image storage devices 422-1 to 422-q. A first method is to preassign such an image storage device for each processor. A second method is to preassign such an image storage device for each sequence number. A third method involves storing the number of sequences or the number of frames stored in each image storage device in the parameter storage device 421, and based on this information, allowing each processor 401 to dynamically select an image storage device so that the amount of moving picture data stored becomes equal for each image storage device. Since the processor 401 updates the image storage device number 437 contained in the parameter storage device 421 at step S4106, any of the above methods will permit the processor 401 to know, at the time of executing a process in the second path, which of the image storage devices stores the sequence to be processed. Therefore, even if the processor which writes a sequence in the first path and the processor which reads a sequence in the second path are different, the moving picture encoding process can still be executed properly.

Figure 33:
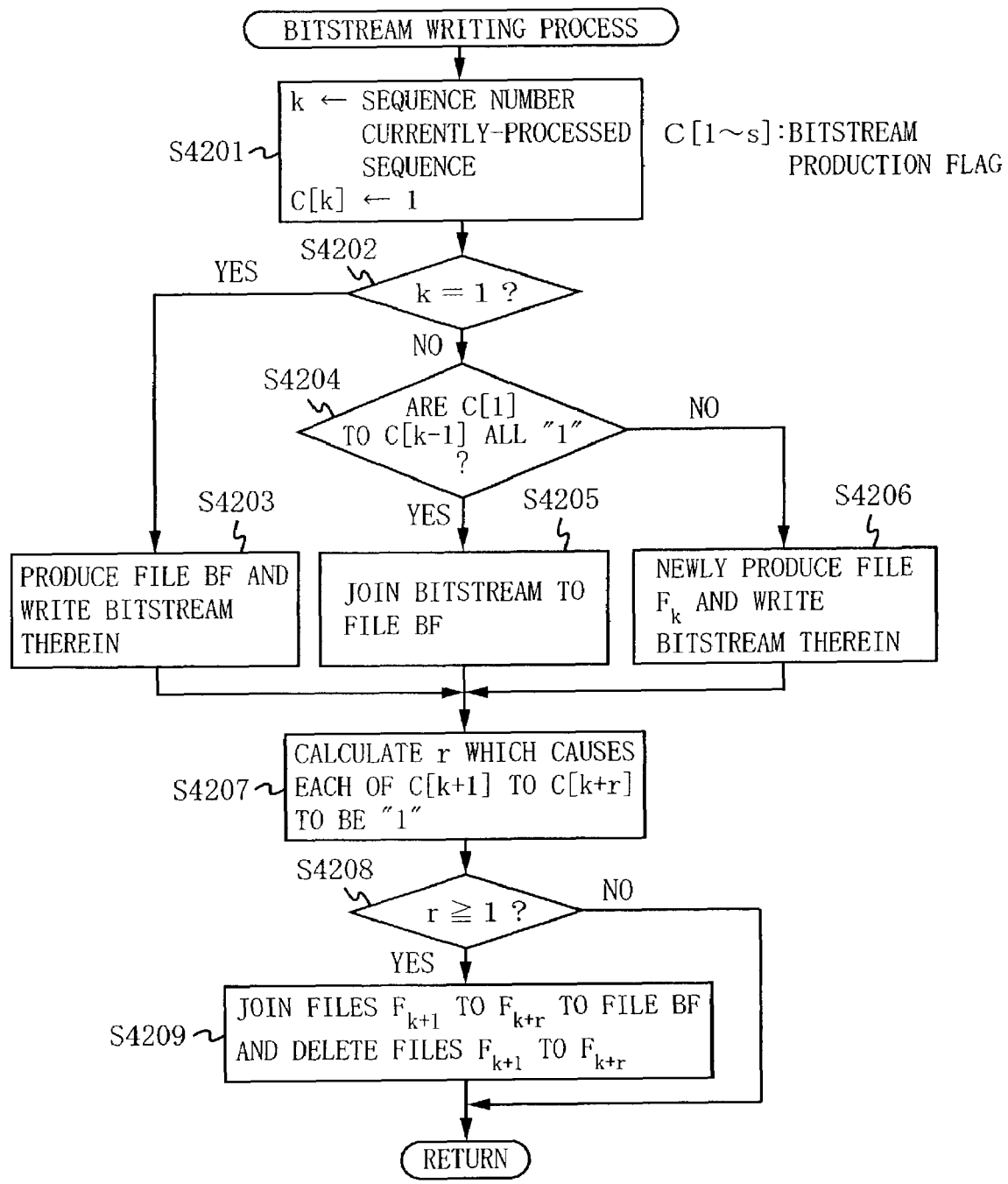
FIG. 33 is a flowchart illustrating a bitstream writing process executed by each processor in the moving picture encoding apparatus according to the fifth embodiment of the present invention.
Figure 34:
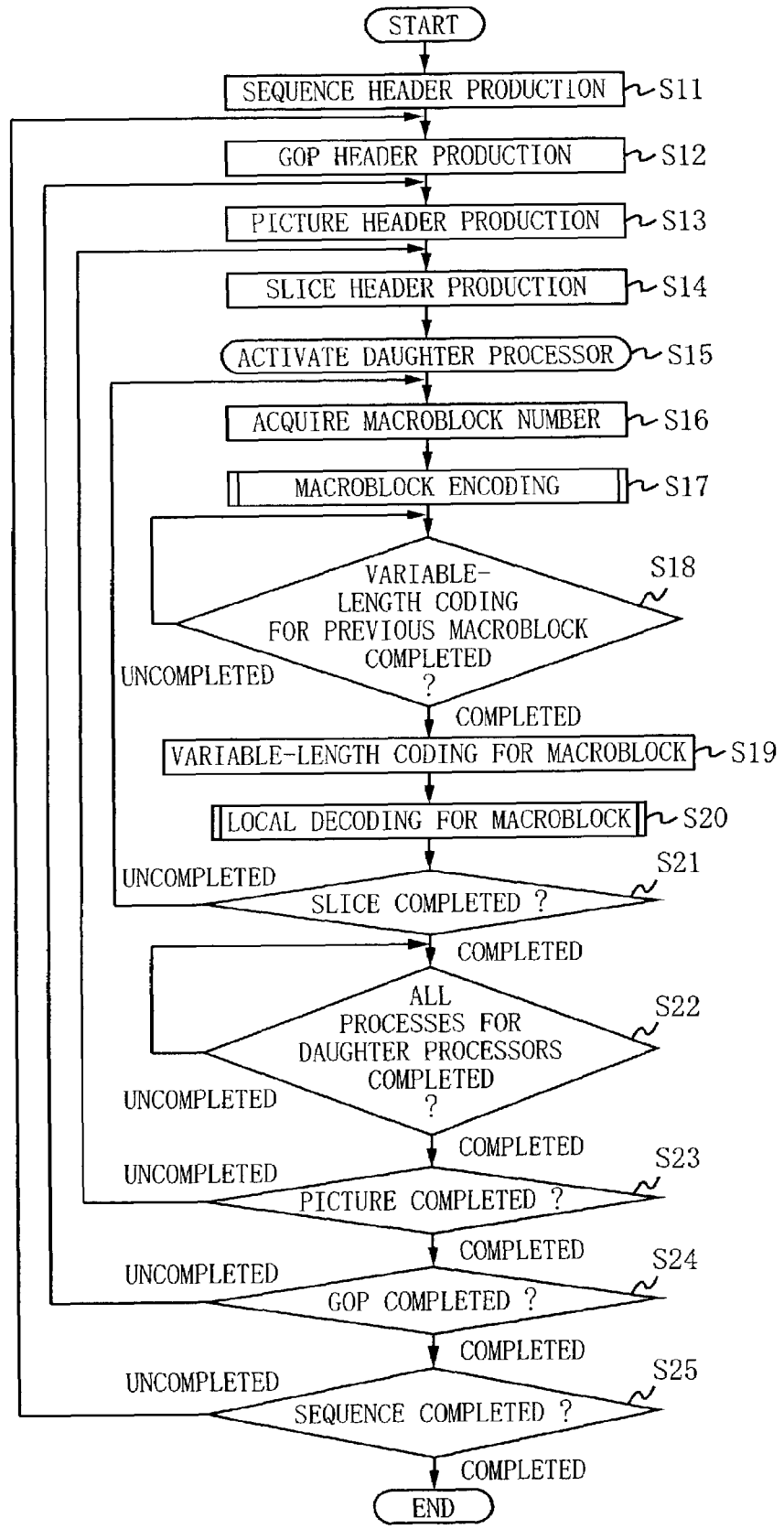
FIG. 34 is a flowchart illustrating a process performed by a mother processor in a conventional moving picture encoding apparatus.
Figure 35:
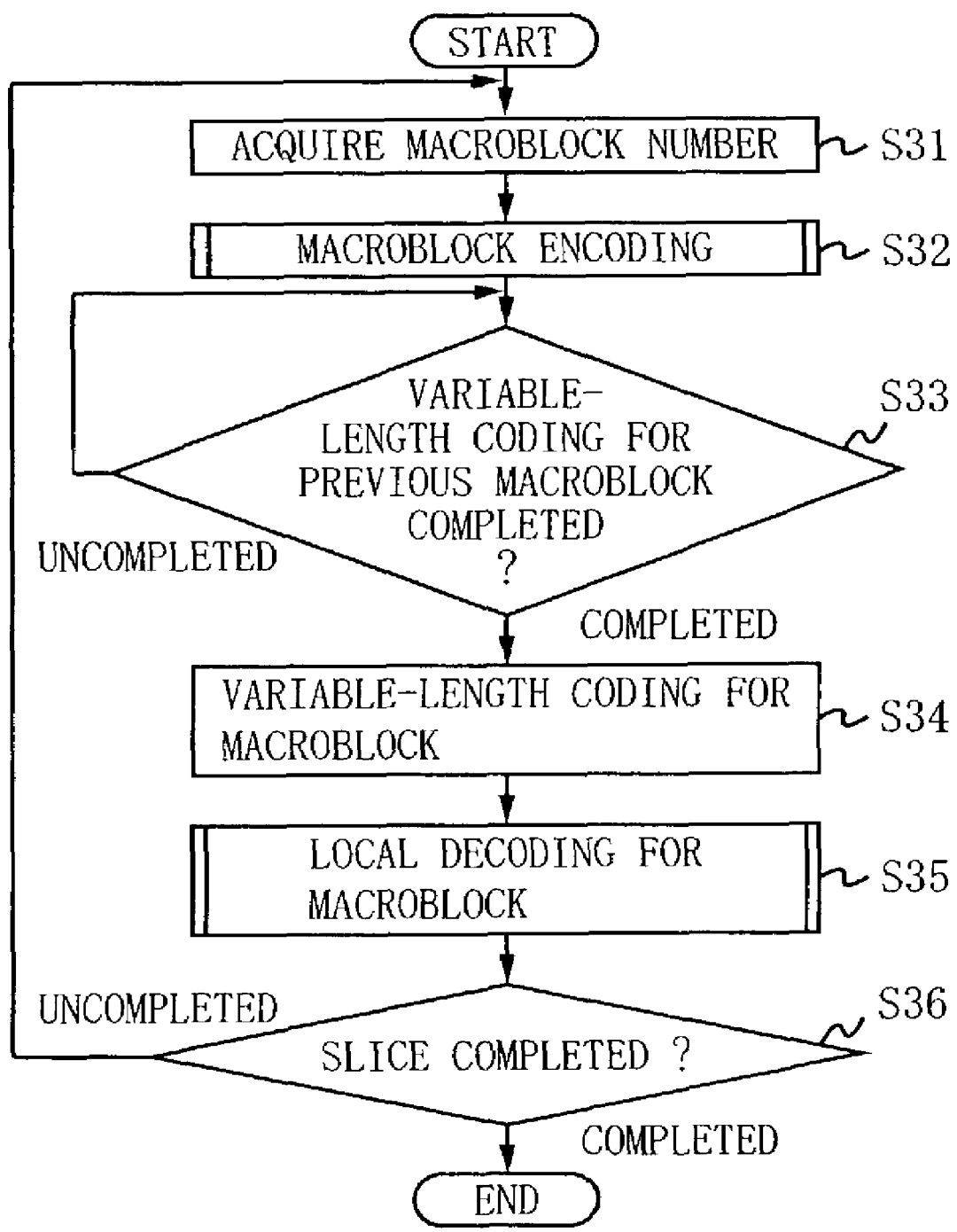
FIG. 35 is a flowchart illustrating a process performed by a daughter processor in a conventional moving picture encoding apparatus.

FIG. 33 is a flowchart illustrating a bitstream writing process performed by the processor 401. Hereinafter, the bitstream production flag 438 of an $i^{th}$ sequence stored in the parameter storage device 421 will be represented as C[i] In the bitstream writing process, the processor 401 first substitutes the sequence number 431 of a currently-processed sequence for a variable k, and sets "1" in the bitstream production flag 438 of a $k^{th}$ sequence (step S4201) Next, the processor 401 determines whether k is "1" or not (step S4202) If k is "1" (following the "YES" path from step S4202), the processor 401 produces a bitstream-writing file BF to write the beginning portion of the bitstream therein, and writes the produced bitstream in the resultant file BF (step S4203).

If step S4202 finds that k is not "1" (following the "NO" path from step S4202), the processor 401 determines whether or not C[1] to C[k−1] are all "1" in order to check whether any portion prior to the produced bitstream has already been produced or not (step S4204). If C[1] to C[k−1] are all "1" (following the "YES" path from step S4204), the processor 401 joins the produced bitstream to the stream-writing file BF (step S4205). Otherwise (following the "NO" path from step S4024), the processor 401 newly produces a file $F_k$ in addition to the bitstream-writing file BF, and writes the produced bitstream to the file $F_k$ (step S4206).

After step S4203, S4205, or S4206, the processor 401 proceeds to step S4207. Next, in order to check whether any portion after the produced bitstream has already been produced or not, the processor 401 calculates a value r which causes each of C[k+1] to C[k+r] to be "1" (step S4207). Then, the processor 401 checks whether or not this value r is equal to or greater than one (step S4208). If r is equal to or greater than one (following the "YES" path from step S4208), the processor 401 joins files $F^{k+1}$ to $F_{k+r}$ to the bitstream-writing file BF in an appropriate order, and thereafter deletes the files $F_{k+1}$ to $F_{k+r}$ (step S4209). Thus, the processor 401 ends the bitstream writing process.

Hereinafter, the effects of the moving picture encoding apparatus of the present embodiment will be described. In general, when a moving picture encoding process is performed by employing a plurality of processors, access to data (in particular the original image data) bottlenecks the process, thereby prolonging the encoding process time. Therefore, it becomes possible to perform real-time processing, which is an ideal when performing a moving picture encoding process in a parallel manner.

In the moving picture encoding apparatus of the present embodiment, sequences contained in moving picture data are stored in a distributed manner to a plurality of image storage devices 422-1 to 422-q. The respective processors 401 independently access the sequences which are thus stored in a distributed manner. Thus, by storing sequences in an optimally distributed manner such that no competitive access will occur from the processors 401, it becomes possible to prevent the access from the processors 401 from bottlenecking the encoding processes.

In the moving picture encoding apparatus of the present embodiment, sequences which are inputted from the disc recorder 413 are stored in a distributed manner to the shared storage section 402 during the execution of a motion vector search. After the motion vector search is completed, the processors 401 execute parallel encoding processes for the sequences which are stored in a distributed manner. The calculation tasks bottleneck the processing of a motion vector search, whereas input/output bottlenecks the processes after the motion vector search. Therefore, the period of executing a motion vector search, which does not involve much input/output processing, can be effectively utilized for storing moving picture data in a distributed manner to a plurality of image storage devices, in preparation for rapidly performing the processes after the motion vector search which do involve substantial input/output processing. As a result, the input/output processing is prevented from bottlenecking the processes after the motion vector search. Thus, in accordance with the moving picture encoding apparatus of the present embodiment, it is possible to perform a moving picture encoding process rapidly. Therefore, by providing a sufficient number of processors 401, it even becomes possible to perform a moving picture encoding process (other than the motion vector search) substantially in real time.

When performing a moving picture encoding process by employing a plurality of processors in parallel, the bitstreams of the encoding results are produced at arbitrary points in time. The produced bitstreams are split in short portions, with various lengths. Therefore, it is necessary to join these partial bitstreams into a single bitstream. Note, however, if a processor which has produced a bitstream is also in charge of joining that bitstream, it becomes necessary to achieve synchronization between processors in the case where the bitstreams need to be joined in an order which is different from the order in which they are produced. Therefore, such a method would require one processor to wait for another processor to finish processing, thereby resulting in a long total processing time.

In contrast, in accordance with the moving picture encoding apparatus of the present embodiment, if a processor 401 produces a certain portion of a bitstream although the preceding portion thereof is not produced yet, the processor 401 writes the produced bitstream to the bitstream storage device 423 for later joining. The joining process for this bitstream will be handled by another processor. Therefore, even in the case where bitstreams need to be joined in an order which is different from the order in which they are produced, a given processor does not need to wait for another processor to finish processing, but can begin another executable process. As a result, it becomes possible to perform a moving picture encoding process rapidly.

The present invention is not limited to the above-described embodiments, but admits of various modifications. Since the same hardware structure is used by all of the above embodiments, it is possible to construct a moving picture encoding apparatus based on various combinations of any of the different features of these embodiments. For example, a moving picture encoding apparatus which combines the features of the first and third embodiments, or a moving picture encoding apparatus which combines the features of the first, fourth, and fifth embodiments can be constructed. Moreover, the moving picture encoding apparatus may include any number (i.e., more than one) of processors, and the respective processors may have different computation process abilities. Except for the fifth embodiment, the specific manner of connection between the processors and the shared storage section and the specific construction of the shared storage section may be arbitrarily selected.

In the first and second embodiments, the next-process selection processes performed by the respective processors may be directed to different processing contents, or the processes performed by some of the processors may be fixed. In the third embodiment, only some of the processors may update their programs in accordance with the selected next processes. Alternatively, the RAM or the like of each processor may store a number of programs which have previously been used by that processor, and when updating its program in accordance with the selected next process, the processor may use one of these programs individually stored therein, instead of a program stored in the shared storage section. In the fourth embodiment, even if the execution of a selected process does not result in any bitstream being produced, it may still be checked whether the process has reached a normal end or not. Alternatively, a count value update process may be performed, not only immediately after writing a bitstream to the shared storage section, but also at any arbitrarily selected point in the entire process executed by each processor.

While the invention has been described in detail, the foregoing description is in all aspects illustrative and not restrictive. It is understood that numerous other modifications and variations can be devised without departing from the scope of the invention.

What is claimed is:

1. A moving picture encoding apparatus comprising a plurality of processing units which operate in parallel, and a shared storage section which is commonly accessed by the plurality of processing units, wherein the shared storage section stores:

moving picture data which is split in predetermined units for independently applying processes thereto; and with respect to each of the split units of moving picture data, data necessary for an encoding process and a progress of the encoding process, wherein each of the plurality of processing units comprises:

next process selection means for, based on the progress of the encoding process as stored in the shared storage section, selecting one of the split units of moving picture data and a process to be next executed for the selected unit of moving picture data; and process execution means for executing the process selected by the next process selection means for the unit of moving picture data selected by the next process selection means, and wherein each of the plurality of processing units executes respective operations independently of one another.

2. The moving picture encoding apparatus according to claim 1, wherein the next process selection means selects one of a plurality of processes comprised in a moving picture encoding process as a process to be next executed.

3. The moving picture encoding apparatus according to claim 1, wherein each processing unit further comprises individual storage means for storing data necessary for the process by the processing unit, and prior to executing the process selected by the next process selection means, the process execution means reads the data necessary for the process from the shared storage section and stores the data into the individual storage means, thereafter executes the process for the data stored in the individual storage means, and reads data obtained from the process from the individual storage means and stores the data into the shared storage section.

4. The moving picture encoding apparatus according to claim 3, wherein, prior to executing the process selected by the next process selection means, if the data necessary for the process is not stored in the individual storage means, the process execution means reads the data necessary for the process from the shared storage section and stores the data into the individual storage means.

5. The moving picture encoding apparatus according to claim 1, wherein the shared storage section further stores identification management information for managing identification information concerning the plurality of processing units, and each of the plurality of processing units comprises:

processing unit addition means for acquiring an unused unit of identification information based on the identification management information; and processing unit deletion means for abandoning the identification information acquired by the processing unit addition means, wherein the next process selection means and the process execution means operate until the acquired identification information becomes abandoned.

6. The moving picture encoding apparatus according to claim 5, wherein the processing unit deletion means, when determining based on the identification management information that the identification information acquired by the processing unit addition means has become invalid, abandons the identification information.

7. A moving picture encoding apparatus comprising a plurality of processing units which operate in parallel, and a shared storage section which is commonly accessed by the plurality of processing units, wherein the shared storage section stores:

moving picture data which is split in predetermined units for independently applying processes thereto;

with respect to each of the split units of moving picture data, data necessary for an encoding process and a progress of the encoding process; and identification management information for managing identification information concerning the plurality of processing units, and each of the plurality of processing units comprising:

processing unit addition means for acquiring an unused unit of identification information based on the identification management information;

processing unit deletion means for abandoning the identification information acquired by the processing unit addition means; and encoding execution means for executing the encoding process for the moving picture data stored in the shared storage section until the acquired identification information becomes abandoned, wherein each of the plurality of processing units executes respective operations independently of one another.

8. The moving picture encoding apparatus according to claim 7, wherein the processing unit deletion means, when determining based on the identification management information that the identification information acquired by the processing unit addition means has become invalid, abandons the identification information.

9. A moving picture encoding method employing a plurality of processing units which operate in parallel, and a shared storage section which is commonly accessed by the plurality of processing units, wherein the shared storage section stores:

moving picture data which is split in predetermined units for independently applying processes thereto, and with respect to each of the split units of moving picture data, data necessary for an encoding process and a progress of the encoding process;

the moving picture encoding method comprising:
- a next process selection step, performed by each of the plurality of processing units based on the progress of the encoding process as stored in the shared storage section, of selecting one of the split units of moving picture data and a process to be next executed for the selected unit of moving picture data; and
- a process execution step, performed by each of the plurality of processing units, of executing the process selected by the next process selection step for the unit of moving picture data selected by the next process selection step, wherein each of the plurality of processing units executes respective operations independently of one another.

10. A moving picture encoding method employing a plurality of processing units which operate in parallel, and a shared storage section which is commonly accessed by the plurality of processing units, wherein the shared storage section stores:
- moving picture data which is split in predetermined units for independently applying processes thereto;
- with respect to each of the split units of moving picture data, data necessary for an encoding process and a progress of the encoding process; and
- identification management information for managing identification information concerning the plurality of processing units;

the moving picture encoding method comprising:
- a processing unit addition step, performed by each of the plurality of processing units, of acquiring an unused unit of identification information based on the identification management information;
- a processing unit deletion step, performed by each of the plurality of processing units, of abandoning the identification information acquired in the processing unit addition step; and
- an encoding execution step, performed by each of the plurality of processing units, of executing the encoding process for the moving picture data stored in the shared storage section until the acquired identification information becomes abandoned, wherein each of the plurality of processing units executes respective operations independently of one another.

* * * * *